United States Patent [19]

Kratz et al.

[11] 4,041,461

[45] Aug. 9, 1977

[54] SIGNAL ANALYZER SYSTEM

[75] Inventors: Gary L. Kratz, Warrenton; William W. Sproul, III, Reston, both of Va.; Eugene T. Walendziewicz, Wakefield; Donald E. Wallis, Marblehead, both of Mass.; Charles A. Dennis, Warrenton, Va.

[73] Assignee: International Business Machines Corporation, Armonk, N.Y.

[21] Appl. No.: 599,306

[22] Filed: July 25, 1975

[51] Int. Cl.² .................... G06F 9/10; G06F 13/00
[52] U.S. Cl. ............................................. 364/200
[58] Field of Search ...................... 445/1; 340/172.5

[56] References Cited

U.S. PATENT DOCUMENTS

| 3,537,074 | 10/1970 | Stokes et al. | 340/172.5 |
|---|---|---|---|
| 3,544,973 | 12/1970 | Borck, Jr. et al. | 340/172.5 |
| 3,573,851 | 4/1971 | Watson et al. | 340/172.5 |
| 3,766,532 | 10/1973 | Liebel, Jr. | 340/172.5 |
| 3,787,673 | 1/1974 | Watson et al. | 235/156 |
| 3,875,391 | 4/1975 | Shapiro et al. | 235/156 |
| 3,900,836 | 8/1975 | Salvo | 340/172.5 |
| 3,936,806 | 2/1976 | Batcher | 340/172.5 |
| 3,949,379 | 4/1976 | Ball | 340/172.5 |

OTHER PUBLICATIONS

"A Microprogrammed Approach to Signal Processing" G. L. Kratz, IEEE Trans. of Computers, vol. C-23/No. 8, Aug. 1974, pp. 808-817.

Primary Examiner—Gareth D. Shaw
Assistant Examiner—Jan E. Rhoads
Attorney, Agent, or Firm—John E. Hoel

[57] ABSTRACT

A signal analyzer system is disclosed which includes an arithmetic processor containing a plurality of pipeline processor elements in parallel array with each element connected to a respective working store, with all of the elements being under microprogram control of an arithmetic element controller.

A storage controller included in the system is connected to the arithmetic processor, to a system input and to a system ouput.

A bulk storage included in the system is connected to the storage controller. The storage controller controls data transfers into and out of the system and between the bulk storage and arithmetic processor.

A control processor included in the system is connected to the arithmetic processor and the storage controller by means of a data bus for centrally controlling the operation of the plurality of pipeline processor elements by transmitting micro control words over the bus.

40 Claims, 60 Drawing Figures

SYSTEM DATA FLOW

SYSTEM DATA FLOW

ARITHMETIC ELEMENT

PRIMARY CP BUSES AND DATA FLOW

CP STORE CONFIGURATION

DMA CHANNEL TIMING

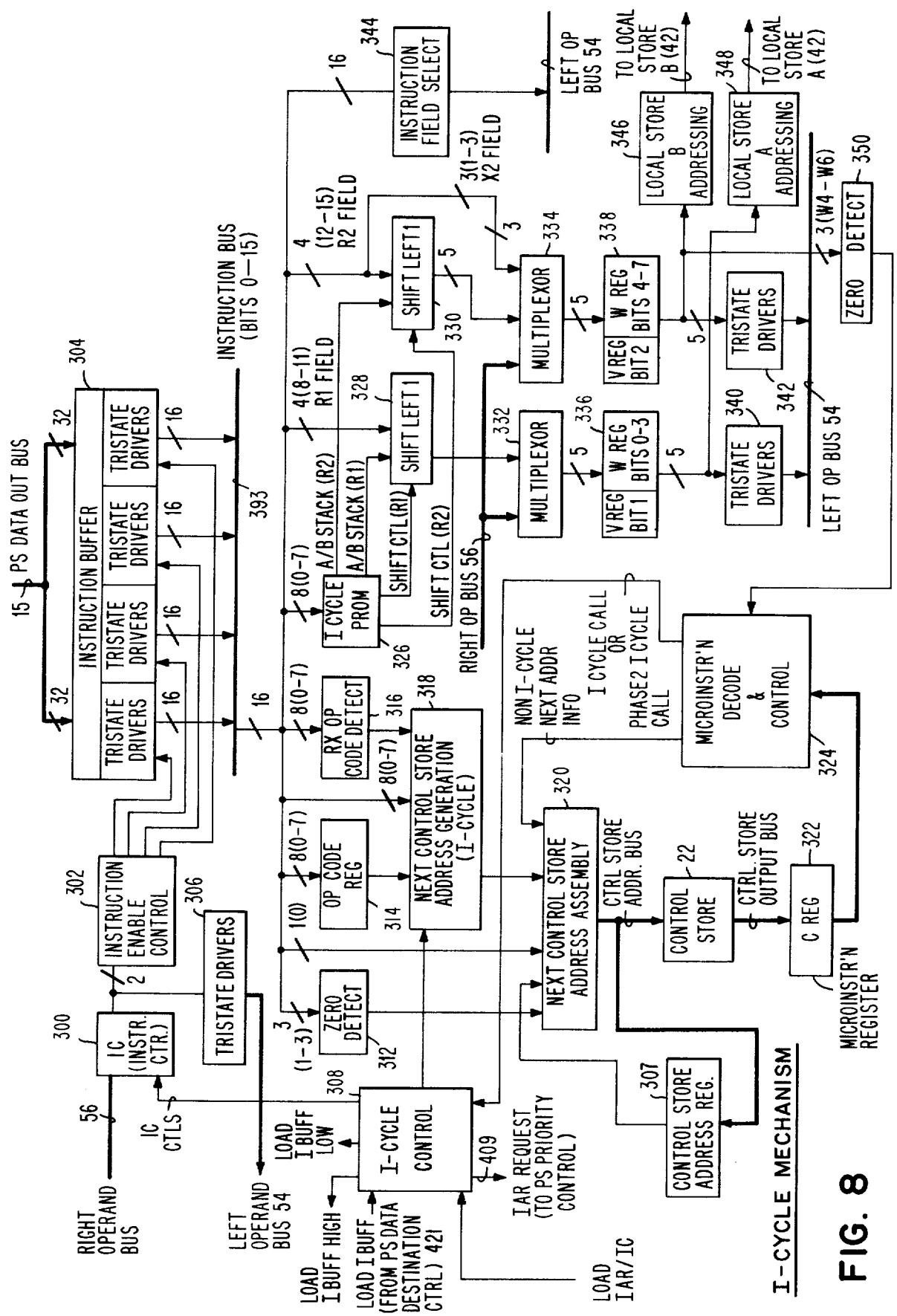
FIG. 8 I-CYCLE MECHANISM

ARITHMETIC ELEMENT CONTROLLER

FIG. 15a
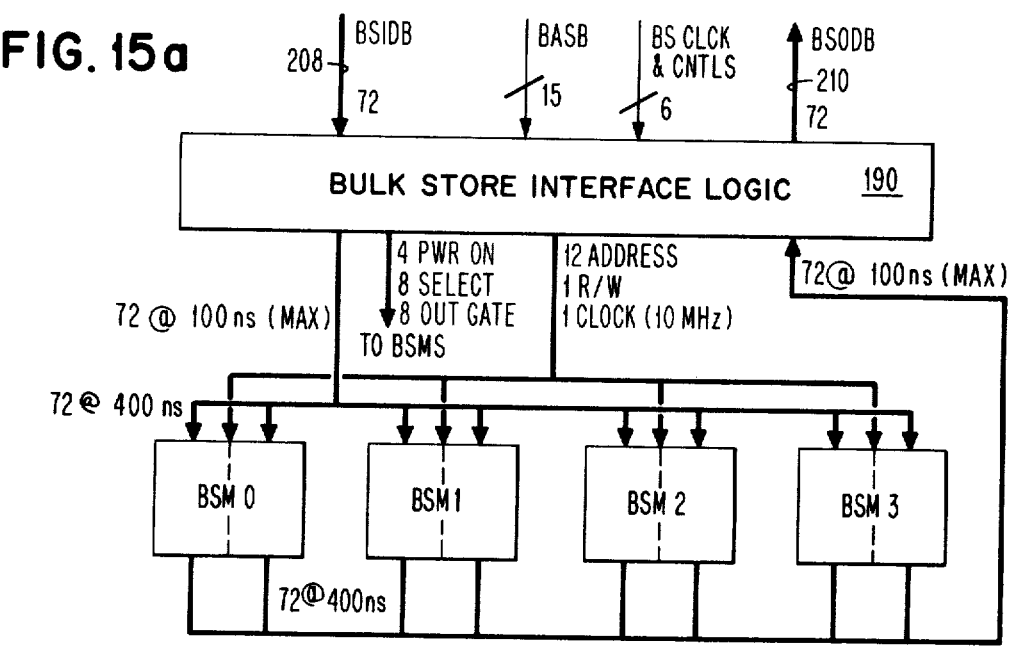
BULK STORAGE ORGANIZATION
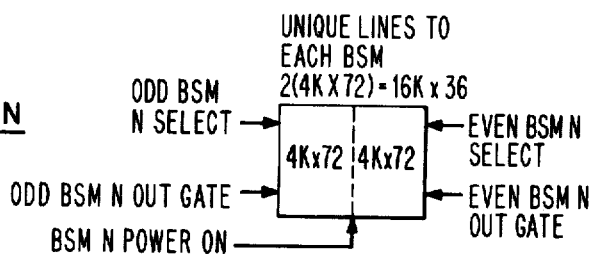
FIG. 15b
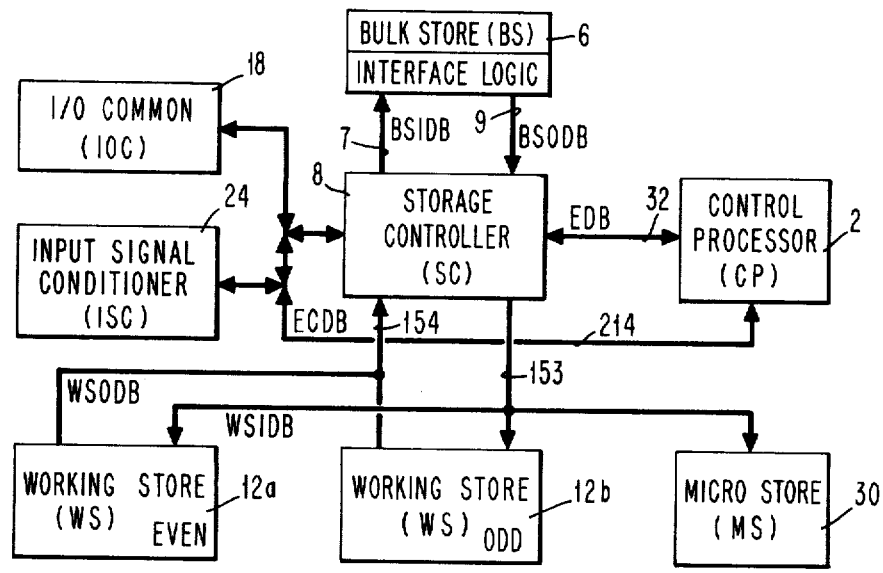
FIG. 23

PRIORITY CONTROL
INTERCONNECTIONS

AE-WS INTERFACES

STC STATUS GENERATION

*FOR MINIMUM CP CYCLE, X≤150 ns (NOTE: TIME FROM TRISTATE DRIVER GATE SIGNAL TO OUTPUT ONTO EDB IS 80 ns; THUS, GATE SIGNAL MUST FOLLOW SELECT BY 70 ns FOR MINIMUM CP CYCLE).

**FOR X≤150ns, Y=350ns (Y INCREASES IN 100ns INCREMENTS; e.g., 150ns<X≤250ns, Y=450ns).

DESKEWING OF SEL & DATA MUST BE PERFORMED BY EXTERNAL REGISTER OR TRAILING EDGE OF SEL USED AS STROBE.

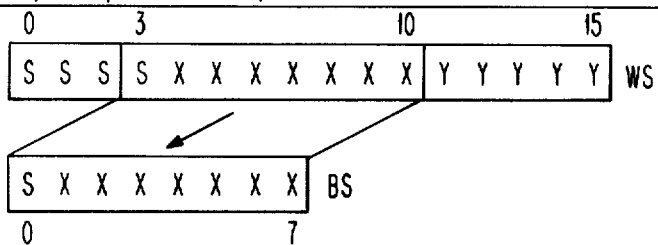
FIG. 38A(1)
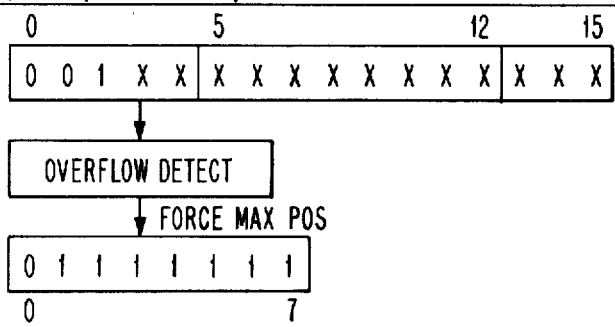
FIG. 38A(2)
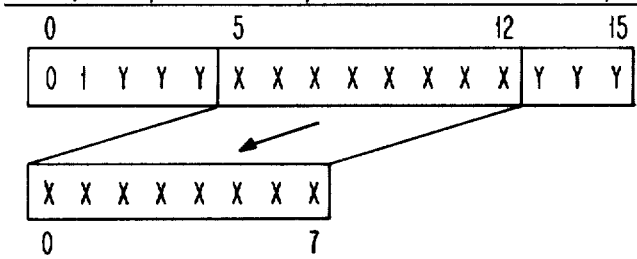
FIG. 38A(3)
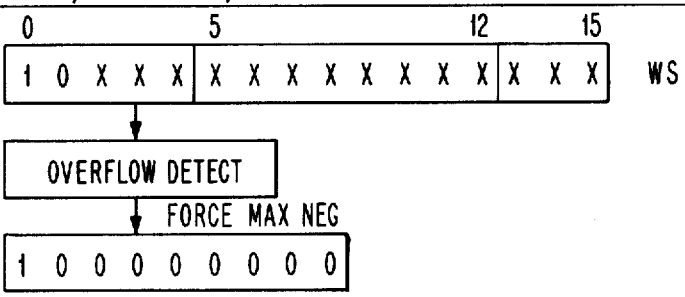
FIG. 38A(4)

FIG. 38B(1)
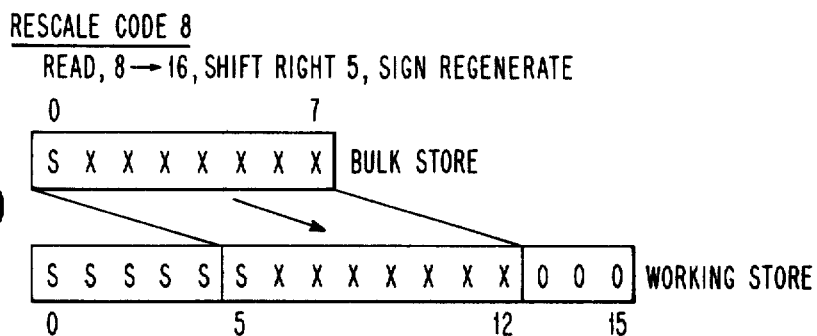
FIG. 38B(2)
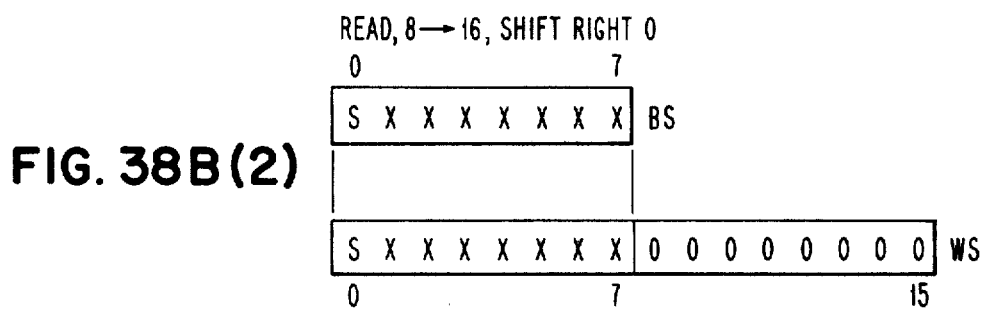
FIG. 38B(3)
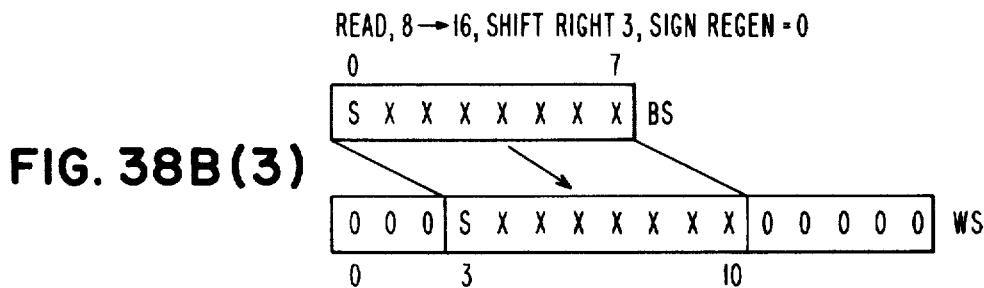

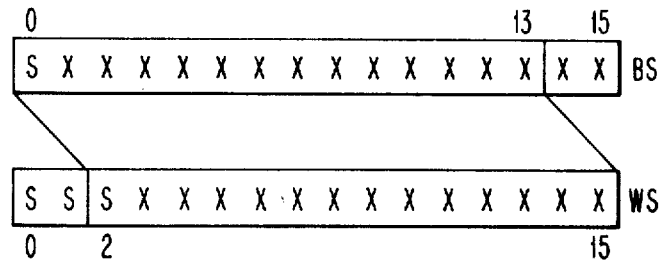
FIG. 38C(1)
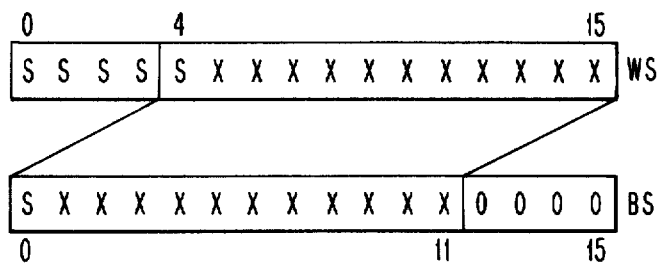
FIG. 38C(2)

STC COMMAND

| SCALE OP CODE | PAIR SELECT | STEP SIZE | READ/ WRITE | BLOCK SIZE | BULK STORE STARTING ADDR | WS STARTING ADDR |
|---|---|---|---|---|---|---|
| 9(16→16) | 1 | 3 | READ | 5 | M | N |

M IS THE ADDRESS OF A 16 BIT WORD IN BULK STORE
N IS THE ADDRESS OF A 32 BIT WORD IN WS

FIG. 38 D (1)

BULK STORE LOCATIONS

| | 0 | | | 63 |
|---|---|---|---|---|
| M-2 | | | X1 | X2 |
| M+2 | | | | |
| M+6 | X3 | X4 | | |
| M+10 | | | X5 | X6 |
| M+14 | | | | |
| M+18 | X7 | X8 | | |
| M+22 | | | X9 | X10 |

FIG. 38 D (2)

RESULTANT WS LOCATIONS

| | 0 | 31 |
|---|---|---|
| N | X1 | X2 |
| N+1 | X3 | X4 |
| N+2 | X5 | X6 |
| N+3 | X7 | X8 |
| N+4 | X9 | X10 |

FIG. 38 D (3)

STC COMMAND

| RESCALE OP CODE | PAIR SELECT | STEP SIZE | READ/ WRITE | BLOCK SIZE | BULK STORE STARTING ADDR | WS STARTING ADDR |
|---|---|---|---|---|---|---|
| 8(8→16) | 1 | 4 | READ | 4 | M | N |

M IS THE ADDRESS OF AN 8-BIT WORD IN BULK STORE
N IS THE ADDRESS OF A 32-BIT WORD IN WS

FIG. 38E(1)

BULK STORE LOCATIONS:

|  | 0 |  |  |  |  |  |  | 63 |
|---|---|---|---|---|---|---|---|---|
| M-2 |  |  | X1 | X2 |  |  |  |  |
| M+6 |  |  | X3 | X4 |  |  |  |  |
| M+14 |  |  | X5 | X6 |  |  |  |  |
| M+22 |  |  | X7 | X8 |  |  |  |  |

FIG. 38E(2)

RESULTANT WS LOCATIONS:

|  | 0 |  | 31 |
|---|---|---|---|
| N | X1 | X2 |
| N+1 | X3 | X4 |
| N+2 | X5 | X6 |
| N+3 | X7 | X8 |

FIG. 38E(3)

SIGNAL ANALYZER SYSTEM

BACKGROUND OF THE INVENTION

The invention disclosed generally relates to data processing systems and more particularly relates to a signal processing computer.

Signal processing in an analyzer unit consists mainly of digital filtering and performing Fourier transformations on large blocks of sensor data. Numerous other support operations such as weighting, long term integration and output formatting are also required. These operations require a general purpose capability in the analyzer unit. To the present, high speed signal processors have not been general purpose in nature. There have been a large number of high speed digital filters and fast Fourier transform (FFT) analyzers designed but only a few designs have attempted to address high speed systems capable of efficiently performing a wide variety of signal processing algorithms plus post processing and display formatting functions.

Signal processing throughput requirements have been conventionally expressed in terms of a required number of multiples per second. The majority of processing loading is derived from filtering, FFT, and FFT weighting algorithms which tend to be multiply limited. However, an extensive number of post-FFT algorithms are required and these tend to be storage or adder limited, making loading expressions in terms of multiplies per second somewhat misleading unless a greater adder throughput and sufficient storage bandwidth can be demonstrated. Prior art signal processors have typically suffered from insufficient adder throughput and storage bandwidth.

OBJECTS OF THE INVENTION

It is an object of the invention to process signal data in an improved manner.

It is another object of the invention to process signal data at a faster rate in a general purpose computer.

It is still another object of the invention to process signal data with a higher adder throughput.

It is even another object of the invention to process signal data with a greater storage bandwidth.

It is another object of the invention to provide expansion capability for the number of arithmetic elements in a parallel pipelined processor.

It is another object of the invention to improve the microprogram control of a plurality of simultaneous operations of elements having different cycle times in a computer.

It is another object of the invention to improve the control over simultaneous, parallel data processing operations, some of which are subject to data dependent conditional operations in their instruction sequence.

It is another object of the invention to improve the control over parallel operations of data transfer and storage in a hierarchical storage, data processing system.

SUMMARY OF THE INVENTION

These and other objects, features and advantages are achieved by the signal processor system disclosed herein.

The signal analyser system is a digital computer which includes an arithmetic processor containing a plurality of pipeline processor elements in parallel array with each element connected to a respective working store with all of the elements being under microprogram control of an element controller.

A storage controller included in the system is connected to the arithmetic processor, to a system input and to a system output.

A bulk storage included in the system, is connected to the storage controller.

The storage controller controls data transfers into and out of the system and between the bulk storage and the arithmetic processor.

A control processor included in the system is connected to the arithmetic processor and the storage controller by means of a data bus for centrally controlling the operation of the plurality of pipeline processor elements by transmitting micro control words over the bus.

An improved microinstruction control over the plurality of simultaneously operating elements in the arithmetic processor is disclosed. An improved control over parallel, data dependent, conditional operations in the arithmetic processor is dissclosed. An expandable parallel processing feature is disclosed.

DESCRIPTION OF THE DRAWINGS

The foregoing and other objects, features and advantages of the invention will be apparent from the following more particular description of the preferred embodiments of the invention, as illustrated in the accompanying drawings.

FIG. 6 is a diagram of DMA Timing.

FIG. 8 is a detailed block diagram of the instruction-cycle mechanism in the control processor.

FIGS. 15A and 15B are block diagrams of the bulk storage organization.

FIG. 23 illustrates the storage controller system interface.

FIG. 38A gives examples of left shifting and overflow detection by the STC.

FIG. 38B gives examples of right shifting by the STC.

FIG. 38C gives examples of a 16 bit to 18 bit shift by the STC.

FIG. 38D gives an example of a 16 to 16 pair select by the STC.

FIG. 38E gives an example of an 8 to 16 pair select by the STC.

DISCUSSION OF THE PREFERRED EMBODIMENT

Figure 1:
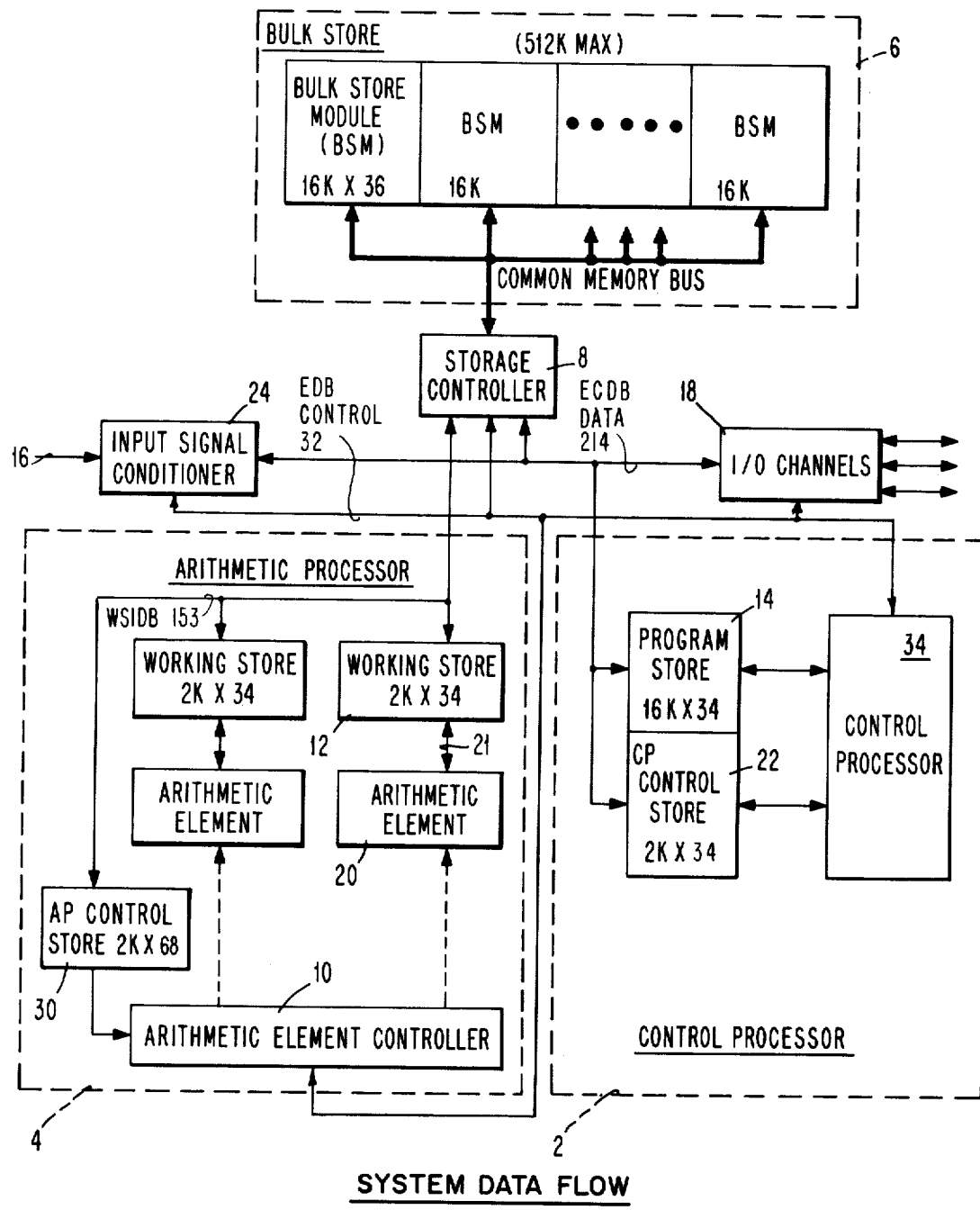
FIG. 1 is a system block diagram signal analyzer system.

The signal analyzer (AU) system shown in FIG. 1, works under control of its own general-purpose computer. The system contains a high speed arithmetic processor and a control processor, both of which are fully programmable at the microinstruction level. The modularly expandable arithmetic processor performs all signal data processing. The control processor, which serves as the supervisor and storage manager for the over-all AU emulates a general-purpose instruction set.

An arithmetic element controller 10 determines the sequence for the microprograms used in the arithmetic processor 4 part of the AU. This controller also provides for addressing and transferring data from working storage 12 and control parameters from program storage 14. These and similar operations enhance the efficiency of the arithmetic processing and contribute to the very high speed and versatility of the AU.

Another especially significant contributor to computational efficiency is bulk storage 6, in which data can be packed in the required number of bits rather than in so-called standard word lengths. Each bulk storage module contains two separate arrays, each of which has an 800 nanosecond cycle. These arrays may be operated interleaved to achieve an effective 400 nanosecond cycle for each 72 bit doubleword. Four bulk storage modules may be operated simultaneously, further increasing the speed.

The storage controller 8 regulates the transfer of data between bulk storage 6 and working storage 12, and can perform special arithmetic operations on the data transferred. Bulk storage is used for buffering all data associated with signal processing.

An important architectural feature, the storage hierarchy, is built around a large bulk storage that has a very rapid transfer rate for blocks of data. The arithmetic and control processors operate out of their own highspeed storages.

Data flow for digital processing generally begins with sensor information from the input 16 going to bulk storage 6. Bulk storage data is repeatedly paged into working storage 12 in the arithemetic processor 4 for different computations. End results arrive at the I/O channels 18 by way of bulk storage 6. The only high-bandwidth requirements for these transfers are for paging data between bulk storage and the working storages. Thus, the bulk storage organization includes a 20-MHz word transfer rate for block transfers. Each working storage has a 5-MHz word transfer rate with bulk storage and for moving data to and from the associated arithmetic element 20.

Micro storage, an essential part of the storage hierarchy, does not use a significant portion of the bulk storage bandwidth. Micro storage is loaded from bulk storage during initial program loading of the AU. From then on, it operates in a read-only mode to provide microinstructions, at a 10-MHz rate, for arithmetic processing. Micro storage can have new programs paged into it at a 5-MHz word rate during major mode changes.

The control processor 34 and its associated program 14 and control storages 22 usually function autonomously. Control storage contains the high-speed microprograms, program storage, the machine language programs and operational tables. Digital commands and data from I/O channels can be directly input to the control processor and its program storage without first going to bulk storage.

Because the control processor 2 does not process signal data, but acts in a supervisory and storage management capacity, it requires only a small part of the bulk storage bandwidth. Paging between bulk storage 6 and control storage 22 is permitted, and may provide access to all of bulk storage for the control processor.

In general, all processing areas have full accessibility to their own local storages, as well as being able to page bulk storage.

An optional input signal conditioner 24 accepts all analog and digital sensor inputs and does the necessary preprocessing. The input/output channels interface all other I/O operations with bulk storage and program storage.

The AU features an LSI (large-scale integration) monolithic memory, a faster and more versatile technology than the core memory.

Logic circuits are high and low-speed Schottky TTL (transistor/transistor logic) and standard TTL modules.

The logic and memory circuit combination in one arithmetic element 20, in conjunction with software that permits interleaving instructions, provides for typical throughputs of 10 million multiplies per second and 10 million three operand per second. The AU can do a 1024-point complex fast Fourier transform in just 2 milliseconds using just one arithmetic element 20.

Characteristics of the signal analyzer system follow.

The Arithmetic Processor (AP) 4 is a microprogrammed 32-bit special purpose processor containing up to four modular arithmetic elements 20 with their high-speed working storages 12. Each arithmetic element contains pipelines, 16 × 16 multiplier 26 and 32-bit, three-way adder 28 and is capable of executing ten million multiplies per second and 10 million three way adds per second. The AP has read/write micro storage capability for arithmetic microprograms and a trigonometric coefficient generator for fast Fourier transform and digital filter hetrodyning.

The Control Processor (CP) 2 is a microprogrammed 16 or 32-bit general purpose processor containing a 32-bit arithmetic and logic unit with 300 nanosecond microinstruction cycle, a program storage 14 of up to 128K 34-bit words and a control storage 22 of up to 8K 34-bit words. The CP is capable of executing system supervisory and data management functions.

The Storage Controller 8 transfers data between bulk storage 6, performs data-scaling; bit-reverse addressing; and error correction and, in addition provides for priority control.

Input/Output (I/O) 18 can have a maximum of eight programmable channel pairs with common control logic. It provides direct-memory-access rate of 2.5 MHz to bulk storage and 1.25 MHz to program storage, with a single-channel word rate of 196 kHz. Other I/O types can be used with the system.

SIGNAL PROCESSING LANGUAGE

The signal analyser system (AU) of FIG. 1 has two distinctly different levels of machine programmability. Each of the two machine languages provides distinct benefits to either the system designer or the system programmer. Each of the two machine languages has its own set of objectives.

The first level of machine language programmability in the AU is the microprogram language. This is the system designer's language and is hardware data flow oriented. It provides programmable access to, and control over, the system's detailed hardware functions. There are two separate microprogram languages in the AU. One is associated with the general purpose controller, the Control Processor (CP) 2, and the other is associated with the high speed signal processor, the Arithmetic Processor (AP) 4. Microprograms in both of these languages are implemented in read/write control storages, 22 and 30, respectively.

The second level of machine language programmability in the AU is the Signal Processing Language, or SPL. This is the system programmer's language. The SPL is problem oriented. Its architecture and instruction sets have been designed and tailored toward signal processing applications. The SPL is an emulated machine language, created by, and executed under, microprogram control routines.

The SPL architecture and instruction sets can be expanded, changed, and improved with no hardware changes in the system. The SPL architecture and its instruction sets could be completely replaced with a different problem oriented machine language if required by new and substantially different applications.

SPL instructions are divided into four classes, General and Supervisory instructions, Data Transfer Instructions, Input/Output (I/O) instructions, and Complex Function instructions. The General and Supervisory instruction set provides the system programmer with the framework in which to structure the program flow. It is similar to the instruction sets found in state-of-the-art general purpose computers. The Data Transfer instruction set provides a command structure used for transferring data sets between Bulk Store 6 and the AU processing elements 2 and 4. The I/O instruction set provides a command structure for control of peripheral devices. The Complex Function instruction set provides the systems programmer with the framework in which to command the execution of the signal processing algorithms which are referred to as complex functions in the AU. The Complex Function instruction set provides an efficient method of initiating the execution of a complex function or chain of complex functions in the AU. The complex function structure is designed to take advantage of the AU's ability to chain together a sequence of complex functions without program intervention, minimizing wait time and thus resulting in maximum system efficiency.

ANALYZER UNIT FUNCTIONAL ELEMENTS

The AU contains the following six functional elements which are organized as shown in FIG. 1:
1. Control Processor 2,
2. Arithmetic Processor 4,
3. Bulk Store 6
4. Storage Controller 8,
5. I/O Channels 18 and
6. Input Signal Conditioner 24.

The following describes the AU elements in the system. System processing requirements are partitioned among the processing elements in a manner designed to minimize idle time caused by one processing element requiring service from another element.

A. Control Processor

The CP 2 performs the AU system supervisory and data management functions. The CP initiates commands to the other functional elements of the AU by communication with them via its External Data Bus 32. This gives the CP 2 direct access to all the command and status registers of the AU which are addressed as a simple extension of the CP local store.

The CP 2 is a microprogrammed 32-bit general purpose computer. The CP has a Program Store 14 for SPL programs and data and a writable Control Store 22 for microprograms.

The arithmetic and logic area 34 is a conventional 32-bit design providing operations on word, halfword, byte, or 4-bit operands. Operations on 4-bit operands enhance CP capabilities as a controller by providing an efficient means of manipulating device command words. Operands may be selected from 64 local storage words, 192 external storage words (External Registers) provided to facilitate control of external devices, or literals. Local Store register locations may be addressed directly or indirectly to provide efficient emulation of SPL general register operand specifications.

Program Store 14 is nominally 16K by 34 bits including 2 parity bits. It is modularly expandable in 8K increments to 128K words.

The CP Control Store 22 is a 2K by 34-bit read/write store with 32 data bits and 2 parity bits per word. The CP microprograms are executed from CP Control Store 22. The CP microprogram sequencing logic includes the capability to branch on an SPL op code to the start of an instruction execution routine facilitating the emulation of SPL.

Figure 3:
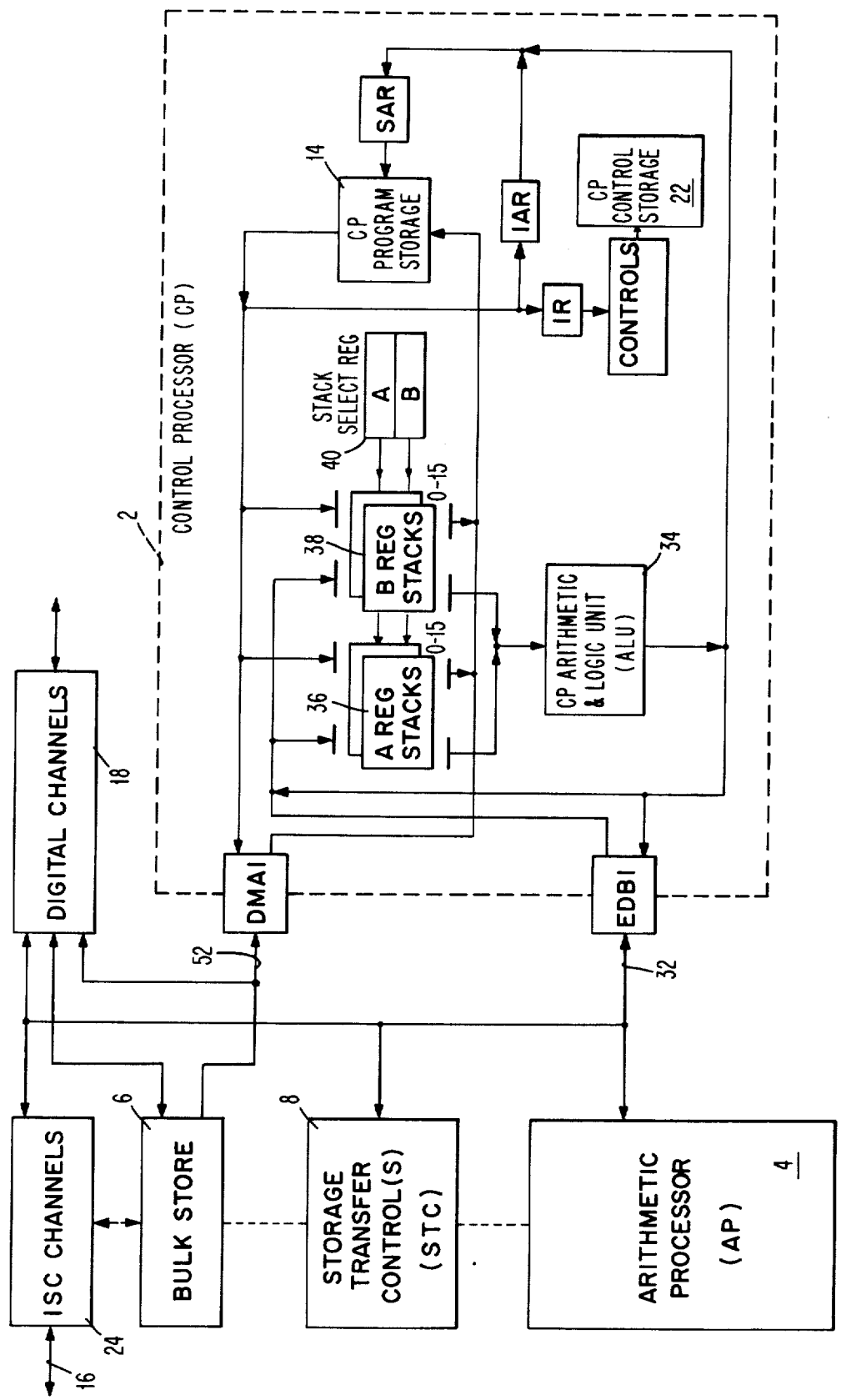
FIG. 3 is a block diagram of the control processor 2.

FIG. 3 presents the CP 2 data flow structure. FIG. 3 also illustrates some of the special peripheral unit control interfaces provided by the CP in establishing various system configurations.

Under micro control, the CP 2 data flow of FIG. 3, is 32 bits wide with capability of operating on halfwords; thus, primitive fixed-point arithmetic operations (add, subtract, compare) and logical operations performed in the same amount of time for halfword (16-bit) and word (32-bit) operands. In addition, 4-bit and 8-bit arithmetic and logic operations are capable of being performed at the micro level on a digit or byte of the halfwords selected as operands. Operands may be fetched from a Local Store 42, CP registers 44 (Primary Registers), or registers in functional areas remote to the CP 2 (External Registers).

The CP 2 fetches microinstructions from a writable Control Store 22. The CP 2 fetches machine language instructions and data from and stores data into a Program Store 14. The CP 2 maintains storage protect bits to protect againsT a user writing into a storage area to which he should not have access.

The CP 2 performs a portion of the machine language instruction cycle (I-cycle) in hardware. This encompasses prefetching up to 4 machine language instructions, maintaining and automatically incrementing hardware counters pointing to the next instruction to be fetched from Program Store 14 and to the next instruction to be executed, saving the status of the operation, initializing CP hardware for execution of the next instruction, and entering a specific micro routine to perform the operation specified by the machine language instruction.

The CP provides special iterative cycles for multiply and divide. It provides special assists for floating point operations. The CP also provides an Interval Timer and real time clock.

Figure 4:
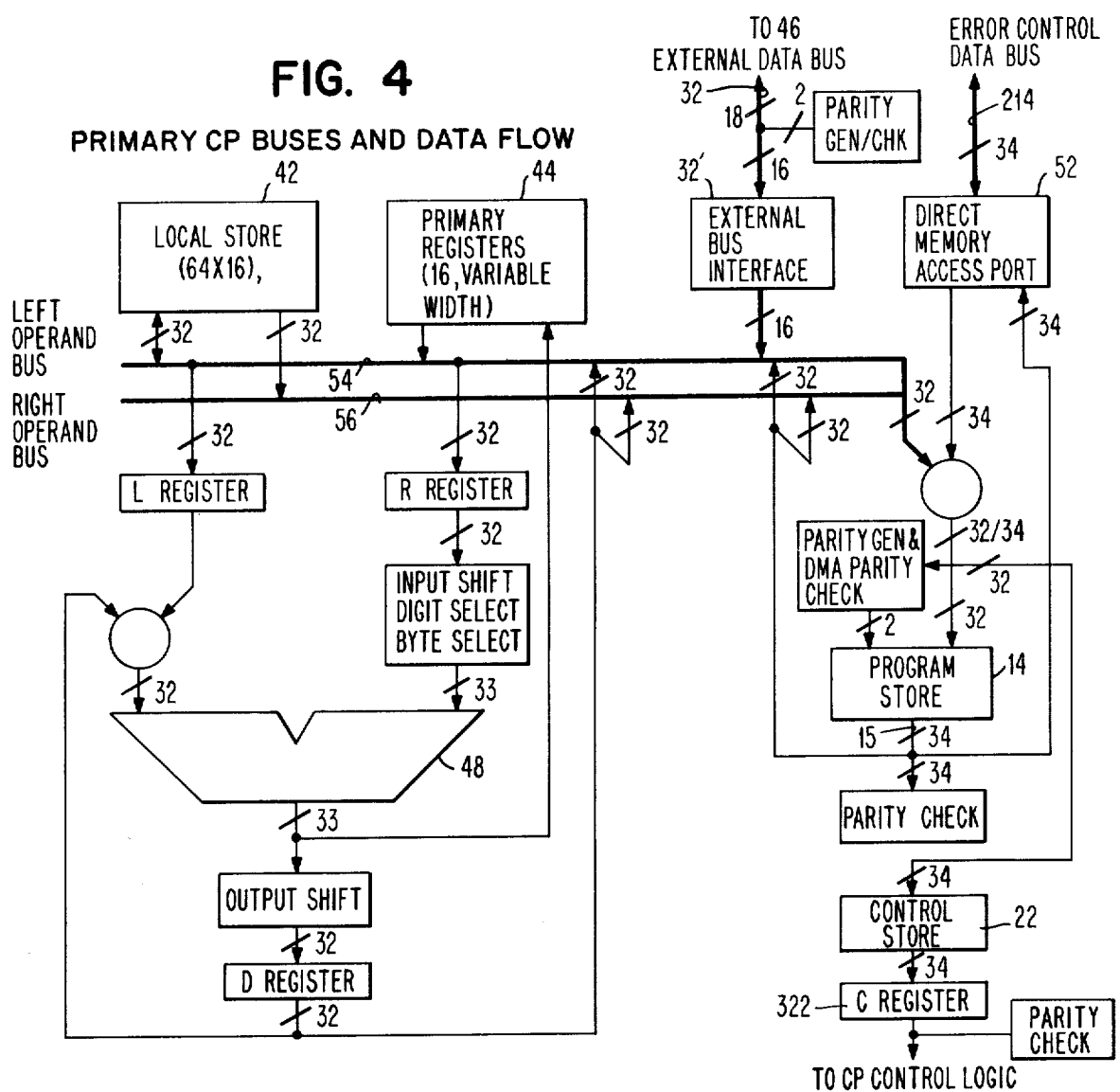
FIG. 4 is a detailed block diagram of the control processor 2.

Primary CP buses and data flow is shown in FIG. 4

Local Store

CP Local Store 42 provides 32 32-bit general purpose registers. Local Store shall have four possible cycles:
1. Read Local Store to Arithmetic Section
2. Write Local Store from Arithmetic Section
3. Read Local Store to CP Store
4. Write Local Store from CP Store Cycles not required need not be taken. Cycle type 1 requires that the Local Store 42 be organized such that two random registers be accessed simultaneously (i.e., two operands from random registers may be accessed). Cycle type 2 requires that a single random register or the high or low part of a register be written. Cycle type 3 requires that a single random register be capable of being accessed during the cycle. Cycle type 4 requires that a single random register or the high or low part of a register be capable of being written during the cycle. The requirements imposed on cycle type 4 are a result of a requirement to read or write CP Store on a half-word (16 bits) or word (32 bits) basis.

PRIMARY AND EXTERNAL REGISTERS

The CP 2 supports addressing of 16 Primary 44 and 176 External Registers 46. A Primary Register 44 is a special purpose register located internal to the CP 2; Primary Registers 44 are of varying size up to 32 bits. An External Register 46 is located in a functional unit other than the CP 2. Communication between the CP 2 and External Registers 46 is via the External Bus 32. All External Registers 46 are 16 bits wide. Data from a Primary 44 or External Register 46 is right justified in the CP data flow.

The Primary Registers 44 are accessible in the same amount of time as a Local Store register 42. An extended microinstruction cycle is taken when reading an External Register 46. These registers 46 are capable of being used as if a Local Store register 42 for cycle types 1 and 2; in cycle type 1 the contents of a Primary 44 or External Register 46 is read to the left input only of the ALU 48. All Primary Registers 44 are loaded by the beginning of the next microinstruction following their specification; the microinstruction execution time shall not be extended to write a Primary Register 44. The nominal execution time of a microinstruction specifying an arithmetic or logical operation is 300 ns when all operands are from Local Store 42. If one operand is from an External Register 46, the execution of the microinstruction is extended by 200 ns to 1.6 us for the access of the data in the External Register 46 (this time is dependent on the response of the External Register). A write to an External Register 46 extends the execution time of the microinstruction by 100 ns.

Arithmetic and Logic Unit (ALU)

The CP ALU 48 is capable of performing 4-, 8-, 16- and 32-bit arithmetic and logical operations. It contains multiply, divide, and floating point assist hardware capable of performing special operations. Results of a calculation specified by one microinstruction stored in the appropriate Local Store 42, Primary Register 44, or External Register 46 during the execution of the next microinstruction. The results may be selected as an operand or as data to CP store 50 in a microinstruction cycle following the one in which it was calculated; that is, register addresses formed for a type 1 or type 3 Local Store cycle or type 1 Primary Register or External Register cycle is checked to determine if the data required was calculated during the previous cycle and, if so, this updated is used in place of the contents of the addressed register. Likewise, the addresses of registers to which data from CP Store 50 is to be written (as the result of a CP Store read) is checked against addresses formed for a type 1 or type 3 Local Store cycle and if a match is encountered, the new data directly from CP store is used in place of the contents of the addressed register. The impending write of ALU 48 results into a Local Store, Primary or External Register or CP Store data into a Local Store register is not terminated.

CP Store

Figure 5:
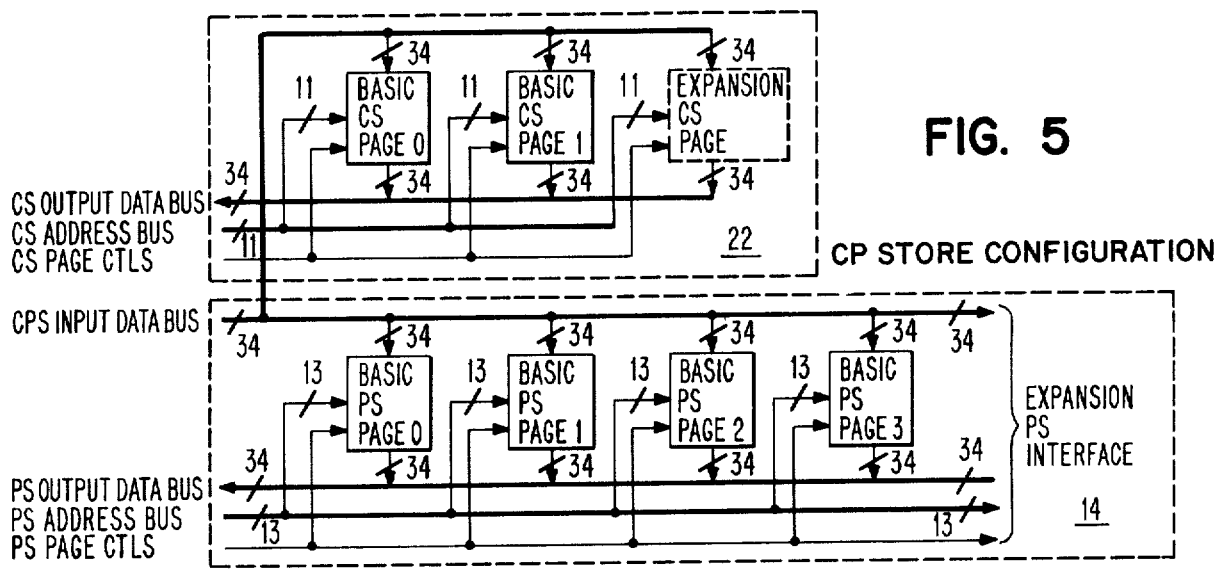
FIG. 5 is a detailed block diagram of the control processor store.

The CP Store 50 utilizes two speeds of storage; a high speed bipolar storage and a low speed NMOS storage. The high speed storage is used for Control Store 22 and the low speed storage is used for Program Store 14. The Cp Store configuration and bussing is shown in FIG. 5.

The basic Control Store 22 modular increment is 1024 words of 34 bits (32 bits of microinstruction and 2 odd parity bits) with expansion capability to 8192 words. Growth is accomplished by adding the necessary high speed storage pages; no modification of wiring being required. Detection of a parity error when accessing Control Store 22 causes bit 2 of the Machine Check Status register (Primary Register 47) to be set and the Machine Check interrupt request bit set in the Trap Request register; the microinstruction in which the parity error was detected will be executed. Following execution of the microinstruction in error, the first microinstruction of the Machine Check routine is executed if the Machine Check trap is unmasked; this microinstruction will be a link and will save the address formed by the microinstruction in error.

The Program Store 14 consists of independent banks of 8192 words of 34 bits (32 bits and 2 odd parity bits). Each bank contains two pages. Each page contains 4K words. These pages have low order address interleaving such that sequential accessing results in an effective 400 ns cycle time of the bank. Access time is 650 ns. A reserved area occupies the highest addresses of Program Store 14 which SPL instructions may not directly access. The reserved area contains 1K words × 34 bits when 4K pages are used and 2K pages are used and 2K words × 34 bits when 8K pages are used. Addressing of the reserved area is contiguous starting at 0 and is that area of Program Store 14 above that amount specified in the PS Limit register. Detection of a parity error when accessing Program Store 14 for an instruction causes bit 3 of the Machine Check Status register to be set. Detection of a parity error when accessing Program Store 14 for data causes bit 4 of the Machine Check Status register to be set. Detection of a parity error also causes the Machine Check interrupt request bit to be set in the Trap Request register.

The basic Program Store 14 contains four pages and is directly expandable to 16 pages. The CP/IO subunit has the capacity for four pages of Program Store. The CP/IO subunit contains the interface for expansion of Program Store. A fully expandable PS consists of the four pages in the CP/IO subunit and 12 pages in one additional subunit. Addressing of Program Store 14 is contiguous starting at 0. Addresses to all but the reserved area of Program Store is compared against the PS Limit register which indicates the size of the Program Store addressable by the SPL to the 1K word block for 4K pages. An invalid address sets appropriate status in the CP Machine Check Status register and interrupt the CP at the CP Machine Check interrupt level; the storage operation is aborted.

The CP Store 50 incorporates a direct memory access channel (DMA) 52. Maximum bandwidth of the channel is 1.25 megawords/second. Utilization of this bandwidth is dependent of the throughput capability of users of the DMA. Users of the DMA channel 52 are the I/O Common, and Storage Controller 8. Priority of usage of the DMA channel is as follows: first, IOC; second, SC. The priority of usage of Program Store 14 is as follows: first, DMA 52; second, CP for data fetches; third, CP for instruction fetches. In the Analyzer Unit application, the maximum aggregate transfer rate between the I/O Common and CP Store is 1.25 megawords/second; the maximum transfer rate from the Storage Controller to CP Store is 833 kilowords/second; the maximum transfer rate from the CP Store to the Storage Controller is 714 kilowords/second.

The address presented by a user of the DMA channel is 18 bits of the following format:

TABLE I

| 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|----|----|----|----|----|----|----|----|
| 0 | | | | | | | Program Store Address 1-17 | | | | | | | | | | |
| 1 | 0 | X | X | X | X | X | Program Store Address 7-17 (Reserved Area) | | | | | | | | | | |
| 1 | 1 | X | X | X | | | Control Store Address 5-17 | | | | | | | | | | |

This address shall access a 32-bit location in CP Store.

External Bus

The External Bus 32 consists of the following signal lines:

TABLE II-A

| Signal Name | Number of Lines |
|---|---|
| External Data Bus | 18 (16 data + 2 odd parity) |
| External Address Bus | 9 (8 address + 1 odd parity) |
| Channel Select Bus | 4 |
| EB Read/Write | 1 |
| EB Select | 1 |
| EB Acknowledge | 1 |
| EB Parity Error | 1 |

Figure 35A:
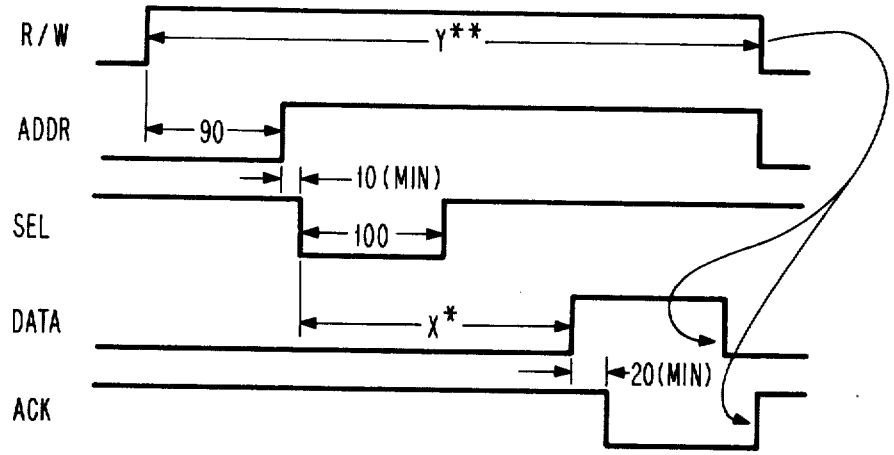
FIG. 35A illustrates the read timing at the external register for the external data bus.
Figure 35B:
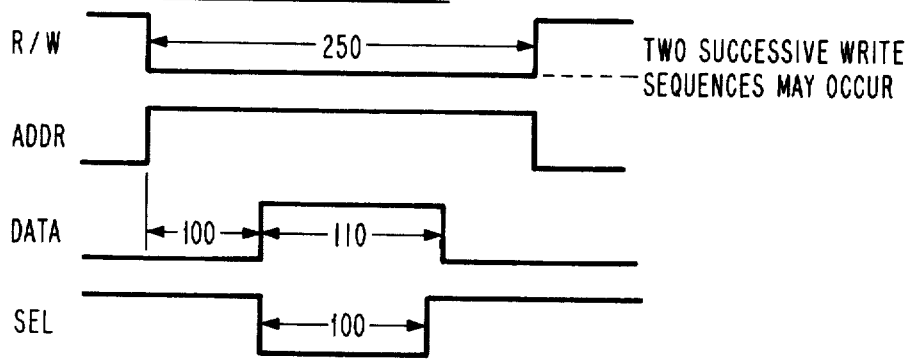
FIG. 35B illustrates the write timing at the external register for the external data bus.

The External Bus 32 is used by the Cp 2 to read and write External Registers 46. Data is transmitted to and from the register via the bi-direction External Data Bus. The External Address Bus contains the address of the register being read or written; the address is generated by the CP. The drivers used on the External Data Bus are TTL tristate drivers; drivers on all other output lines of the interface are TTL 75 ohm line drivers. The timing of the interface is designed to drive a capacitive load on each line of 904 pf; the timing for driving this load is shown in FIGS. 35A and 35B (note that the timing shown is at the External Register).

When a read of an External Register 46 begins, the EB Read/Write line is raised. Following this, the address of the External Register to be read is placed on the External Address Bus. Not less than 10 ns after the address is stable on the EAB, the EB Select line is dropped for 100 ns. The External Register 46, upon decoding its address, will place the data to be read on the EDB; it will drop the EB Acknowledge line for 100 ns not less than 20 ns after the data is stable on the EDB. If the acknowledge is received within 190 ns after the select is issued (or, in the worst case, acknowledge is transmitted within 150 ns after the select is received by the External Register), the Eb Read/Write line is dropped at a point 350 ns from when it was raised (i.e., the read shall have been completed in 350 ns); otherwise, the read is extended in 100 ns increments until the acknowledge is received. If an acknowledge is not received within 1.6 us after the select was issued, bit 8 of the Machine Check Status register is set and CP timing reset (i.e., execution of the next microinstruction started).

When a write is to occur, the address is valid not less than 10 ns before the select is dropped; select is dropped 100 ns after the write is begun (100 ns after the EB Read/Write line drops). Data is valid before or at the time select drops. Select remains down for 100 ns. Data remains valid at least 10 ns after select is raised. A write is performed in 250 ns.

The External Register 46 checks parity on the EAB during either a read or write. It checks byte parity on the EDB during a write and generate byte parity on the EDB during a read. The CP generates parity on the EAB during either a read or write. It generates parity on the EDB during a write and checks parity on the EDB during a read. Parity bits lag data or address bits by not more than 30 ns. If an External Register 46 detects a parity error it will issue a 100 ns negative pulse on the EB Parity Error line within 250 ns after the fall of Select. The EB Parity Error line is a tristate bus line; the CP uses a resistor to $V_{cc}$ to pull the line up (the resistor is chosen such that the down level input current of the line into the CP is not less than $-16$ ma). A parity error reported by an External Register 46 or detected by the CP is set into bit 0 or bit 1 (depending on whether the error occurred during a read or write) and the Machine Check interrupt request bit in Trap Request register is set. If the Machine Check interrupt is unmasked (i.e., bit 0 of the Trap Mark register is a one), not more than one microinstruction is executed after the microinstruction calling for the read if bit 0 of the Machine Check Status register is set and not more than two microinstructions are executed after the microinstruction calling for the write if bit 1 of the Machine Check Status register is set.

DMA Channel

The Direct Memory Access (DMA) channel 52 shall make use of the following lines:

TABLE III

| Signal Name | Number of Lines |
|---|---|
| EC Data Bus | 34 (32 + 2 parity) |
| CP DMA Address Bus | 18 |
| IOC CPS Usage Request | 1 |
| SC CPS Usage Request | 1 |
| IOC CPS Busy | 1 |
| SC CPS Busy | 1 |
| DMA - Read/+Write | 1 |
| DMA Store Protect Flag | 1 |
| EC Data Bus Parity Error | 1 |
| PS Protect Check (DMA) | 1 |
| Illegal Address (DMA) | 1 |
| Read Holdoff | 1 |

Figure 7:
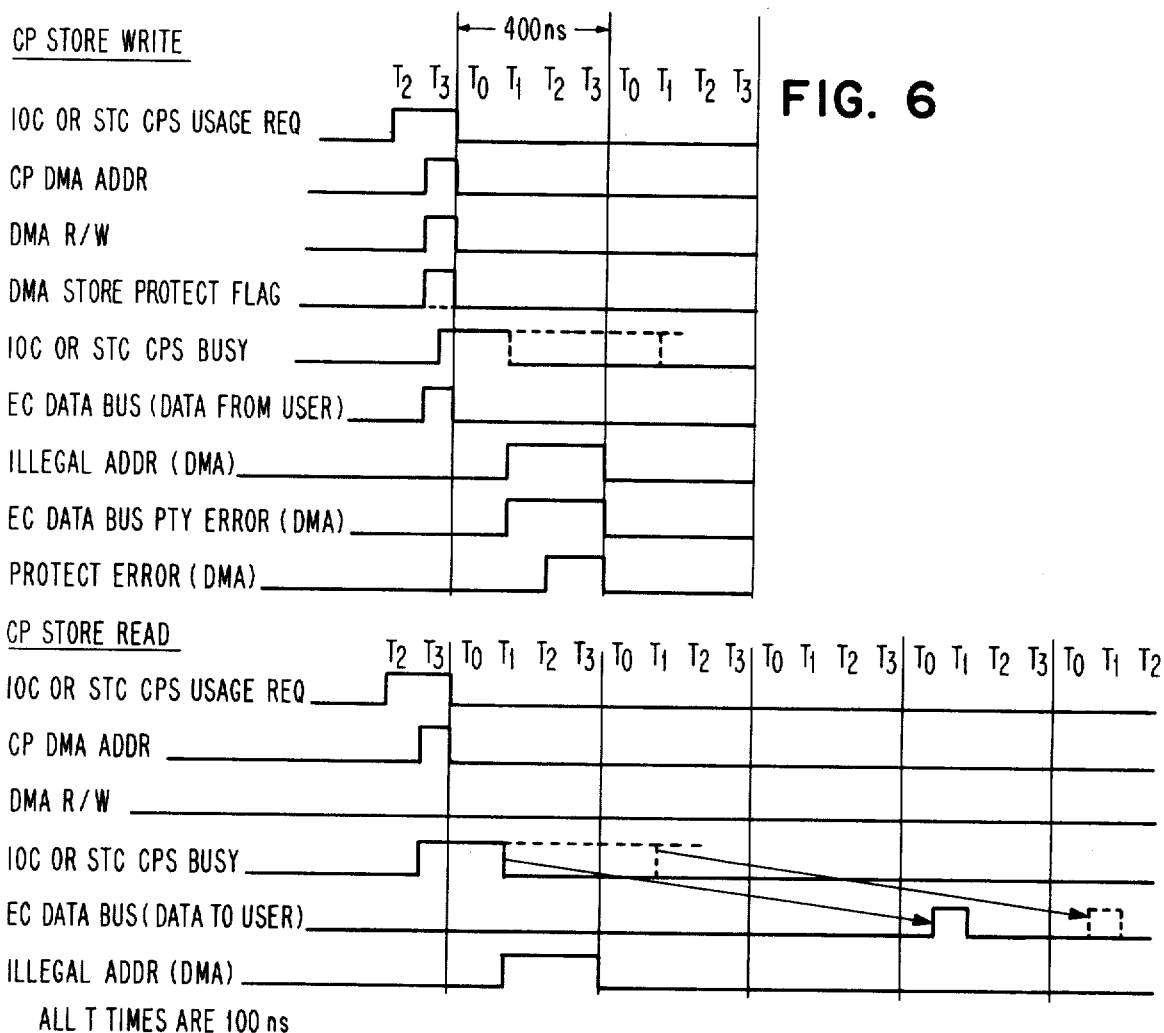
FIG. 7 is a diagram of the direct memory access channel timing.

Timing of the DMA channel 52 is shown in FIGS. 6 and 7. The EC data bus is time slotted ($T_0$, $T_1$, $T_2$, $T_3$) each time slot being 100 ns wide. Data to be written into CP Store is transmitted to the CP via the EC Data Bus during time slot $T_3$. Data read from CP Store is transmitted from the CP to the user during time slot $T_1$.

Users of DMA channel are the IOC and SC. Each present the CP a usage request line to access CP Store. The request is raised at the beginning of $T_2$ time and dropped at the beginning of the following $T_0$. The IOC CPS Usage Request is used by the SC to inhibit an SC CPS Usage Request. The user presents the address, read/write indication, protect flag, and data (for a write operation) on the EC Data Bus during $T_3$ time. The CP raises the user's busy line during $T_3$ and drops it during the first $T_1$ after the requested cycle is begun. For a read, the data is gated on the EC Data Bus during the $T_1$ 1200 ns after the busy associated with the particular memory cycle was dropped. The CP checks parity on the user data for a write, checks for an invalid PS address, and checks for a storage protect error for a write; these errors are reported on the appropriate error line to the DMA channel users (i.e., EC Data Bus Parity Error, Illegal Address, and PS Protect check, respectively); the error indications are valid during $T_3$ time and reset at the beginning of $T_0$ time. If an EC Data Bus Parity error, an illegal address, or a PS protect check is detected, the requested memory operation is aborted.

The Read Holdoff signal is generated by the IOC whenever it is performing a Bulk Store read. While the signal is up, the CP does not begin any CP Store read operation.

I. I-Cycle Mechanism

Figure 9A:
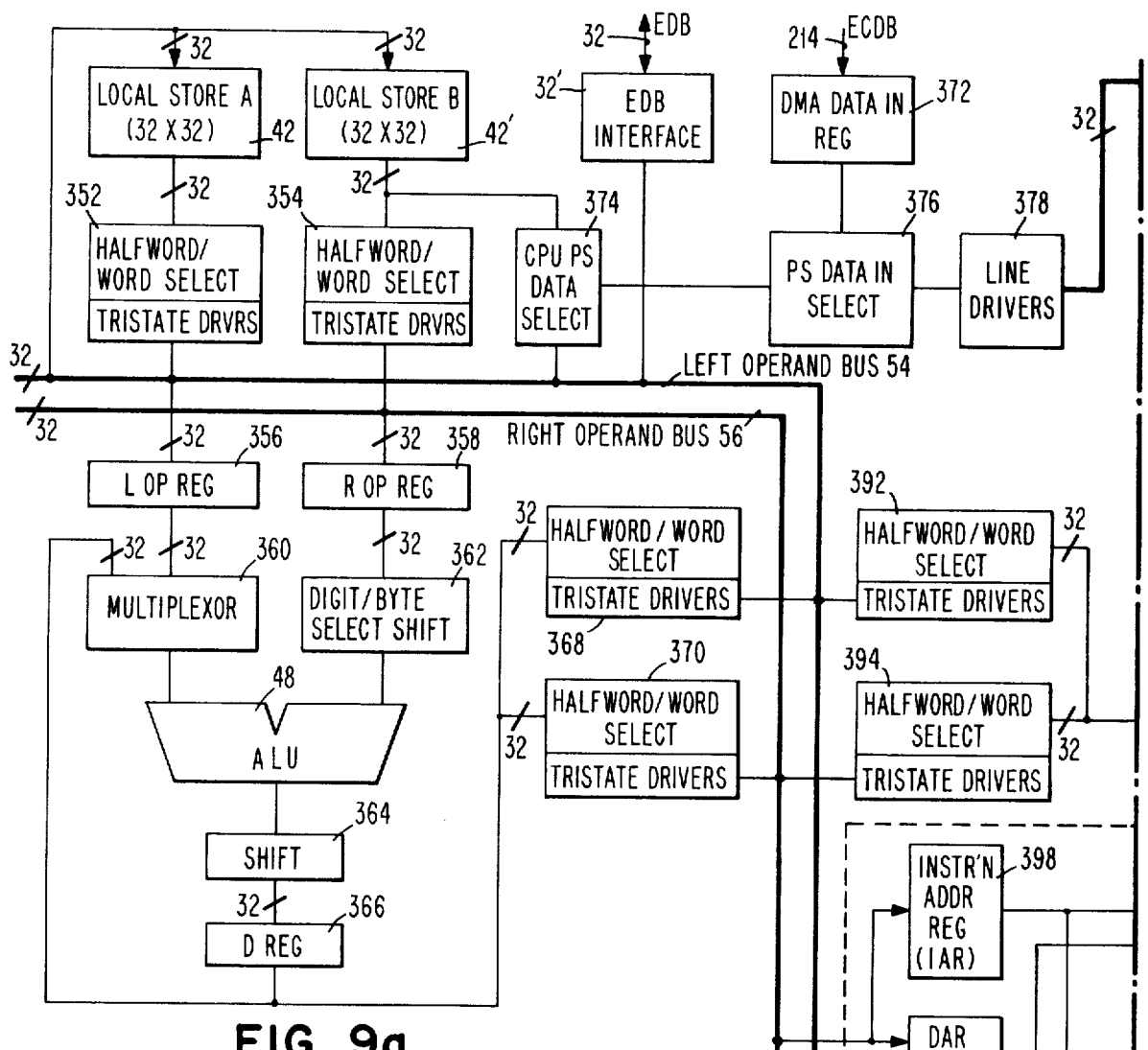
FIG. 9A-9B is a detailed block diagram of the program store interleave control in the control processor.

The I-cycle mechanism of FIG. 8 consists of logic whose purpose is to set up the control processor in a minimum amount of time to begin microprogram emulation of an SPL instruction. This logic consists basically of an instruction buffer 304 which contains 64 bits of instruction information, an instruction counter 300, an instruction address register 398 (FIG. 9), an OP code register 314, the I cycle prom 326, next control store address assembly 320 for I cycle, RX OP code detection logic 316, and I cycle control logic 308 which maintains status of the instruction buffer 304, that is, the amount of instruction information presently in the buffer, and requests the reading of additional instruction information from program store 14 to the instruction buffer 304. Action by the I-cycle mechanism is under control of an I cycle specification or a phase 2-I cycle specification in the presently executed microinstruction.

The instruction counter 300 and the instruction address register 398 are both loaded when the microinstruction is executed which transfers data from the output of the ALU 48 to primary register 44. The address is gated from the output of the ALU 48 onto the right operand bus 56 and loaded into both the IC 300 and instruction address register 398 at the same time. This action also causes an instruction buffer valid status in the I cycle control 308 to be reset. The I cycle control 308 immediately requests a fetch over line 409, of instruction information from program store 14. This is called an IAR request. The IAR is used in this case as the address to program store 14. Once the program store control logic (FIG. 9) acknowledges the IAR request, the instruction address register 398 is incremented by a count of two. This is because two half words or one full word is in the process of being fetched from program store 14 and will eventually be loaded into the instruction buffer 304. The I cycle control 308 then sets a status bit to indicate that one full word is in the proess of being fetched. At this point the instruction buffer 304 is still empty, and one full word of instruction information is in the process of being fetched from program store 14. The I cycle control 308 then makes another IAR request to the program store priority control logic 408 and as before, when this request is acknowledged, it increments the instruction address register 398 by a count of two. Thus, at this point, two full words of instruction information are in the process of being fetched from program store 14. As the instruction information returns from program store 14, the program store data destination control logic 422 generates a load high buffer signal to the I cycle control logic 308. From this, the I cycle control 308 generates either a load I-buffer high signal or a load I-buffer low signal to load the 32 bits of information from program store 14 either into the high half of the instruction buffer 304 or the low half of the instruction buffer 304. As data enters the instruction buffer 304, the I cycle control logic 308 sets valid bits for those portions of the instruction buffer 304 being loaded. If the I cycle control logic 308 receives an I cycle call or a phase 2-I cycle call from the microinstruction decode and control logic 324 prior to having loaded the instruction buffer 304 with valid information, the I cycle control 308 will cause the execution of the microinstruction to wait until valid data has been loaded into the instruction buffer 304.

When a microinstruction is being executed which thus applies an I cycle call and there is valid data in the instruction buffer 304 or the OP code or bits zero through 7 of the 16 bit quantity presently on the instruction bus 393 is checked by the RX OP code detect logic 316 to determine if an RX instruction is being executed which will require an operand to be fetched from program store 14 before the functions specified by the OP code can be executed. If so, then the next control store address generation logic 318 will force as a next control store address, the entry point to the common RX operand fetch routine. Also the OP code is saved in the OP code register 314 for the later use. If an RX OP code is not detected then bits zero through 7 of the present instruction on the instruction bus 393 is inserted into the low order ten bits of the next control store address 318 to form the entry point of the micro routine which will emulate the SPL instruction being executed. If an RX OP code was detected an entry was forced to the common RX operand fetch routine, after the operand has been fetched from program store 14, a microinstruction will be executed which will specify a phase 2-I cycle. This will cause the next control store address generation logic 318 to insert the contents of the OP code register 314 into the low order ten bits of the next control store address, which will form the entry point of the micro routine which will complete the execution of the RX instruction.

Whenever an I cycle call is specified by a microinstruction, bits zero through 7 or the OP code of the instruction presently on the instruction bus 393 will be used to address an I cycle prom 326. The prom has four data outputs. Two of these outputs are used as shift control to two shift left one circuits 328 and 330. The inputs to these circuits are the R1 field bits eight to eleven of the instruction and the R2 field bits twelve through fifteen of the instruction and the remaining two bits of the I cycle prom 326. The R1 and R2 fields are shifted left one if the I cycle prom 326 detects an OP code of an instruction requiring word operands. The R1 and R2 fields are not shifted left one if the I cycle prom 326 detects an OP code of instruction requiring half word operands. If the I cycle prom 326 detects an OP code of an instruction requiring half word operands, the two bits from the I cycle prom 326 to the shift left one logic 328 and 330 indicate the stack either A 36 or B 38 stack in which the operands are to be fetched. Stack here is in reference to the architectural nomenclature of A and B general purpose register stacks 36 and 38. The A-B stack bits from the I cycle prom 326 form the high order bit of the five bit output of the shift left one logic 328 and 330 is gated through two multiplexers 332 and 334 to the inputs of the V and W registers 336 and 338. The V register bits indicate the group of sixteen half word registers being addressed. This is analogous to the A and B stack designations at the architectural level. The W register bits indicate the half word register in the case of a half word operand or the starting half word register in the case of a word operand to be fetched from local store 42. 32 of the 64 half word locations in local store 42 correspond to the 32 half word general purpose registers available at the SPL level. Thus at the end of the microinstruction calling for an I cycle, the next microinstruction to be executed comes from an address forced on the basis of the OP code of the next SPL instruction to be executed and the V and W registers 336 and 338 are initialized based on the R1 and R2 fields as well as the OP code of the next SPL instruction to be executed. Microinstructions in the micro routine which will emulate that SPL instruction can specify use of the V and W registers 336 and 338 to address local store 42 such operands to the ALU 48. Also at the end of the microinstruction calling for an I cycle, the instruction counter 300 is incremented by one. The two low order bits of the instruction counter 300 are decoded to create four instruction enables. Each of these instruction enables controls gating of a 16 bit segment of the instruction buffer 304 onto the instruction bus 393.

When executing RR SPL instructions, only those portions of the I-cycle mechanism described so far are used, since the instruction consists of only 16 bits. RX and immediate instructions consist of 32 bits. They require usage of the information on the instruction bus 393 during the emulation of the instruction. They also require that the instruction counter 300 be incremented by one after this information has been used and before another I cycle is called. The contents of the instruction bus 393 is addressable as an operand to the ALU 48; this data may be addressed as primary register 44. When primary register 44 is specified by microinstruction only the low order 12 bits of the instruction bus are gated to the left operand bus 54; the remaining high order bits are forced to zero. Inputting the contents of the instruction bus 393 into the ALU 48 in this form is required in effective address calculation in the common RX operand fetch routine. During the effective address generation, the second half of the RX instruction contains an indirect addressing bit, an index register field specification, and a displacement field. This displacement field is the low order 12 bits of the instruction. As the first instruction of the common RX routine, the micro coder would specify as a left operand to the ALU 48, primary register 44 and as a right operand to the ALU 48 for the local store register specified by V register bit 2 and W register bits 4 through 7. This corresponds to the general purpose register specified in the R2 field of the first 16 bits of the instruction. In an RX instruction, this field is also referred to as the B2 or base field. It can be noted that when primary register 44 is specified as a source to the ALU 48, the low order 12 bits of the instruction are used as the operand. When primary register 44 is specified as the destination of the output of the ALU 48, the data or the output of the ALU 48 is loaded into the data address register 400 or the DAR. Thus, this microinstruction adds the displacement field of the instruction to the base register specified in the RX instruction and loads the results into the DAR 400. In addition, the X2 field or bits 1 through 3 of the instruction are loaded into W register bits 4 through 6 with bit 7 being forced to a zero. This initializes the W register bits 4 through 7 such that later microinstructions can address the index register 398 specified by the RX instruction. Also, the X2 field or bits 1 through 3 of the instruction are checked to see if they are zero. The results of this check and the state of the indirect addressing bit or bit zero of the instruction are used as a low order two bits of the control store address. Thus a four way branch is performed, branching on whether or not the indirect address is set and whether or not the X2 field is zero. Also, while performing the base plus displacement calculation, W register bits four through six are checked to see if they are zero. If they are, then the microinstruction decode and control 324 will force the right operand to the value of zero. This is done so that if general purpose register zero or general purpose register 8 where specified as the base register in an RX instruction, nothing is added to the displacement. The forcing of the right operand to zero during the base plus displacement operation and the forced four way branch on the hardware test of the index field equal to zero and the indirect addressing bit, provide a significant performance improvement over doing these functions in micro code, for relatively little hardware cost.

II. Program Store Interleave

Program store may be accessed as a result of a memory operation specified in a microinstruction decoded by the microinstruction decode and control 324, or as a result of an IAR request 409 from the I signal mechanism of FIG. 8, or as a result of a DMA 52 request. The address for memory operations specified by a microinstruction, a DAR request, comes from the data address register, DAR, 400. The address for a DMA request comes from the DMA address register 404. The address for an IAR request 409 comes from the instruction address register, IAR, 398. Data is transferred to the program store 14 via the CP-PS data in bus 327. Sources of this data are from the ECDB 214, local store B 42', or the left operand bus 54. Data from program store 14 is dotted onto the program store data out bus 15. This data is destined to either the program store data out register 386, the DMA data out register 388, or the instruction buffer 304.

When an access of program store occurs as a result of a DAR request, the data is loaded into the program store data out register 386 from the program store data out bus 15. This data will be gated onto either the left operand bus 54 or the right operand bus 56 via half word/word select logic 392 or half word/word select 394. If data is not to be used immediately by the ALU 48, then data is gated by half word/word select logic 392 onto the left operand bus 54 and loaded into local stores A and B, 42 and 42'. If the data from program store 14 in the program store out register 386, is to be used by the ALU 48 as the left operand, again data is gated through the half word/word select logic 392 to the left operand bus 54, loaded into the left operand register 356, and gated through multiplexer 360 to the ALU 48. If the data is to be used as a right operand, then it is gated onto the right operand bus 56 through half word/word select logic 394 to the right operand register 358 and through the digit/byte select shift logic 362 to the ALU 48.

If the data access of program store 14 occurred as a result of the DMA 52 request, then the data from the program store data out bus 15 will be loaded into the DMA data out register 388 and gated onto the ECDB 214. The DMA request may have occurred as either a read of program store 14 by the I/O Common 18 or a read of the program store by the STC 162. In the former case, a read of program store 14 by the I/O Common 18, data will be transferred to some external device via an I/O Channel. In the second case, a read program store 14 by the STC 162, data will be transferred to bulk store 6.

If the program store 14 is accessed as a result of an IAR request 409, the contents of the program store data out bus 15 will be loaded into the instruction buffer 304. The load I buffer signal 421 is also used by the I-cycle mechanism of FIG. 8, to up-date status concerning the I buffer 304.

Figure 9C:
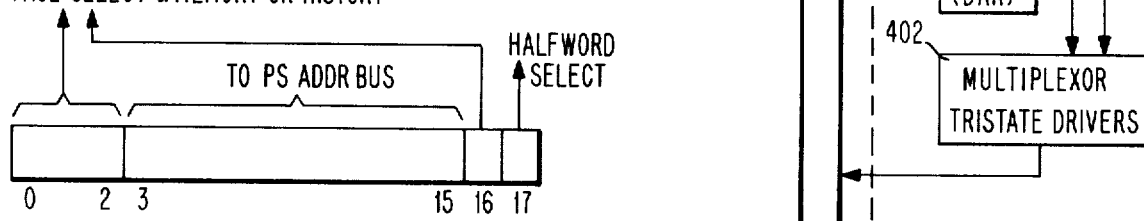
FIG. 9C illustrates the format of the program store address.
Figure 9B:
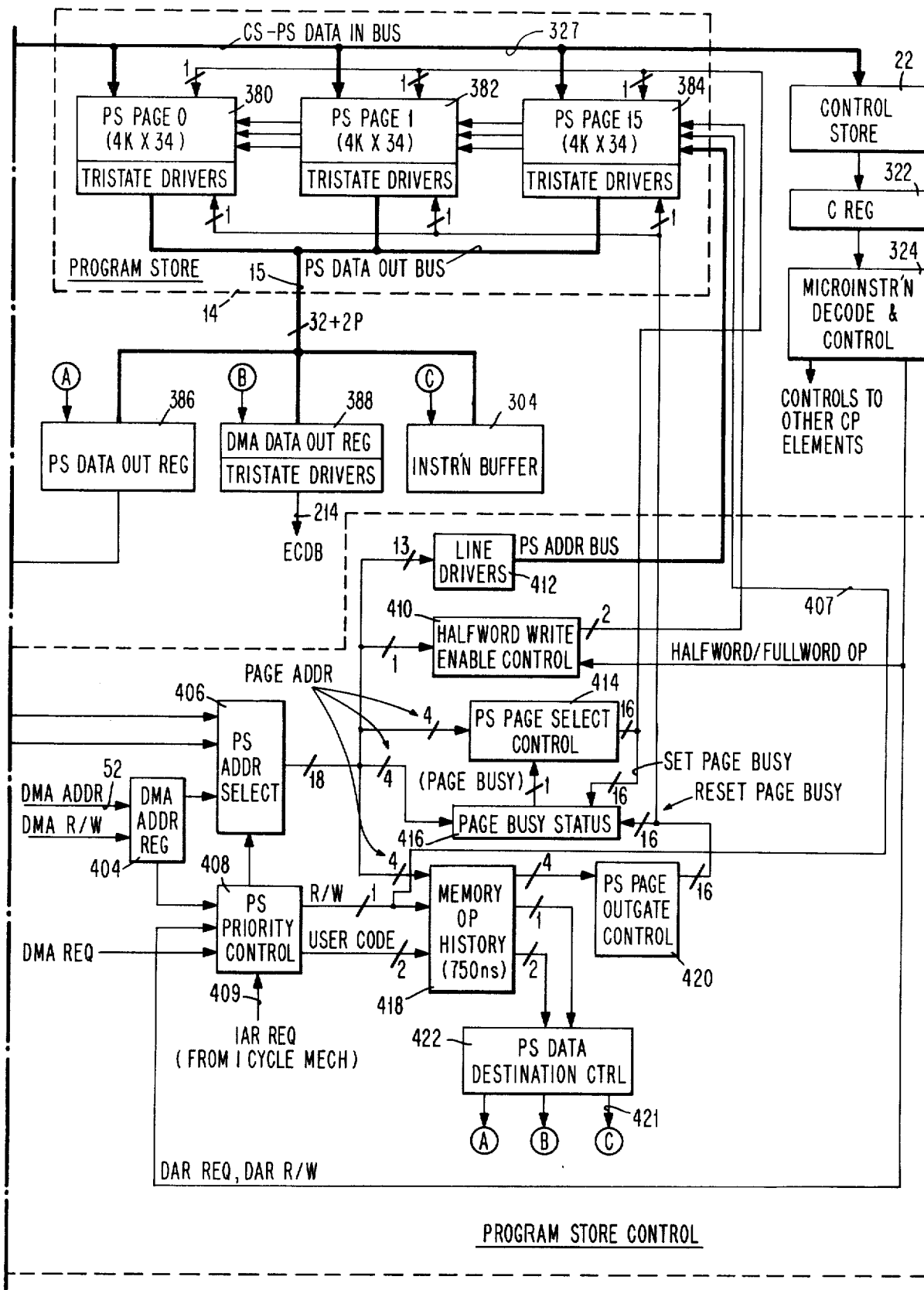

Program store 14 requests, either DMA request 52, IAR 398 request, DAR 400 request, are input to the program store 14 priority control 408. Priority control 408 will determine the next user of program store 14. It makes a priority decision once every 100 ns. It generates control to the program store address select 406 to select an address the program store 14. This address may come from the IAR 398 in the case where the program store priority control 408 acknowledges the IAR request 409, or may come from the DAR 400 in the case where the program store priority control 408 acknowledges a DAR 400 request, or may come from the DMA address register 404 in the case where the program store priority control 408 acknowledges the DMA 52 request. The format of the address at the output of the program store address select 406 is shown in FIG. 9C. Bits zero through 2 and 16 determine the page of program store 14 to be selected. These four bits are input to the program store page select control 414 and the page busy status logic 416. The page busy status logic 416 will determie whether the program store page to be addressed is presently busy performing a previously selected memory cycle. If it is not then a busy line to the program store page select control 414 will indicate that the selected page is not busy. The program store page select control 414 will generate a select line signal to the selected page. This will cause the program store page being selected to load into its input registers the output of 412, the program store address bus, and the output of line drivers 378, CPS-PS data in bus, the output of the half word write enable control 410, and the read/write line 407. The selected program store page will then go through a fixed 800 ns cycle, where it will either store the data loaded into its input register from the CPS-PS data in bus if the read/write line 407 indicated a write operation, or will access the memory array 14 at the location specified by the program store address bus if a read were selected. At the time the select was issued from the program store page select control 414, a latch is set in the page busy status 416 which will indicate that that memory page is now busy. This will inhibit the program store page select control 414 from issuing a select to that particular page for the next 800 ns. Program store page select control 414 may start memory cycles once every 100 ns as long as the memory page being selected is not busy.

The four bit page address which was input to both the program store page select control 414 and the page busy status 416 is also input to the memory OP history 418 along with the read/write and the user code from the program store priority control 408. The user code is generated by the program store priority control 408 to indicate whether the memory cycle is a result of a DAR request, an IAR request, or a DMA request, or that there is no memory cycle this 100 ns period. The memory OP history 418 is a delay line type device capable of storing information concerning a memory operation for up to 750 ns. It can contain this information for up to seven memory operations. The information concerning a memory operation is presented to the program store page out gate and control 420 logic, 650 ns after it was input to the memory OP history que. The program store page out gate control 420 decodes the program store page address into an out gate line to the particular memory page. This will cause the contents of the output of the program store page to be gated onto the program store data out bus 15 for 100 ns. The program store data destination control 422 receives the user code and the read/write bit. This is received after being delayed 750 ns from the input to the memory OP history 418. If the program store data destination control 422 determines that a read operation is resulting in the program store page out gate control 420 gating 420 gating the contents of the program store page onto the program store data out bus 15, the program store data destination control 422 will generate one of three signals to load the data from the program store data out bus 15 into either the program store data out register 386, the DMA data out register 388, or the instruction buffer 304.

Because bit 16 of the program store address is used to address a particular program store page, then one page in a group of two pages will contain all the even addresses of that group, and the second page will contain all the odd addresses of that group. This allows sequential accessing of program store 14 on a word basis to occur at an effective rate of 400 ns per word. As an example, if a DAR 400 request occurred and the DAR 400 contained an address of zero, program store page zero (380) would be selected. That module would be made busy for 800 ns, the status being kept in the page busy status logic 416. If a second DAR request occurred with the DAR 400 containing address two, program store page one would be selected. At that time, page zero is in the process of performing the first memory operation. If a third DAR request occurs with the DAR 400 containing four address program store, then page zero should be selected. Page zero, though is presently busy performing the first memory operation. Page busy status 416 will inhibit the program store page select control 414 from issuing the select to page zero for the third DAR request until the page out gate control 420 issues an out gate to page zero. This will cause the data from page zero to be gated onto the program store data out bus 15. The out gate line will also cause the busy status for page zero to be reset in the page busy status logic 416. This will then allow the program store page select control 414 to issue the select to page zero to start the third DAR request operation. If a DAR request occurred with a DAR 400 containing 16, 384, then page two would be selected. If the DAR contains 16, 386, then page three would be selected. Thus a pair of program store pages are grouped together into a 16, 384 half word memory bank so that sequential word accessing of program store has an effective cycle of one half that of an individual page.

For non-sequential accessing in a program store 14 as a result of DAR requests, that is, requests for memory cycles which will result in the accessing of separate pages, in combination with additional IAR requests and DMA requests, can result in up to eight pages being started in memory cycles in a 800 ns period. This gives an effective memory cycle of 100 ns. The operation in this mode is the same as that for the sequential accessing mode described above.

B. Arithmetic Processor

The Arithmetic Processor (AP) 4 performs the system signal processing functions. The AP is organized with the Arithmetic Element Controller (AEC) 10 controlling up to four high speed Arithmetic Elements (AE's) 20 and their Working Stores 12 in parallel. The AP is controlled by a microprogram stored in AP Control Store 30.

The AP is organized in parallel with up to four AE's 20; each AE is a pipelined processor with the computational and logical capability to process a wide variety of complex function algorithms. A single microprogram, interpreted by the AEC 10, controls both the parallel and pipelined features of the AP 4. The AP can be expanded to more than four AEs.

Figure 2:
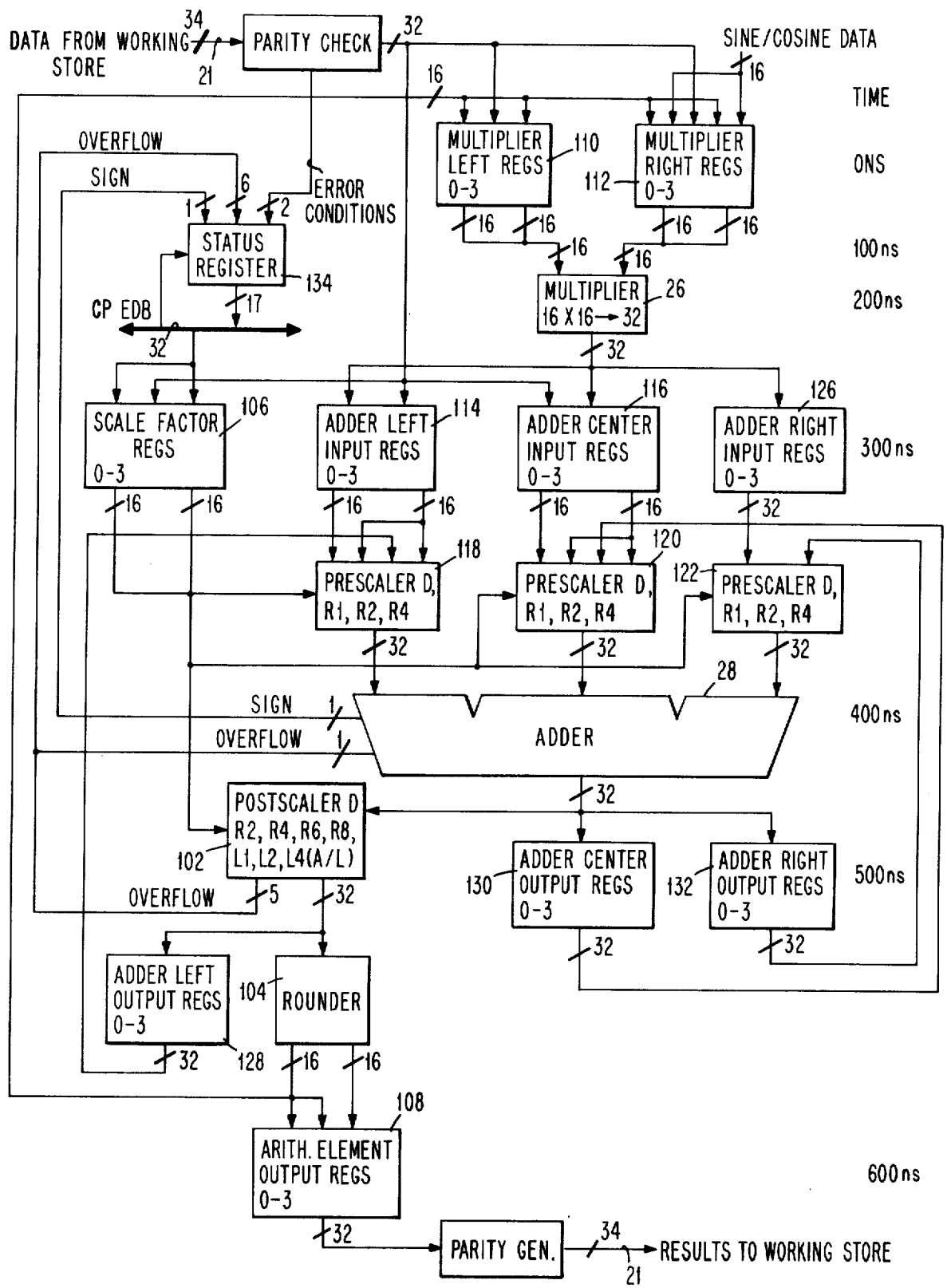
FIG. 2 is a detailed block diagram of the arithmetic element in the arithmetic processor 4.

1. Arithmetic Element: The AE 20 is the system building block for performing the arithmetic operations of signal processing algorithms. The architecture and implementation of the AE's 20 as well as the entire Arithmetic Processor 4, was motivated by the objective of providing efficient high speed execution of many different signal processing algorithms. FIG. 2 shows a block diagram of the AE 20.

The basic elements of the AE include a 16 × 16-bit two's complement multiplier 26, a three input 32-bit arithmetic logic unit 28 with independent scaling on each input, an output stage with post scaling 102 and true complement, round/truncate capability 104, and distributed local storage devices for temporary data and scale factor storage.

The AE 20 operates in a pipelined fashion at a 100 ns staging rate such that new operands enter each stage of the execution pipe every 100 ns. There are a total of six stages from the multiplier input through the adder to the output registers.

The number of stages in the pipeline strongly influences the execution of an algorithm, particularly when recursive functions are involved. Six stages was chosen to provide balance between minimizing programming complexity (minimizing the number of stages) and hardware implementation (optimizing the number of stages).

Control of the adder input scaling and post adder scaling operations is by code words stored in the Scale Factor Registers (SFR) 106. All other AE controls including addressing of the SFR 106 and all other local storage elements, arithmetic operations, and I/O transfers are generated in the Arithmetic Element Controller 10 from the stored microinstructions. The microinstructions are read and decoded every 100 ns and provide synchronous controls for all AE's 20 in an AP 4 configuration.

The local storage and processing areas of the AE are shown in FIG. 2 along with their interconnections. Each of the distributed local store register areas contains four 32-bit registers. The flow of data in the AE 20 is either through the Multiplier 26 to the Adder 28 or directly to the Adder 28. Adder output data may be looped back to either the Adder 28 or Multiplier 26 inputs or output from the AE Output Register (AEOR) 108.

The 32-bit data words from Working Store 12 can be input to the Multiplier Registers (MLR 110 or MRR 112), the Adder Input Registers (ALIR 114 or ACIR 116), or the Scale Factor Registers (SFR) 106. The SFR 106, which controls the three adder input prescalers 118, 120, 122 and the postscaler 102, also has an input from the CP 2. 16-bit operands may enter the Multiplier Register 112 from the Sine/Cosine Generator 124 or be fed back from the Adder 28 through the Rounder 104 to the multiplier registers 110 or 112. The input source selection, as well as read and write address and controls are provided by the AEC 10 for these and all other local storage registers in the AE 20.

A read operation in the SFR, MLR and MRR selects one of eight 16 bit half words stored in each of these registers. The half words read from the MLF and MRR provide multiplier and multiplicand data inputs to the Multiplier 26. The full 32-bit Multiplier output is written into the ALIR 114, Adder Center Input Registers (ACIR) 116, or Adder Right Input Registers (ARIR) 126.

The three inputs to the Adder 28 are selected from pairs of Adder Input and Adder Output Registers. The left input is selected either from the ALIR or Adder Left Output Register (ALOR) 128 for feedback. The same is true for center and right inputs. Each of these inputs is then independently shifted by one of four scale factors: direct (no shift), right 1, right 2, or right 4. The vacated high order bit positions are filled with propagated signs. Each input may also be inhibited (force zeros). When logical functions are specified by the AEC 10, the operands are not shifted.

The Adder 28 output data is stored in the ACOR 130 or AROR 132 or is passed through the Postscaler 102 operation providing shifts of direct, left 1, left 2, left 4, right 2, right 4, right 6, or right 8. The vacated high order bits are filled with propagated signs on right shifts.

The output of the Postscaler element 102 can be stored in ALOR 128 and also passed through a Rounder 104, which can round to 16 bits or pass the full 32. The resultant 16 or 32 bits are stored in the Arithmetic Element Output Registers (AEOR) 108 for transfer back to WS 12. The rounded 16 bit word can also be fed back to MLR 110 or MRR 112.

AE Detailed Description

Local Storage Elements

There are ten sets of local storage elements in the AE 20. Each consists of four 32-bit registers organized as a random access memory with independent read and write addresses and controls. The same address shall not be read and written in the same 100 nanosecond cycle. The MLR 110, MRR 112, and SFR 106 have exceptions which allow the same address to be both written into and read from during the same cycle. Since these local stores may be both read and written as 16 bit half words, a write and read operation to upper and lower halves of one address is allowable. In addition, as MRR 112 has two different half word sources, write operations to high and low halves of one address from two sources will occur without interference.

Three of the local stores (SFR 106, MLR 110, and MRR 112) are each read as eight 16-bit words. MLR, MRR, SFR, and AEOR 108 are written as either 32 or 16 bit words. The local stores (ALIR 114 and ACIR 116) are read as either 32 bit or 16 bit HIGH/LOW words and written as 32 bit words. The other local stores (ALOR 128, ACOR 130, ARIR 126 and AROR 132) are read and written as 32 bit words.

The AEOR 108 always outputs 32-bit words to Working Store 12, but various half word and full word options in forming an output data word can be specified in the AE Control Word. These are:

1. Unconditional transfer of one full word.
2. Conditional full word store — One of two pairs are selected by code and a conditional status bit used to determine which of the pair is to be stored. This status bit is the resultant sign of a previous adder operation stored in a bit 6 of the AE Status Register.
3. Conditional half word store — Same as conditional full word except the high order half word is selected and temporarily stored. When a conditional low half word instruction occurs, the low order half word is selected and transferred along with the previously selected high half word.
4. Conditional decimate store — Transfer full word if Decimate Count = 0 in AEC.

Multiplier

The 16 × 16 bit two's complement integer multiplier 26 is implemented in a three stage pipeline from MLR 110 and MRR 112 to ALIR 114, ACIR 116, or ARIR 126. The full 32 bit result is generated and stored.

The input data words contained in MLR and MRR are loaded either from the Working Store (WS) 12 or the AE Post-scaler 102 as feedback data. The MRR can also be loaded with Sine/Cosine Generator coefficients. The read and write addresses and controls to MLR and MRR are generated from the microprogram in the AEC 10, as are all other AE controls.

Prescaler

The Prescaler 118, 120, 122 or preshifter, performs a scaling operation on the adder inputs. Each of the three inputs is independently shifted by one of four scale factors (direct; right 1, right 2, or right 4). The input is also selected to be in true, complement, or absolute form. The shift value and true-complement is controlled by the Scale Factor Register (SFR) 106 whose address specified by the AE control word (AECW). In addition, the AECW directly specifies true/complement/absolute value. The two sources of true/complement are combined, i.e., when both specify complement, the operation is true. When the AECW specifies absolute value, it has precedence over the SFR 106. Each input to the Adder 28 may also be inhibited (forced to zeros) by an inhibit control.

The Prescaler data inputs come from the Adder Input Register (ALIR, ACIR, ARIR) or Adder Output Registers (ALOR, ACOR, AROR). ALIR and ACIR has an input either from external WS 12 or from the Multiplier 26. ARIR has an input from the Multiplier. ACOR and AROR contain outputs from previous adder cycles and can be selected as input instead of ACIR or ARIR. ALOR, which contains previous adder results after postscaling, may be selected as left input instead of ALIR. ARIR always is 32 bits, the full multiplier output. The other two AIRs have 32 or 16 bits. If 16 bits are selected, it is left justified with zeros filling the lower 16 bits of Adder input. Also, the three AORs contain 32 bit adder results.

Adder

The Adder 28 performs a three input 32-bit two's complement addition with overflow detection as well as logical functions of three variables. Its inputs are from the Prescalers 118, 120, 122 and its output shall be loaded in ACOR and AROR and also go on to the Postscaler 102. No more than two of the inputs should be complemented on a given add.

There are two stage delays from ALIR, ACIR, ARIR, or ALOR, ACOR, AROR through the Prescaler and Adder to ACOR or AROR. There are three stage delays from input to the register after the Postscaler output (ALOR, AEOR MLR and MRR).

Overflow detection is performed in the Adder 28 during arithmetic functions.

When logical operations (AND, OR, XOR) are specified, the Adder 28 generates one of many logical functions of the three input variables. The SFR 106 is inhibited for logical operations. The AECW provides true/- complement and inhibit control for the Prescalers. If the three inputs to the prescalers 118, 120 and 122 are designated as X, Y, and Z, the Adder 28 performs the following Boolean functions on a bit-by-bit basis across the full 32-bit operands;

a. When either AND or OR functions are specified, the Adder generates the logical function $XY + XZ + YZ$. Any variable can be complemented and any input can be inhibited. When AND is specified, the inhibit forces zeros, giving AND functions such as XY, YZ, XZ, etc. For OR functions, the inhibit forces ones, producing OR functions such as $X + Y, X + Z, Y + Z$, etc. There are a total of 34 different functions which can be generated in these formats, including all zeros and all ones.

b. When the Exclusive OR (XOR) function is specified, the Adder generates the logical function $X \oplus Y \oplus Z$. By inhibiting and complementing all combinations of inputs, a total of 14 functions can be generated, such as $X, Y, Z, X \oplus Y, X \oplus Z, Y \oplus Z$.

TABLE IV-A

AND/OR 34 Different Functions

I. Three Variables
1. $XY + XZ + YZ$
2. $\bar{X}Y + \bar{X}Z + YZ$
3. $X\bar{Y} + XZ + \bar{Y}Z$
4. $XY + X\bar{Z} + Y\bar{Z}$
5. $\bar{X}\bar{Y} + \bar{X}Z + \bar{Y}Z$
6. $\bar{X}Y + \bar{X}\bar{Z} + Y\bar{Z}$
7. $X\bar{Y} + X\bar{Z} + \bar{Y}\bar{Z}$
8. $\bar{X}\bar{Y} + \bar{X}\bar{Z} + \bar{Y}\bar{Z}$ II. Constants
1. All Zeros
2. All Ones III. Two Variables AND Function
1. XY
2. XZ
3. YZ
4. $\bar{X}Y$
5. $\bar{X}Z$
6. $\bar{Y}Z$
7. $X\bar{Y}$
8. $X\bar{Z}$
9. $Y\bar{Z}$
10. $\bar{X}\bar{Y}$
11. $\bar{X}\bar{Z}$
12. $\bar{Y}\bar{Z}$ IV. Two Variables OR Function
1. $X + Y$
2. $X + Z$
3. $Y + Z$
4. $\bar{X} + Y$
5. $\bar{X} + Z$
6. $\bar{Y} + Z$
7. $X + \bar{Y}$
8. $X + \bar{Z}$
9. $Y + \bar{Z}$
10. $\bar{X} + \bar{Y}$
11. $\bar{X} + \bar{Z}$
12. $\bar{Y} + \bar{Z}$

TABLE IV-B

Exclusive OR 14 Different Functions

Figure 10:
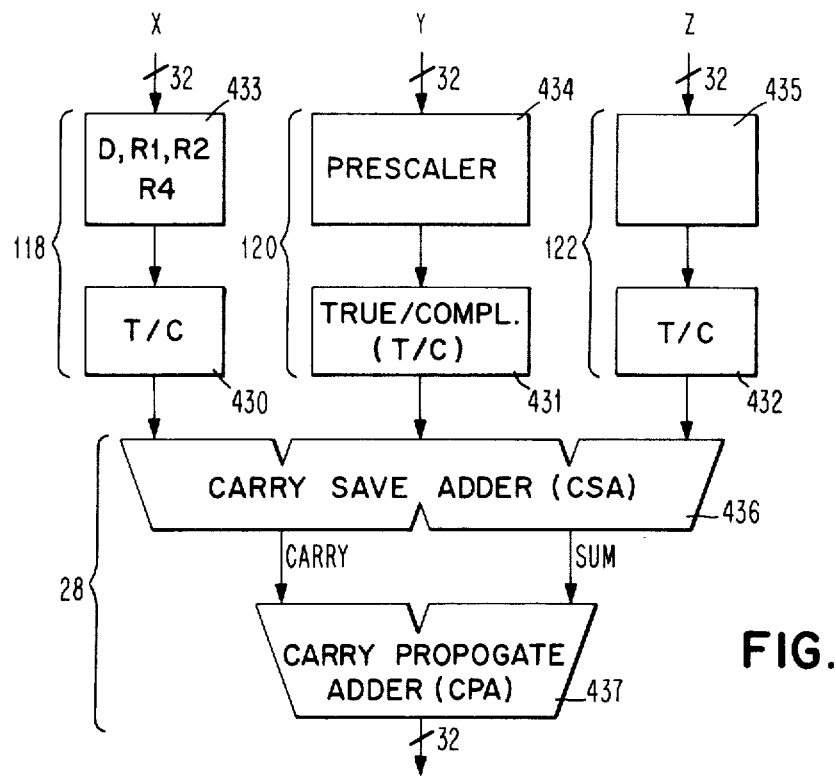
FIG. 10 is a more detailed block diagram of the adder 28 in the arithmetic element 20 of FIG. 2.

I. Three Variables
1. $(X \oplus Y \oplus Z) = (\bar{X} \oplus \bar{Y} \oplus Z) = (\bar{X} \oplus Y \oplus \bar{Z}) = (X \oplus \bar{Y} \oplus \bar{Z})$
2. $(\bar{X} \oplus Y \oplus Z) = (X \oplus \bar{Y} \oplus Z) = (X \oplus Y \oplus \bar{Z}) = (\bar{X} \oplus \bar{Y} \oplus \bar{Z})$ II. Two Variables
1. $X \oplus Y = \bar{X} \oplus \bar{Y}$
2. $X \oplus Z = \bar{X} \oplus \bar{Z}$
3. $Y \oplus Z = \bar{Y} \oplus \bar{Z}$
4. $\bar{X} \oplus Y = X \oplus \bar{Y}$
5. $\bar{X} \oplus Y = X \oplus \bar{Y}$
6. $\bar{Y} \oplus Z = Y \oplus \bar{Z}$ III. One Variable
1. X
2. Y
3. Z
4. $\bar{X}$
5. $\bar{Y}$
6. $\bar{Z}$ The implementation of the logical operations by the AE 20 is particularly unique. The AE 20 generates logic functions for up to three different words by using the true complement prescaler and carry save adder components. Referring to FIG. 2 showing the arithmetic element, the functions of the prescaler 118, 120, 122 are composed of two components as shown in FIG. 10. These components are a set of true complement gates 430, 431, 432 and some shifting gates 433, 434, 435. The adder 28 is composed of two separate components, a carry save adder 436 and a carry propagate adder 437. In FIG. 10, the inputs to each prescaler 433, 434, 435 consists of a single 32 bit bus, the desired bus being from the multiple sets of registers having previously been selected and added on to that bus. The prescaler can perform direct transfers or shifting functions, right one, right two or right four. That is the data is gated through direct or shifted right one bit position on a bit for bit basis or shifted right two bit positions or shifted right four bit positions. This same operation holds for 433, 434 and 435 in the figure. The true complement gates 430 are capable of selecting either the true value of each bit of the prescaler output or the complement of each bit of the prescaler output. When the prescaler is inhibited, nothing comes through the prescaler yielding an all zero's output. If both the inhibit function and the complement are selected, the all zero's output of the prescaler is inverted and there results an all one's or a one in each bit position of the bus out of the TC gates. When true is selected, the true value of each bit position of bus X is gated through. When complement is selected the inverse value is gated through for each bit position of bus X. When complement is selected the inverse value is gated through for each bit position of bus X. The functions of the true complement gates are the same for all three buses X, Y and Z. Each bit of the 32 bits of each bus goes through its respective set of true complement gates 430, 431 and 432 and is gated through the four possible functions true, complement, inhibit and gates one's. The output of the true complement gates 430 as shown in bus X, goes to the carry save adder 436. The adder 28 is composed of two adders. The over all three input adder 28 being actually formed of a carry save adder 436 and a carry propagate adder 437. The carry save adder takes the three input buses X, Y and Z and forms two output bits for each bit input bit position of the buses. One bit is the sum of that bit position, which is the exclusive OR of the three corresponding bits of the three buses in that bit position. The logical equation for one bit position of the sum output of the carry save adder would be $X \oplus Y \oplus Z$ where X, Y and Z are corresponding bit positions of the three buses. The other output of the carry save adder 436 is the carry output. The carry output is active whenever at least two of the three inputs to a given bit position are active. The logic equation for this would be $X \cdot Y + Y \cdot Z + Z \cdot X$. The outputs from the carry save adders then go into the carry propagate adder 437 each into their corresponding bit positions except all of the carry bits have a value one higher than the sum bits so they are shifted left one position, that is the carry's are shifted left one since they are carried into the next higher order bit position, all the way up through the 32 bit input carry propagate adder 437. The carry propagate adder then is a normal two input adder which takes two 32 bit inputs and adds them together propagating the carry upward and putting out the final sum for the addition. The unique way in which logical operations are preformed are through the use of the true complement gates 430, 431, 432; the prescaler 433, 434, 435 and the carry save adder 436. The logical functions already built into these three areas will perform the total of 48 different logical functions of the three input variables. In a simple case, the AND function of two input words such as X and Y may be formed on a bit for bit basis, by gating X through the true complement gates 430 in the true fashion, Y through its true complement gates 431 in the true fashion, with the Z inputs to its true complement gates 432 being inhibited by the prescaler to form all zero's. Both X and Y have been gated into their prescalers 433 and 434 and shifted right one bit position in order to compensate for the effective left shift of one caused by the carry output of the carry save adder 436. The outputs of the true/complement gates go to the carry save adder 436 where the carry output of the carry save adder would be the logical function X·Y. The sum input to the carry propagate adder 437 would then be inhibited so that just the carry from the carry save adder goes into the carry propagate adder and forms the final result which then is the logical equation X·Y. Looking at this from an expanded point of view, by inhibiting either X or B or Z, and AND function of X and Y or Y and Z or X and Z may simply be formed by inhibiting the non-required input. The AND function can be expanded by inverting any of the inputs. For example, we could take the complement of X in the true complement gates 430 and from the logical function $\overline{X}$·Y or by inhibiting X, complementing Y, letting Z through in the true form, one could form $\overline{Y}$·Z. AND functions involving the three variables are generated by allowing all three to come through and taking the true or complement of any of the three as required. The logical OR operations are formed in a manner similar to the AND operations, except that one of the inputs, the input not required, is forced to one's by inhibiting its prescaler and complementing. Let's take the logical OR example X+ Y. In this case, X is gated through 430 in true form and Y is gated through the true complement gates 431 in true form while Z is inhibited and complements. Both X and Y are shifted right one going through the prescalers 433 and 434. The output of the carry position of the carry save adder 436 then becomes the logical OR, X+ Y in each bit position. Once again only the carry input is gated through the carry propagate adder 437 giving the logical equation X+ Y. Once again in a similar manner, the logical OR equations X+ Y, X+ Z, Y+ Z can be formed. Also any of the inputs may be complemented such as to form the logical OR, Y+ Z. The remaining logic functions to be formed are the Exclusive OR functions. Again, take for example, the Exclusive OR of inputs X and Y. X would be gated through the true complement gates 430 in true form and Y would also be gated through 431 in true form. Z would be forced to zero by inhibiting its prescaler 435. All of the prescalers 433, 434, 435 would be enabled to shift all of the bits of each of the buses directly through without any shift. The carry save adder 436 sum output would produce the Exclusive OR logical equation X⊕ Y⊕ Z. Z, however, being a zero would reduce this logic equation to X⊕ Y. The carry propagate adder 437 would inhibit the carry input allowing just the sum input to come through, leaving a final output of the adder 437 giving the logical equation X⊕ Y. In a similar manner, X⊕ Z, Y⊕ Z can be formed with any of the inputs inverted by using the true complement gates 430, 431, 432. Functions of a single variable may simply be formed by gating just that variable through. For example, to get the complement of X, the complement would be taken in the true complement gates 430 both Y and Z would be forced to all zero's, all prescalers would shift direct, the sum output of the carry save adder 430 would then be $\overline{X}$. With the carry input to the carry propagate adder 437 inhibited the final output of the carry propagate adder would be $\overline{X}$, which inverts every bit position of bus X.

Postscaler

The Postscaler 102 provides eight possible shift positions for the Adder 28 output. They are direct; right 2, 4, 6, 8; and arithmetic left 1, 2, 4 and logical left 1, 2, 4. These are controlled by the SFR 106. The Postscaler output may be loaded into ALOR (32 bits) or gated to the Rounder 104.

Rounder

The Rounder 104 provides true/complement/absolute value/sign magnitude operation as well as round/truncate operations. The resultant output is stored in the AE Output Register 108 (AEOR) as either 32 bits or 16 bits (rounded or truncated) or sent to the MLR or MRR as a 16-bit value.

AE Output Register

The AE Output Register (AEOR) 108 is a local store containing four 32-bit words. This storage is a buffer for processed words or half words to be transferred back to Working Store 12.

The Rounder 108 is the source of inputs to the AEOR. Under control of the AEC through microinstruction format decodes, the AEOR may be loaded with a 32-bit Rounder result or a 16-bit result. The half word loads may be conditional upon the status of the Decimate Counter 150 in the AEC 10. If the microinstruction calls for a decimate operation, the high half word out of the Rounder is loaded into the high half of the specified AEOR address if the Decimate Count equals a binary 8, into the low half of the specified AEOR address if the Decimate Count equals a binary 0, and is not loaded at all for any other count. Unconditional loads of the high half word to either half or AEOR of the full 32-bit result can be specified also.

As stated above, there are several types of transfer from AEOR to Working Store 12. For conditional decimate operations the transfer is specified by the AECW to occur following a load of both high half and low half of the AEOR word. This occurs when Decimate Counte equals 0.

For conditional half word storage instructions, the high half of the AEOR location is conditionally selected first and stored in a separate register. When a conditional low half word storage instruction occurs, the selected low half word is concatenated with the previously selected high half and the resultant 32-bit quantity transferred to Working Store 12.

AE Status Register

The AE Status Register (AESR) 134 is a 16-bit register which is accessible by the Control Processor 2 as an External register over the CP-EDB 32. The AESR 134 is cleared by a write operation from the CP 2.

Nine of the 16 AESR bits are presently defined. The other seven can be reserved for expansion. Two parity bits generated on the status word for transfer on the CP-EDB 32. Parity of the CP-EDB 32 and EP-EAB is checked on the AEC 10 for all write operations to External Registers in the Arithmetic Processor 4.

The AESR 134 bits are defined as follows:

| Bit | Definition |
| --- | --- |
| 0 | Adder overflow - set by a detected overflow in the Adder if overflow detection is enabled. |
| 1 | Postscaler overflow - Set by a detected overflow caused by a left shift in the Postscaler if overflow detection is enabled. Also set if rounding or taking absolute value of a number causes an overflow in the Rounder. |
| 2-5 | Impending overflow bits - A one shall be set into any bit of the four bits below the sign which differs from the sign bit at the output of the Postscaler if overflow detection is enabled. This indicates the highest of the four which contain magnitude, and is used by the CP in determination of scale factors to prevent overflow in the AE. |
| 6 | Conditional status bit - Set equal to the sign of the Adder result of the present cycle if enabled by the AECW. Used for several conditional operations defined by the AECW. |
| 7-8 | WS Parity Error bits - Bit 7 is set when a parity error is detected in high half word of a word being read from Working Store. Bit 8 is set when a parity error is detected in the low half word. |
| 9-15 | Spare. |

None of these error status conditions cause an interrupt of the CP 2. They are set only. They are cleared by the CP 2 on a write operation after interrogation, which occurs at the completion of certain micro routines as required.

Scale Factor Control Fields (Bits 0–15)

The Scale Factor Registers (SFR) 106 is read as 16-bit words and each word contains four 4-bit control fields, one for each of the Prescalers 118, 120, 122 and the Postscaler 102.

AE Timing and Control

All timing and control signals for the AE 20 and WS 12 are generated in the AEC 10. All AE 20 operations occur at 10MHz rate, and thus its clocks and controls are generated every 100 nanoseconds by decoding the AE Control Fields of the AECW.

Data transfers between AE 20 and WS 12 occur at a 5MHz rate. The AECW fields which control these transfers occur every 200 nanoseconds. Table VI-A shows the timing relationships required between the decoded microinstruction and the execution of the data transfers between AE and WS. AE-WS read and write operation instructions occur only during even microinstruction cycles. For write operations the source is also specified during the even cycle. For read operations the destination is specified by a destination field contained in the odd cycle AECW since the destination address is not required earlier. A read or write operation may be initiated every 200 naneseconds without restriction of sequences.

A data word which is destined to a local store location in the AE may be read from that location in the following cycle. The AE contains a minimum of six pipeline stages from when WS data is transferred into MLR or MRR until a resultant operand is resident in AEOR ready for transfer back to WS.

TABLE VI-A

| | 100 ns 0 | 1 | 2 | 3 | 4 |
| --- | --- | --- | --- | --- | --- |
| Read | Even Call Read Operation | Odd Specify Destination | Even Present Address & Controls to WE | Odd Data Into AE | Even AE may use data |
| | 100 ns 0 | 1 | 2 | 3 | 4 |
| Write | Even Call Write Operation may load data for write for this cycle (may load earlier this is the last cycle data may be loaded) | Odd Specified AEOR address may not be loaded | Even 1. Present data address and controls to WS 2. Data may be into this AEOR write cycle 3. Read Operation may address same data | Odd Data written into WS | Even |

Designating the cycle in which data is read from MLR and MRR to begin a multiply as cycle 1, the flow through the AE can be followed in terms of the sequential cycles in which the results of the data read cycle 1 shall be available at any other point. There are two stage points within the multiplier and thus the result is loaded into ALIR, ACIR, or ARIR at the end of cycle 3. These local stores may be read during cycle 4 to provide inputs to the Adder 28. The Adder contains one stage point and therefore the result shall be loaded into ACOR or AROR at the end of cycle 5, and be available for feedback into the Adder during cycle 6.

Also during cycle 5, the Adder output passes through the Postscaler and reach a stage point as its output. The Postscaler control field from the SFR 106 word which was read during cycle 4 to provide Prescaler controls is buffered for one cycle so that it provides control for the Postscaler during cycle 5. During cycle 6 the Postscaler output passes through the Rounder and loaded into AEOR. It is also loaded into ALOR for feedback into the left Adder input Prescaler during future cycle. The high 16 bits out of the Rounder may be fed back to MLR and MRR during cycle 6 for use again during cycle 7 or later cycles. A transfer from AEOR to Working Store may be initiated during cycle 7.

Thus a pair of data words in MLR and MRR can be read and processed through AE for output to WS in six cycles and can be fed back into MLR or MRR in the same time.

Conditional Operations

Conditional operations can be performed in each of the several arithmetic elements 20 under the control of a single arithmetic element controller 10. The conditional operations differ from conditional branches in that conditional operations are operations with conditions which may be optionally executed in a first AE 20 independent of its operation in a second AE 20', without causing a program branch in the arithmetic element controller 10. In a conditional branch type of operation, the arithmetic element controller may or may not take a branch path in the program or from the program, dependent on the sign of a status bit in one of arithmetic elements 20. This condition bit in the arithmetic element is located in status register 134. When using multiple arithmetic elements 20 to solve several problems simultaneously where the problems are very similar, each arithmetic element may have a different status in the status register 134 and therefore each one may or may not want to execute the conditional branch operation. To circumvent the possible conflict in the operation of the arithmetic element, a conditional operation feature is included which conditionally causes the conditional execution of the operation of one AE 20 without branching the arithmetic element controller 10.

Consider, for example, the conditional operation whereby a given operand is incremented or not incremented. The arithmetic element controller sends the control signal to all of the arithmetic elements telling them to increment by one the operand coming through the adder if that particular arithmetic element's status register 134 sign bit is a one. Each of the arithmetic elements 20 will conditionally perform this operation depending upon the status bit in their own status register 134. In this way, a number of arithmetic elements 20 may synchronously perform a calculation keeping data dependent counts where the data is different in the different arithmetic elements 20, yet all arithmetic elements are performing conditional operations dependent upon their own data set. The conditional operation is implemented in the arithmetic element by taking the conditional operation control line 189 from the arithmetic element controller 10 and Anding this signal with the sign status bit 134 of each individual arithmetic element 20 at the point where the operation is to be performed.

The conditional operations are, for example, conditionally incrementing by one, conditionally selecting one of two operands as the input to an adder, the conditional adding or subracting of a given operand from some other operand or the conditional adding of one operand or inhibiting any add function for that process. The implementation of each of these conditional operations is in each of the aritimetic elements 20. The conditional increment by one takes place Anding the AEC signal 189 with the sign status signal 134 at the adder 28 in FIG. 2. The conditional select one of two operands to be an input to the adder comes by Anding the AEC signal 189 and the sign status bit 134 in each arithmetic element 20 and forming the proper out gate contriols for the adder right input register 126. The control for the conditional add or subtract of an operand comes by Anding the AEC signal 189 with the status register sign bit 134 at the true-complement controls 432 located in the prescaler 122. The conditional add or inhibit operation would also be implemented by controlling the out gates of the adder right input registers 126. 2. Working Store: Each AE 20 is supported by a Working Store 12 which consists of two separate 1K × 34 bit (32 + 2 parity) memories whose data buses, both input and output, are switchable. This arrangement permits either memory section to communicate with Bulk Store 6 through the SC 8, while the other is supporting an AE 20. The data rate into or out of each Working Store half is 34 bits every 200 ns. Since the data rate from and to the Bulk Store 6 is 34 bits at 100 ns, two Working Stores 12 are interleaved on one Bulk Store 6 data port.

Figure 11:
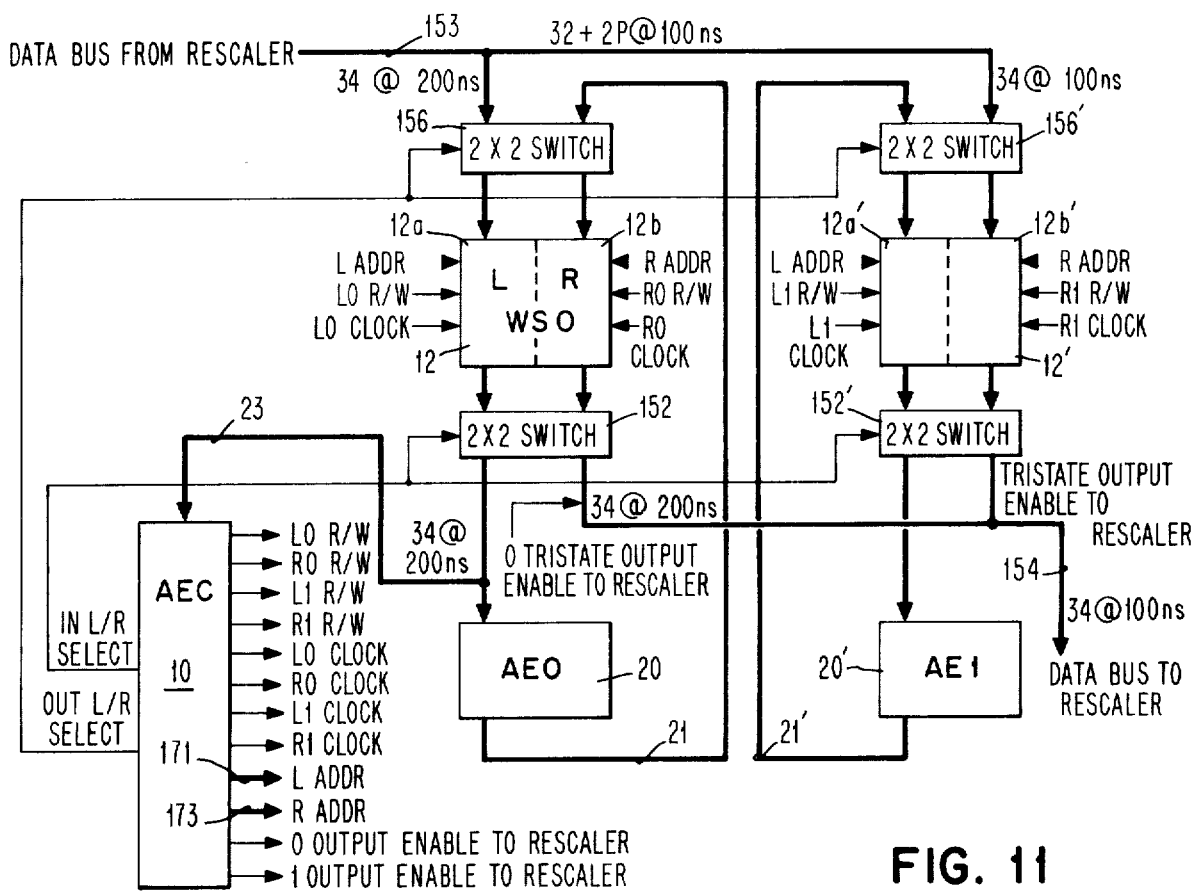
FIG. 11 is a detailed block diagram of the interconnection of the arithmetic element and two working stores.

The interface of two AEs 20 and 20' with their Working Stores 12 and 12' is as shown in FIG. 11. The control lines (Read/Write, Clock, Address, and Output Enable) to each Working Store half and the input and output switch select lines are generated by the Arithmetic Element Controller (AED) 10 for interleaving and selection of the applicable sections.

Prior to initiation of a write operation, the Left/Right Input Select line is switched to the appropriate state. The Data In from the AE 20 is routed to either the left or right 1K × 34 memory array 12. For a read operation, output data is clocked into an output buffer register. The output switch 152 will have been set sometime prior to reading out of data, so that the output data from either or both Working Store 12 halves will be available to the AE 20 or the data bus 154 back to Bulk Store 6 through the SC 8. Each half (1K × 34) of one Working Store 12 is separately controlled and addressed so normal operations allow one half to be writing data and the other to be reading data, both at different address locations. The output of the switch 152 back to Bulk Store, is a tristate drive so that two complete Working Stores 12 can be bused together in order to interleave data at 100 ns intervals.

AE Working Store Module

The Working Store 12 module consists of two 1K × 17 bit memories. Each module contains 34 1K bit bipolar memory devices and support logic. Two Working Store modules are used in parallel to obtain the required two 1K × 34 bit memories for each Working Store 12, which interface directly with the Arithmetic Element (AE) 20 and the Storage Controller (SC) 8.

Each module half organized as 1K × 17 bit memory is designated L (left) or R (right). Each memory has separate address and control lines. The 2 × 2 switch 156 allows input data to be switched between either memory, that is:

a. Input data from the SC 8 to the left memory and Input data from the AE 20 to the right memory.

b. Input data from the SC 8 to the right memory and Input data from the AE 20 to the left memory.

Input address and data are clocked into registers. The Address/Data Clock (CLK) is combined with the R/W signal to generate a read or write command to the memory 12.

Output data from the memory 12 is clocked into a register and presented to the output 2 × 2 switch 152. The output switch 152 allows for a similar data transfer as the input switch 156.

The data throughput of each half of each memory 12 is 34 bits at a 200 ns rate. Tristate drivers are provided for the data bus 154 running from the output 2 × 2 switch 152 to the SC 8. Higher data transfer rates are obtained when dot ORing several Working Stores 20 on this bus 154. The other output data port, which connects to the AE 20, does not utilize tristate drivers, so memory interleaving cannot be utilized.

3. Arithmetic Element Controller: The AEC 10 controls the AE 20, as well as Working Store 12 data transfers and the generation of trigonometric coefficients for use in signal processing algorithms. Up to four AE's 20 are controlled by the AEC 10 with all AE's 20 executing a single program on different data sets in parallel. Variations in program execution is provided by conditional operations where each AE 20 selects the function it performs based on a data dependent conditional status bit.

Except for AEC Initial Program Load and task initialization, which are controlled by the CP 2, the AEC 10 provides full processing control over the Arithmetic Procesor 4, including all AE-WS transfers, and the AP Control Store 30. This frees the CP 2 from signal processing tasks, allowing it to be utilized for supervisory and data management functions.

The AEC 10 consists of three functional areas which combine to provide control over Arithmetic Processor 4 signal processing. They include microinstruction decoding and AE control generation, address and control generation, and the Sine/Cosine Generator 124. The AP Control Store 30 nominally contains 2048 68-bit instructions (64 + 4 parity), which are accessed at a 100 ns rate to provide controls for the Arithmetic Processor 4.

The address generation section receives Working Store (WS) 12 address and control information from two sources: the decoded microinstruction for transfers to and from the AE 20; and the Storage Controller (SC) 8 for transfers from the SC 8. The WS 12 left/right selection and address source selection are made on a priority basis. Working Store 12 operates at an iterleaved 200 ns cycle rate The Sine/Cosine Generator 124 operates and a 200 ns cycle rate taking an incremented angle input and converting it to a trigonometric coefficient using a combination of table loop up and interpolation techniques.

Figure 12:
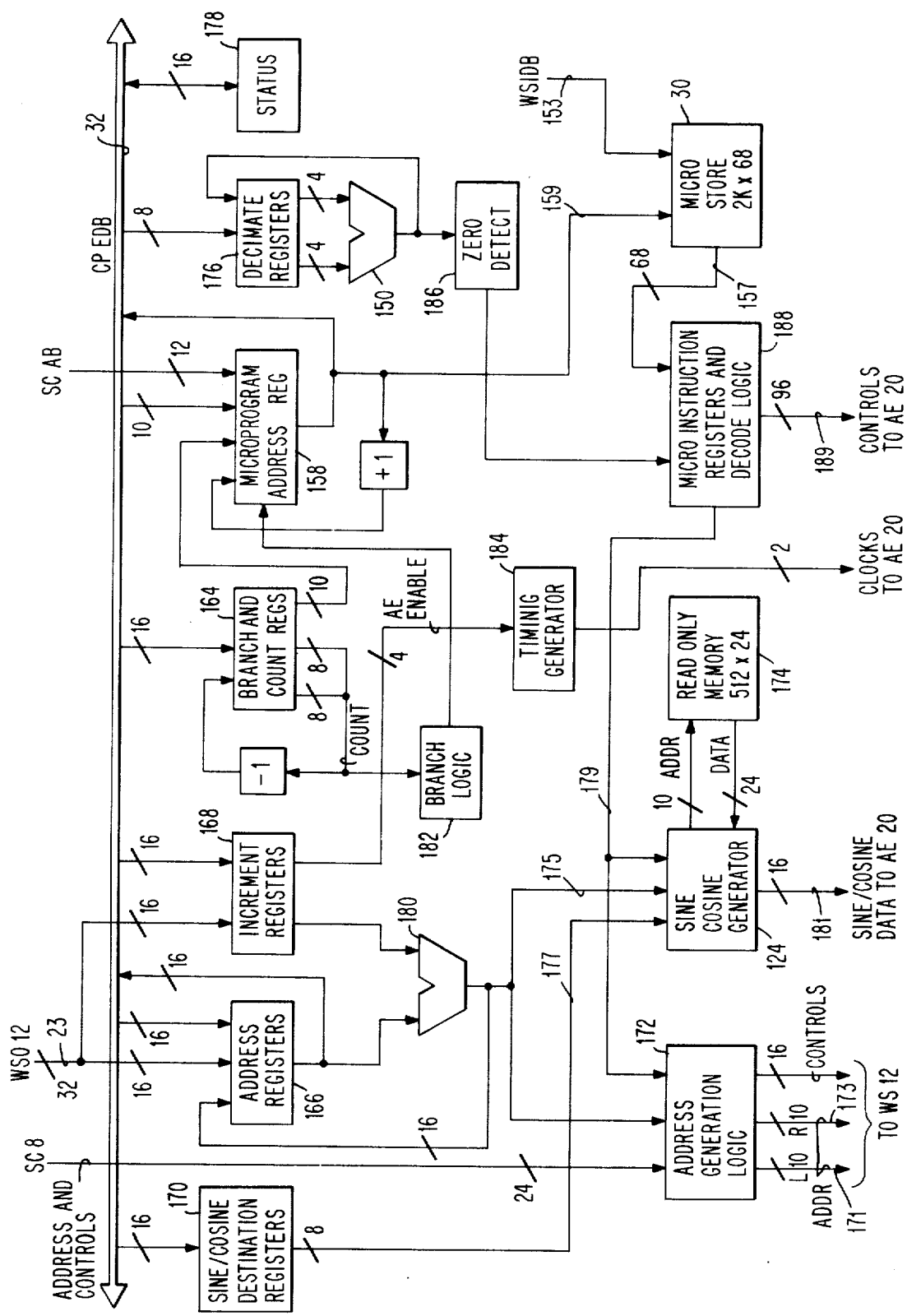
FIG. 12 is a detailed block diagram of the arithmetic element controller.

The Arithmetic Element Controller is shown in FIG. 12.

Microprogram Address Register (MAR)

The MAR 158 contains a 12-bit word which shall be used to address the Micro Store 30. The Micro Store 30 is organized as two 2048 word by 68 bit storage elements. One contains the 68 bit microinstructions which are to be read and decoded during even cycles (even numbered instructions) and the other contains the microinstructions which are to be accessed during odd cycles. The high 11 bits of the MAR 158 addresses 1024 locations of each storage element.

When the AEC 10 is running the high order 11 bits of MAR 158 is incremented by one every 200 nanoseconds to specify even address, and a clock line 200 nanosecond period shall provide the twelfth bit. When branching is specified, an 11 bit branch address is loaded into the MAR 158 at the beginning of the second following even cycle (i.e., the fourth cycle after branch is specified).

During Initial Program Load (IPL), the STC 162 provides a 13-bit address for writing 34-bit words into Micro Store 30. The low order 10 bits specify the address for 1024 words on each Micro Store 30 module. The high order 3 bits are decoded to specify which of the eight modules is to be written.

Thus, during IPL, the Micro Store 30 is achieved as 8K-34bit words, using 13 address bits. During AECW execution, the Micro Store 30 is addressed and read as 4K 68-bit words, using 11 MAR 158 bits and one clock signal.

During initialization of the Arithemtric Processor 4, the AEC 10 registers are loaded by the CP 2, including the MAR 158. The MAR 159 is loaded with a microprogram address which is used as the program starting address when the AEC 10 receives a start command from the CP 2.

Branch and Count Registers (BCR)

There are 16 BCR 164 addressable by the branch control fields in the even cycle AECW. Eight registers (8-15) are 32-bits wide and contain four fields. They are an 8-bit count, an 8-bit reset value, an 11-bit branch address, and 5 spare bits. The other eight registers (0-7) are 16-bits wide and contain an 11-bit branch address and 5 spare bits.

Register 0 -7 are used for unconditional branching, or a conditional branch on a specified AE Conditional Status Bit. Registers 8-15 are used for a conditional branch on non-zero count. If the count field is non-zero, the branch address is loaded into MAR 158 as the next even address and the count field decremented by one. If the count is zero. the branch is not taken and the 8-bit count field is reset from the reset field. A branch can be to any even instruction in the Micro Store 30.

Address Registers (AR) 166 and Increment Registers (INCR) 168

There are two register stacks which contain eight 16-bit AR 166 and eight 16-bit INCR 168. These registers are loaded in pairs from WS 12. The transferred pair of words can be either two addresses or an address/increment pair. The AECW which commands the operation specifies the destination addresses of the data. The CP 2 may also load any of these registers one at a time.

When data is read from WS 12, a single 32 bit transfer is made and the two quantitites simultaneously loaded.

The address and increment words are used for two types of operations: (1) WS addressing; (2) Sine/Cosine Generator argument. During even cycles they are used for Ws addresses for storage operations. During odd cycles the full 16 bits of address and increment are used to determine Sine/Cosine argument.

For WS addresses, only 11 bits of address and increment are used. Two other bits specify the WS address field size for wrap-around, so that WS operations can be performed in variable sized working areas. These are: 512 (9 Bits), 1K (10 Bits), and 2K (11 Bits).

In addition to the AR 166 and INCR 168, there are four 18-bit Sine/Cosine Destination Registers (SCDR) 170. These are addressed and accessed along with the AR 166 and INCR 168 by the Sine/Cosine Control fields of the AECW during odd cycles. The eight bits are used as follows:

Bits 0-1, 2-3, 4-5, and 6-7 identically specify the generated functions to be destined to AEs 0, 1, 2, and 3 respectively. This provides expansion capability to four AEs 20. For any AE 20, the two bits are decoded to control both generation and destination of trigonometric coefficients.

TABLE V

| Bit 0 | Bit 1 | Definition |
|---|---|---|
| 0 | 0 | No operation. |
| 0 | 1 | Generate sine and cosine, destine to high and low halves, respectively, of MRR 112 pair specified by odd cycle AECW. |

TABLE V-continued

| Bit 0 | Bit 1 | Definition |
|---|---|---|
| 1 | 0 | Generate cosine only, destine to MRR 112 specified by odd cycle AECW. |
| 1 | 1 | Generate cosine and sine, destine to high and low halves, respectively, of MRR 112 pair specified by odd cycle AECW. |

These bits are used as control for the Sine/Cosine Generator 124. The decodes are ORed to determine which functions are to be generated. The results shall then be destined to whichever AE's 20 are designated.

Address Generation

Working Store 12 addressing and control is generated by this function. Every 200 nanoseconds, during the even cycle, the microinstruction provides address register selection, source/destination addresses, and transfer type. The address registers 166 are eight pairs of 16-bit words containing address and increment data. Every even increment amount may be: no change, add the contents of the increment register 165, add the decoded increment value, subtract the decoded increment value.

The generated address, along with read/write control and source/destination addresses, provides WS 12 control for transfers to and from the AE's 20. The specified transfer and address is applied to all AE-WS combinations in parallel.

Data transfers between WS 12 and SC 8 is also controlled by the Address Generation logic 172. The SC 8 provides address and control data and a request line for access to the left or right of a specified WS 12. The AEC 10 determines if that WS 12 half is presently used by the AEC 20 and if not, sends an acknowledge to the SC 8 initiating a block data transfer, either read or write. The AEC 10 does not interfere with this transfer until it is completed. Note that for WS-SC transfers, different WSs 12 and different halves may be performing different operations with different addresses, i.e., the Working Stores 12 are treated independently for SC 8 transfers, but in common for AE 20 transfers.

Sine/Cosine Generator

The Sine/Cosine Generator (SCG) 124 is provided to calculate trigonometric constants to full 16-bit precision using 16-bit arguments. Values of angles and increments are stored in the address 166 and increment 168 registers and selected by the Sine/Cosine Generator Control fields of the AECW during odd microinstruction cycles as input arguments to the SCG 124.

Figure 13:
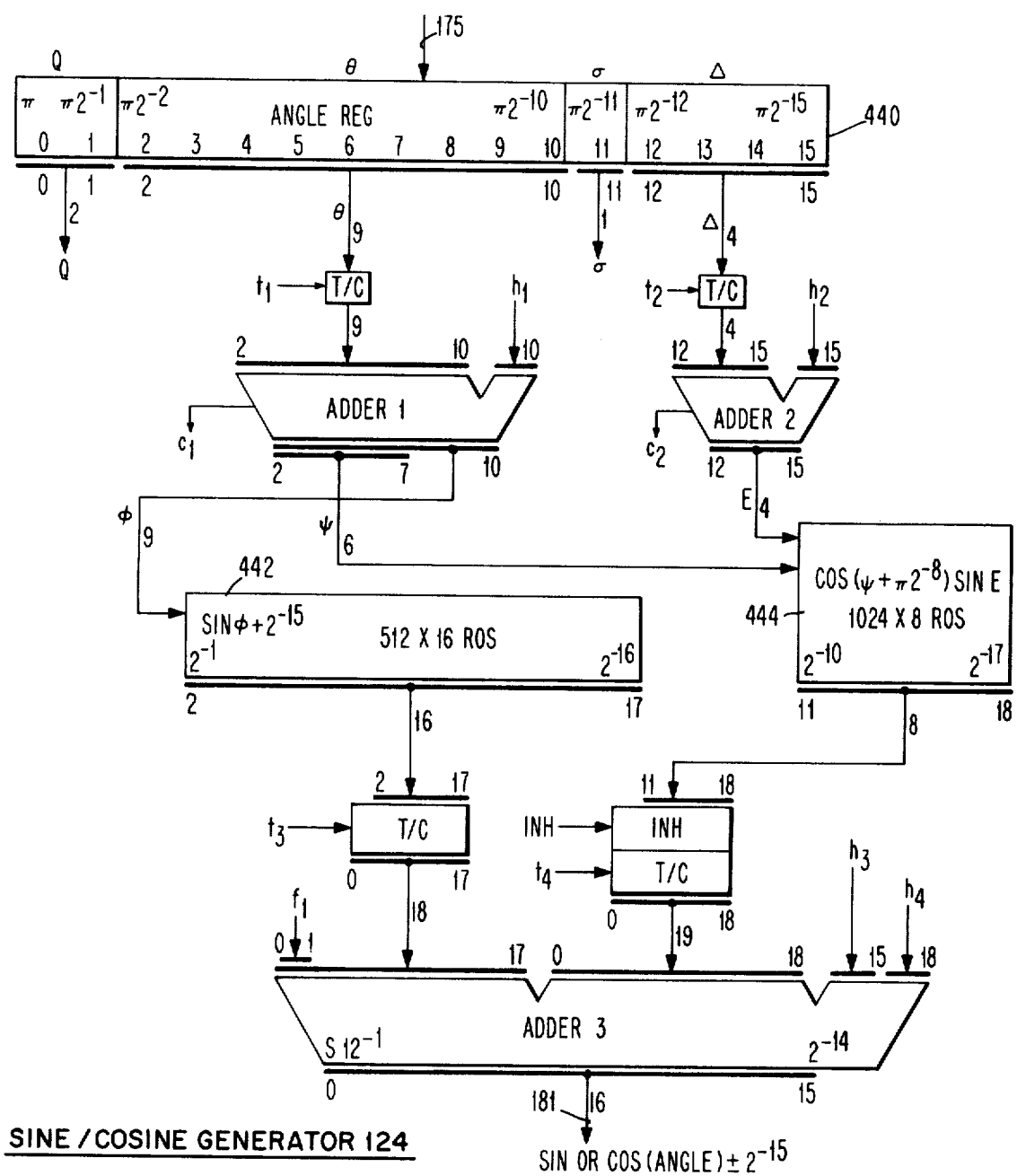
FIG. 13 shows the Sine-Cosine Generator.

FIG. 13 shows a diagram of the SCG 124. Values of the sine function are stored in a read-only memory (ROM) 174 as 512 increments from sin 0° to sin 90°, with 16-bit magnitude. Another ROM contains 1024 8-bit values of a non-linear interpolation function corresponding to the angle.

The 16-bit argument which is provided from the addresss registers are used to address these ROMs 442 and 444 to look up and combine the addressed values to create the required sine or cosine function. The high order two bits of the argument are interpreted as quadrant and used to generate true/complement controls for the addresses of the ROMs 174 and the accessed values. Th accessed Sine/Cosine Destination Register 170 also provides control. If both sine and cosine values are specified, the cosine is generated first, then the sine, both using the same argument. If only cosine is requested, that one only is generated. Table VI-D shows a timing diagram for the Sine/Cosine Generator.

The Sine/Cosine Generator 124, as shown in FIG. 13, operates on a 16-bit angle argument to produce a sine or cosine to 16-bits precision. The 16-bit argument represents $2^{16}$ equally spaced points in $2\pi$ radians or 360°. The first two bits specify the quadrant with the remaining 14 bits breaking the quadrant into $2^{14}$ divisions of about 20 arc seconds. The rate of generation is one sine or cosine generated every 200 ns.

The following equations show the approximation and interpolation techniques used in this Sine/Cosine Generator 124.

The angle register 440 contains a 16-bit argument. The two Q bits, 0-1, contain the quadrant and bits 2-15 contain the angle.

The angle is equal to:

$$\text{Angle} = \theta + \sigma + \alpha \quad (1)$$

which may be defined as
$$\text{Angle} = \phi \pm E \quad (2)$$

where, if $\sigma = 0$
$$\text{Angle} = \theta + \alpha \quad (3)$$

and if $\sigma = 1$, $$\text{Angle} = (\theta + \pi 2^{-10}) - (\pi 2^{-11} - \Delta) \quad (4)$$

defining $\phi$ and E.

Now
$$\text{Sin (Angle)} = \sin(\phi \pm E) \quad (5)$$

which may be approximated as
$$\sin(\text{Angle}) \simeq \sin \phi \pm \sin E \cos \phi. \quad (6)$$

The five high-order bits of $\phi$ may be defined as $$\psi = \phi_{2-7} \quad (7)$$

and the further approximation made $$\sin(\text{angle}) \simeq \sin \pm \sin E \cos(\psi + \pi 2^{-8}) \quad (8)$$

with the total error of $$\text{Error } 2^{-15}.$$

Equation (8) is the function implemented in the Sine/Cosine Generator 124. ROS 442 has $2^{-15}$ added to its value to provide for final result round off.

The resultant 16-bit sine or cosine function uses two's complement negative number representation. The high-order bit is the sign bit and the next most significant bit has a value of 1 in order to exactly represent +1, the value of the sine function at $\pi/2$ or the cosine at 0. The least significant bit of the result has a value of $2^{-14}$. The error is less than three-fourths of the least significant bit or $4.3 \times 10^{-5}$.

This design has the speed of a straight forward table look up implmentation, but requires only about one-twentieth the storage. It also has the accuracy of a precision interpolation method, but eliminates the cumbersome and time consuming multiplication requirements.

Decimate Register (DECR)

The DECR 176 of FIG. 12 is an 8-bit register loaded by the CP 2 as an external register. It contains two 4-bit fields, one a count and one a decrement value. Whenever a decimate operation is specified, the count is decremented and the result tested. When the count is a binary eight, the conditional loading of the high half of an AEOR 108 location is enabled. When the count is a binary zero, the conditional loading of the low half of that AEOR 108 location is enabled and an ensuing transfer of the contents of that location to Working Store 12 enabled.

AEC Status Register (AECSR)

The AESCR 178 is a 16-bit register which is both written and read by the CP 2 as an external register. Only seven bits are defined, the other nine shall be spare.

The bits are defined as follows:

| Bit | Definition |
|---|---|
| 0 | Stop/run bit - This bit is set by the AEC 10 when a stop command is decoded from the AECW. This causes the Arithmetic Processor 4 to stop. The CP 2 resets this bit. If it was stopped, the Arithmetic Processor 4 restarts when the CP 2 resets this bit. |
| 1 | Left/right stat bit - This bit is exclusive ORed with the high order WS 12 address bit. This bit is set by the CP 2 and is used to switch WS 12 halves to be used for AE 20 operations. |
| 2-3 | Micro Store Parity Error - Bit 2 or 3 is set when a byte parity error is detected within the top 34 or bottom 34 bits of the AECW respectively. When an error is detected, the AEC 10 retries the Micro Store 30 read up to four times. If the error persists, the AEC 10 stops and issues an interrupt to the CP 2. If the error condition goes away on one of the retries, the AEC 10 continues execution of the microprogram. |
| 4 | Force AE Parity Error - Used by diagnostics to check parity checkers. Set to 1 to enable AE parity error generated on data to Working Store 12. |
| 5 | Stop on Compare - When set, enables stopping of AEC 10 when MAR 158 address is equal to value set in Compare Address register. |
| 6 | Single cycle enable - With the AEC 10 stopped, a single microinstruction execution step (100 ns) is enabled when this bit is set. The AEC 10 steps one cycle, then stops and resets this bit. |
| 7-15 | Spare |

Bit 6 in the AEC Status Register 178 is defined to be a Single Cycle Enable. The CP 2 sets this to cause the AEC 10 to step one Micro Store address and one 100 ns cycle of the AP. The AEC resets this bit after single cycle is accomplished.

All timing signals used in the AEC 10 shall be generated from four 10 MHz phase clocks which are provided to the Control Subunit by the CP 2.

Microinstruction control words are read and decoded every 100 ns to provide AE 20 controls. Other AEC 10 functions including Sine/Cosine Generator 124 branching, and storage transfer operations operate at a 200 ns rate.

Even cycle operations include storage operation commands (WS 12 read or write) along with a specification of AE register source for writes. In addition the AR 166 and INCR 168 containing WS 12 address for the specified operation are called out. Branch operations are specified in even cycles.

Odd cycle operations include specification of AE 20 or AEC 10 register destinations for data read from WS 12 as a result of the previous even cycle instruction. Sine/Cosine Generator 124 operations are specified in odd cycles also.

The SC 8 provides Micro Store 30 address and control loading of AEC 10 registers via the CP-EDB 32 during initialization. The CP 2 controls the start of the Arithmetic Processor 4 and shall receive interrupts from the AEC 10 when processing is complete or under certain error conditions which cause interrupts.

Table VI-B shows the required timing delays for a read of Working Store 12 to AE 20.

When a read of Working Store 12 to AEC 10 is initiated, its timing shall be as shown in Table VI-C.

Table VI-D shows the required timing delays from a command to generate a sine and/or cosine until the results are loaded into the specified AEs 20, ready for use.

TABLE VI-B

| | 100ns 0 | 1 | 2 | 3 | 4 |
|---|---|---|---|---|---|
| Read | Even<br>Call Read Operation | Odd<br>Specify Destination | Even<br>1. Present Address and Control To WS<br>2. Next WS Operation May Be Called | Odd<br>Data Into AE | Even<br>AE May use Data |
| Write | 100ns 0<br>Even<br>Call Write Operation May Load Data for Write for This Cycle (May Load Earlier, This is The Last Cycle Data May Be Loaded) | Odd<br>Specified AEOR Address May Not Be Loaded | Even<br>1. Present Data, Address and Controls to WS<br>2. Data May Be Loaded Into This AEOR For Next Write Cycle<br>3. Read operation may be called to read out data now being written | Odd<br>Data Written Into WS | Even |

TABLE VI-C

| 0 | 1 | 2 | 3 | 4 | 5 | 6 | 7 |
|---|---|---|---|---|---|---|---|
| Even<br>Call Read Into AEC | Odd | Even<br>May Call Read-Write | Odd<br>Data Into AEC Common | Even<br>May Use Data In AEC | Odd | Even | Odd |

TABLE VI-C-continued

| Common | Operations |
|---|---|
| | But: |
| | 1. If calling R/W and Increment Address, the proper data will be addressed, but incremented address will not be loaded into AR |
| | 2. Can Call R/W without Increment |

TABLE VI-D

| 2 Odd | 3 Even | 4 Odd | 5 Even | 6 Odd | 7 Even | 8 Odd | Even |
|---|---|---|---|---|---|---|---|
| Call Sine/Cosine Operation | | | | Transfer Cosine To AE. Next Sine/Cosine Op. May Be Called | AE May Use Cosine Data | Transfer Sine To AE | AE May Use Sine Data |
| Call Cosine Operation | | Next Sine/Cosine Operation May Be Called | | Transfer Data To AE | AE May Use Data | | |

AEC Microinstruction ently on even and odd cycles, being alternately used for memory controls and Sine/Cosine Generator controls.

TABLE VII

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Left Multiplier Input MLR 0-3 | | | Right Multiplier Input MRR 0-3 | | | Multiplier Destination None ALIR ACIR ARIR | | | 0-3 | Function Inhibit True Complement Absolute Value | | Left Adder Input ALIR ALIR(LO) ALIR(HI) ALOR | | Source | 0-3 |
| | HI LO | | | HI LO | | | | | | | | | | | |

| 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|
| Center Adder Input | | | | | | Right Adder Input | | | | | | Scale Factor/Logic Select | | | Adder Function |
| Function Inhibit True Complement Absolute Value | | Source ACIR ACIR(LO) ACIR(HI) ACOR | | 0-3 | | Function Inhibit True Complement Absolute | C+1 C sel. C+/− Spare | | Source ARIR AROR | | 0-3 | SFR 0-3 Spare | | HI LO AND OR XOR Spare | Arith metic Logic |

| 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|
| Adder Result Destination AEOR ALOR ACOR AROR MLR/MRR MLR/MRR, ALOR MLR/MRR, ACOR MLR/MRR, AROR | | | Adder Result Register A 32 16 AEOR 0-3 MLR MRR | | | HI LO HI LO | B AEOR Conditions if AEOR selected Register 0—3 otherwise | | | Rounder Function Sign Magnitude True Complement Absolute Value | Cntl no round round | Control No-op Stop Set AE Stat Set Overflow | | | Spare |
| | | | | | | | | | | | | | | | |
| | | | | | | | | | | | | | | | |
| | | | | | | | | | | | | | | | |
| | | | | | | | | | | | | | | | |
| | | | | 0—3 | | | | | | | | | | | |

The 64-bit AEC 10 microinstruction is divided into two sections. The first 48 bits control all the operations of the pipelined AE 20 every 100 and cycle. The remaining 16 bits control storage, branching, and Sine/Cosine generation. Since these operations occur at a 200 ns rate, the 16 bits controlling them can be interpreted differently on alternate cycles, effectively increasing the microinstruction length.

The Arithmetic Element Control Word (AECW) shown in Table VII provides all controls for the AEC 10, AE's 20, and WS's 12 during execution of stored microprograms. The last 16 bits are interpreted differ-

AE Control Fields (Bits 0-47)

Table VII shows the first 48 bits of the AECW, which shall be used for AE control. Following is a description of the several fields.

1. Left multiplier input field (bits 0-2). Specifies as Left Multiplier input one of eight 16-bit half words stored in MLR 110.

TABLE VIII-A

| Code Point | MLR Address |
|---|---|
| 0 | MLR 0 (High half) |
| 1 | MLR 0 (Low half) |
| 2 | MLR 1 (High half) |

TABLE VIII-A-continued

| Code Point | MLR Address |
|---|---|
| 3 | MLR 1 (Low half) |
| 4 | MLR 2 (High half) |
| 5 | MLR 2 (Low half) |
| 6 | MLR 3 (High half) |
| 7 | MLR 3 (Low half) |

2. Right multiplier input field (bits 3–5). Specifies as Right Multiplier input one of eight 16-bit half words stored in MRR 112.

TABLE VIII-B

| Code Point | MRR Address |
|---|---|
| 0 | MRR 0 (High half) |
| 1 | MRR 0 (Low half) |
| 2 | MRR 1 (High half) |
| 3 | MRR 1 (Low half) |
| 4 | MRR 2 (High half) |
| 5 | MRR 2 (Low half) |
| 6 | MRR 3 (High half) |
| 7 | MRR 3 (Low half) |

3. Multiplier destination field (bits 6–9). Specifies the destination register, if any, for the 32-bit result of the Multiplier 26.

TABLE IX

| Code Point | Destination | |
|---|---|---|
| 0–3 | None | |
| 4–7 | ALIR 114 | 0–3 |
| 8–11 | ACIR 116 | 0–3 |
| 12–15 | ARIR 126 | 0–3 |

4. Left adder input function field (bits 10–11). This field, in conjunction with the left input true/complement bit from the SFR 106, specifies the form of the left adder input.

TABLE X

| Code Point | Left T/C Bit (SFR) | Function |
|---|---|---|
| 0 (Inhibit) | Don't care | Inhibit input |
| 1 (True) | 0 (True) | True input |
| 1 (True) | 1 (Complement) | Complement input (One's complement of operand, hot 1 into low bit of adder) |
| 2 (Complement) | 0 (True) | Complement input |
| 2 (Complement) | 1 (Complement) | True input |
| 3 (Abs. Value) | Don't care | Absolute value of input. (True if input is positive, complement if input is negative.) |

5. Left adder input source field (bits 12–15). This field specifies as left adder input one of four words in ALIR 114, or one of eight half words in ALIR 114, or one of four words in ALOR 128.

TABLE XI

| Code Point | Source | | |
|---|---|---|---|
| 0–3 | ALIR 114 | 0–3 | |
| 4–7 | ALIR 114 | 0–3 | (Low half) |
| 8–11 | ALIR 114 | 0–3 | (High half) |
| 12–15 | ALOR 128 | 0–3 | |

Left justified, 0's into low order 16 bits.

6. Center adder input function field (bits 16–17). This field operates on the center adder input in the same manner as described for the left adder input in 4.

7. Center adder input source field (bits 18–21). The field operates on the center adder input in the same manner as described for the left adder input in 5.

8. Right adder input function field (bits 22–24). This field specifies arithmetic form of right operand into Adder 28 as well as conditional operations. True/Complement operations are cascaded with the right T/C bit from the SFR 106 in the same manner as described in 4.

TABLE XII

| Code Point | Function |
|---|---|
| 0 | Inhibit input. |
| 1 | True input (complement if SFR T/C bit = 1). |
| 2 | Complement input (true input if SFR T/C bit = 1). |
| 3 | Absolute value of input. |
| 4 | Conditional hot one (input is inhibited, force one into low bit of Adder 28 if AE Status Register Bit 6 = 1). |
| 5 | Conditional input word select - the high two bits of Right Adder Input Source Field (bits 25–27) specify a pair of addresses. One of these operands is selected by using Bit 6 of the AE Status Register 134 as the low order address bit. |
| 6 | Conditional true/complement of selected operand. Input is complement if AE Status Register Bit 6 = 1. |
| 7 | Spare |

9. Right adder input source field (bits 25–27). This field specifies as right Adder input one of four words stored in either ARIR 126 or AROR 132.

TABLE XIII

| Code Point | Source | |
|---|---|---|
| 0–3 | ARIR 126 | 0–3 |
| 4–7 | AROR 132 | 0–3 |

10. Scale factor register/logical function sheet field (bits 28–30). This field shall be interpreted two ways depending on the Adder Function field (bit 31). When bit 31 is a zero, arithmetic functions are specified and bits 28–30 specify one of eight 16-bit half words to be used from the four 32-bit Scale Factor Registers 106.

TABLE XIV

| Code Point | Source | | |
|---|---|---|---|
| 0, 2, 4, 6 | SFR 106 | 0–3 | (High half) |
| 1, 3, 5, 7 | SFR 106 | 0–3 | (Low half) |

When bit 31 is a one, logical operations are specified in the Adder 28 and bits 29–30 are interpreted as follows:

TABLE XV

| Code Point | Function |
|---|---|
| 0 | AND |
| 1 | OR |
| 2 | Exclusive OR |
| 3 | Spare |

For logical operations, bit 28 is not used and the SFR 106 are not used. The shift values for Prescalers 118, 120, 122 and Postscalers 102 shall be forced to produce no shift.

11. Adder function field (bit 31). This field specifies the Adder function as well as the interpretation of bits 28-30.

TABLE XVI

| Code Point | Adder Function |
|---|---|
| 0 | Arithmetic |
| 1 | Logic |

12. Adder result destination field (bits 32-34). This field specifies the destination of the Adder 28 result to a group of registers (local stores). The register address for AEOR 108, MLR 110, or MRR 112 is specified by Adder Result Register Field A (bits 35-38). Due to pipelining of the Adder Result, these registers are located one AE cycle delayed. The register address for ALOR 128, ACOR 130, or AROR 132 is specified by Adder Result Register Field B (bits 39-40). ALOR 128 is pipelined one cycle, the others are loaded the same cycle.

TABLE XVII

| Code Point | Destination |
|---|---|
| 0 | AEOR 108 (see 14 for conditions) |
| 1 | ALOR 128 |
| 2 | ACOR 130 |
| 3 | AROR 132 |
| 4 | MLR 110 or MRR 112 |
| 5 | MLR 110 or MRR 112 and ALOR 128 |
| 6 | MLR 110 or MRR 112 and ACOR 130 |
| 7 | MLR 110 or MRR 112 and AROR 132 |

13. Adder result register A (bits 35-38). This field apecifies the address of the local store (AEOR 108, MLR 11, MRR 112) which was selected as Adder result destination by the Adder Result Destination Field (bits 32-34), code points 0 and 4-7. For code point 0 (AEOR 108), bits 35-38 are interpreted as follows:

TABLE XVIII

| Code Point | Address | |
|---|---|---|
| 0 | AEOR 0 | (Bit 35 = 0 specifies full word load, address is bits 36-37, bit 38 unused.) |
| 1 | AEOR 0 | |
| 2 | AEOR 1 | |
| 3 | AEOR 1 | |
| 4 | AEOR 2 | |
| 5 | AEOR 2 | |
| 6 | AEOR 3 | |
| 7 | AEOR 3 | |
| 8 | AEOR 0 (High half) | (Bits 35 = 1 specifies half word load, address is bits 36-37, bit 38 = 1 selects low half.) |
| 9 | AEOR 0 (Low half) | |
| 10 | AEOR 1 (High half) | |
| 11 | AEOR 1 (Low half) | |
| 12 | AEOR 2 (High half) | |
| 13 | AEOR 2 (Low half) | |
| 14 | AEOR 3 (High half) | |
| 15 | AEOR 3 (Low half) | |

For Adder Result Destination Field code points 4-7, the selected registers are MLR 110 or MRR 112 as follows:

TABLE XIX

| Code Point | Address |
|---|---|
| 0, 2, 4, 6 | MLR 0-3 (High half) |
| 1, 3, 5, 7 | MLR 0-3 (Low half) |
| 8, 10, 12, 14 | MRR 0-3 (High half) |
| 9, 11, 13, 15 | MRR 0-3 (Low half) |

14. Adder result register field B (bits 39-40). This field specifies the address of the local store (ALOR 128, ACOR 130, AROR 132) which was selected by the Adder Result Destination Field (bits 32-34), code points 1-3 and 5-7. For code point 0 (result to AEOR 108), bits 39-40 provide conditional control as follows:

TABLE XX

| Code Point | Operation |
|---|---|
| 0 | No transfer |
| 1 | Spare |
| 2 | Result to AEOR address specified by bits 35-38. |
| 3 | High half word out of Rounder 104 goes to high half of specified AEOR 108 if Decimate Counter 150 = 0; high half out of Rounder goes to low half of specified AEOR if Decimate Counter = 0; otherwise, no operation. |

For the other code points in bits 32-34, bits 39-40 are interpreted as follows:

TABLE XXI

| Code Point (32-34) | Code Point (39-40) | Address |
|---|---|---|
| 1, 5 (result to ALOR 128) | 0-3 | ALOR 0-3 |
| 2, 6 (result to ACOR 130) | 0-3 | ACOR 0-3 |
| 3, 7 (result to AROR 132) | 0-3 | AROR 0-3 |

15. Rounder operation field (bits 41-42). This field specifies the arithmetic operations of the Rounder.

TABLE XXII

| Code Point | Operation |
|---|---|
| 0 | Sign, magnitude. If operand is negative, it is two's complemented with a 'one' placed in the sign bit; if positive, no alteration. |
| 1 | True value, no change. |
| 2 | Complement. Perform two's complement operation. |
| 3 | Absolute value. True value if operand is positive, two's complement if operand is negative. |

16. Round control field (bit 43). This bit specifies the rounding of the 32 bit operand to 16 bits.

TABLE XXIII

| Code Point | Operation |
|---|---|
| 0 | No round. |
| 1 | Add hot 1 to 17th bit of operand to round to 16 bits. |

17. Control field (bits 44-45). This field specifies the setting of bits in the AE Status Register 134 and the stopping of the Arithmetic Processor 4.

TABLE XXIV

| Code Point | Function |
|---|---|
| 0 | No operation. |
| 1 | Stop Arithmetic Processor 4 at the end of this microinstruction cycle. |
| 2 | Set AE Status Register bit 6 equal to the sign of the Adder result of this cycle. |
| 3 | Set AE Status Register bits 0-5 (Overflow status bits) per Adder result of this cycle and Rounder 104 result of next cycle. |

18. Spare field (bits 46-47). Not defined, unused.

Storage Operation Control Fields (Even Cycle Bits 48-52)

Table VII shows the last 16 bits of the AECW as they are interpreted during even cycles. Following is a description of the fields.

TABLE VII

| 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|
| | Storage Operation Command | | | | INCR Sel | Address Generation | | | | | Branch | | | | |
| | | | | | | Control | | AR Select | | | Operation | | BCR Select | | |
| 0 | No-op | | | | Even | No-op | | AR 0-7 | | | No-op Unconditional Branch | | BCR 0-7 | | |
| 1 | Spare | | | | Odd | + code | | and | | | | | | | |
| 2 | Read WS A | | | | | − code | | INCR 0-7 Pairs | | | Conditional Branch | | BCR 0-7 | | |
| 3 | Spare | | | | | + INCR | | | | | | | | | |
| 4 | Read WS B | | | | | | | | | | | | | | |
| 5-15 | Spare | | | | | | | | | | BNZ/RZ | | BCR 8-15 | | |
| 16-19 | Write WS from AEOR (full word) | | | | | | | | | | | | | | |
| 20,22 | Write WS from AEOR (conditional full word) | | | | | | | | | | | | | | |
| 21,23 | Spare | | | | | | | | | | | | | | |
| 21-27 | Write WS from AEOR (conditional half word)* | | | | | | | | | | | | | | |
| 28-31 | Write WS from AEOR (conditional decimated full word)* | | | | | | | | | | | | | | |

*Contents of AR updated only if conditional storage transfer occurs.

1. Storage operation command field (even cycle bits 48-52). This field specifies a storage transfer operation which may be a read or write of Working Store 12. If it is a write operation of source register is also specified. If it is a read operation the destination register is specified by Odd cycle bits 48-52.

TABLE XXV

| Code Point | Operation |
|---|---|
| 0 | No operation. |
| 1 | Spare. |
| 2 | Read WS A (12a). |
| 3 | Spare. |
| 4 | Read WS B (12b). |
| 5-15 | Spare. |
| 16-19 | Write WS 12, source registers are AEOR 108 0-3. |
| 20 | Write WS 12, source register is AEOR 0 or AEOR 1 conditional upon AE Status Register Bit 6. If Bit 6 = 0, source is AEOR 0. |
| 21 | Spare. |
| 22 | Write WS 12, source register is AEOR 2 or AEOR 3 conditional upon AE Status Register Bit 6. If Bit 6 = 0, source is AEOR 2. |
| 23 | Spare. |
| 24 | Write WS 12, source word is the conditional low half (16 bits) of AEOR 0 or AEOR 1, selected as in code point 20, combined with the high half previously selected and stored in a holding register by code point 25 or 27. |
| 25 | Conditional select of high half word from AEOR 0 or AEOR 1. Selected half word (16 bits) is temporarily held in a register to be transferred along with the result of an instruction containing code point 24 or 26. |
| 26 | Same as code 24, except low half word is conditionally selected from AEOR 2 or AEOR 3. |
| 27 | Same as code 25, except high half word is conditionally selected from AEOR 2 or AEOR 3. |
| 28-31 | Write WS 12, source is AEOR 0-3. Operation is conditional. If Decimate Counter = 0, operation is executed; otherwise, no operation. |

2. Address generation control field (even cycle bits 54-55). This field specifies the method of incrementing the address selected from the Address Register 166 (AR 0-7) and Increment Register 168 (INCR 0-7) by even cycle bits 56-58 and 53.

TABLE XXVI

| Code Point | Interpretation |
|---|---|
| 0 | No increment, contents of selected AR 166 remain the same. |
| 1 | Increment the contents of the selected AR 166 by the value specified by the increment field in the AR 166. |
| 2 | Decrement the contents of the selected AR 166 by the value specified by the increment field in the AR 166. |
| 3 | Increment the contents of the selected AR 166 by the contents of the selected INCR 168. |

3. Address register select field (even cycle bits 56-58). This field specifies an address and a pair of increments from the AR 166 and INCR 168 for use in address generation.

TABLE XXVII

| Code Point | Selected Registers |
|---|---|
| 0 | AR 0 and INCR 0-1 pair |
| 1 | AR 1 and INCR 0-1 pair |
| 2 | AR 2 and INCR 2-3 pair |
| 3 | AR 3 and INCR 2-3 pair |
| 4 | AR 4 and INCR 4-5 pair |
| 5 | AR 5 and INCR 4-5 pair |
| 6 | AR 6 and INCR 6-7 pair |
| 7 | AR 7 and INCR 6-7 pair |

4. Increment Register Select Field) even cycle bit 53). This bit specifies one of a pair of INCR 168, selected by bits 56-58, to be used.

TABLE XXVIII

| Code Point | Selected INCR |
|---|---|
| 0 | INCR 0, 2, 4 or 6 |
| 1 | INCR 1, 3, 5 or 7 |

5. Branch operation field (even cycles bits 59-60). This field specifies the branch operation for branching to a microinstruction address specified in the BCR 164.

TABLE XXIX

| Code Point | Operation |
|---|---|
| 0 | No operation. |
| 1 | Unconditional branch to address specified in selected BCR 164. Count field in BCR 164 is not changed. |
| 2 | Conditional branch - branch to address |

TABLE XXIX-continued

| Code Point | Operation |
|---|---|
|  | specified in selected BCR 164 if the AE status bit selected by bits 62 and 63 is a one. Bits 62–63 code point 0 selected AE 0 status bit, code point 1 selected AE 1, etc. |
| 3 | Conditional branch - branch to address specified by selected BCR 164 if count field of BCR 164 is non-zero and decrement count field by one. If Count = 0, reset count with value in reset field, and do not branch (use present MAR 158 value incremented by one for next address) |

6. Branch and Count Register Select Field (Even Cycle Bits 61–63). This field specifies the BCR 164 (one of 16) to be used for the branch operation. This selection is dependent upon bits 59 and 60.

TABLE XXX

| Bit 59 | Bit 60 | Code Point (61–63) | BCR 164 Select |
|---|---|---|---|
| 0 | 0 | — | No operation |
| 0 | 1 | 0–7 | BCR 0–7 |
| 1 | 0 | 0–7 | BCR 0–7 |
| 1 | 1 | 0–7 | BCR 8–15 |

Sine/Cosine Generator Control Fields (Odd Cycle Bits 46–63).

Table VII shows the last 16 bits of the AEC10 as they are interpreted during odd microinstruction cycles. These bits control the operation of the Sine/Cosine Generator 124 as well as the register destination addresses for WS 12 read operations specified by the Storage Operation Command Field (Even cycle bits 48–52). Following is a description of the fields.

TABLE XXXI

| Code Point | Destination |
|---|---|
| 0–3 | SFR 106 0–3 |
| 4–7 | ALIR 114 0–3 |
| 8–11 | MLR 110 0–3 |
| 12–15 | MRR 112 0–3 |
| 16–19 | AR 166 0–1, AR 2–3, AR 4–5, AR 6–7 (32 bit WS 12 output contains two 16 bit address quantities - high 16 bits go to Even AR (0, 2, 4, 6), low 16 bits to Odd AR (1, 3, 5, 7). |
| 20–23 | ACIR 116 0–3 |
| 24–27 | AR 166 0–3 and INCR 168 0–3 (32 bit WS output contains a pair of 16 bit address and Increment quantities - high 16 bits goes to AR 0–3, low 16 bits to INCR 0–3). |
| 28–31 | IR 0–1, IR 2–3, IR 4–5, IR 6–7 (32 bit WS output contains two 16 bit address quantities - high 16 bits go to Even IR (0, 2, 4, 6), low 16 bits to Odd IR (1, 3, 5, 7). |

If the previous Even cycle bits 48–52 specified code point 2 (Read WS A), this field shall be decoded as follows:

TABLE XXXII

| Bit 48 | Destination | Bits 49–50 | Destination | Bits 51–52 | Destination |
|---|---|---|---|---|---|
| 0 | MLR & ALIR | 0–3 | ALIR 0–3 | 0–3 | MLR 0–3 |
| 1 | MRR & ACIR | 0–3 | ACIR 0–3 | 0–3 | MRR 0–3 |

2. Spare Field (Odd Cycle Bits 53–53) — Undefined, not used.

3. Sine/Cosine Generator Operation Field (Odd Cycle Bits 55–56) — This field specifies the operation for the Sine/Cosine Generator.

TABLE XXXIII

| Code Point | Operation |
|---|---|
| 0 | No operation. |
| 1 | Generate sine and/or cosine of argument contained in specified AR. Then increment the selected AR by the contents of the selected INCR. |
| 2 | Generate sine and/or cosine of argument contained in specified AR. Do not increment AR. |
| 3 | Spare. |

TABLE VII

| 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|
| Read Destination | | | | | Spare | | Sine/Cosine Generator Control | | | | | | | Spare | |

For Read WS A:

| | | | Operation | AR Select | Destination | |
|---|---|---|---|---|---|---|
| MLR/ALIR | ALIR 0–3 | MLR 0–3 | No-op | AR 0–3 | | |
| MRR/ACIR | ACIR 0–3 | MRR 0–3 | Increment and Spare | and INCR 0–3 and SCDR 0–3 | MRR 0–3 | HI LO |

For Read WS B:

| 0–3 | SFR 0–3 |
|---|---|
| 4–7 | ALIR 0–3 |
| 8–11 | MLR 0–3 |
| 12–15 | MRR 0–3 |
| 16–19 | AR pairs |
| 24–27 | AR-INCR pairs 0–3 |
| 28–31 | IR pairs |

1. Read Destination Field (Odd Cycle Bits 48–52) — This field specifies the register destination address for a Read WS 12 operation specified in the previous even microinstruction cycle by Even cycle bits 48–52, code points 2 and 4. This field shall be interpreted differently for each of those code points. If the previous Even cycle bits 48–52 specified code point 4 (Read WS B), this field shall decoded as follows:

4. Sine/Cosine Address Register Select Field (Odd Cycle Bits 57—58) — This field specifies the AR and INCR pair to be used as the argument for this cycle and to generate argument for the next cycle, and the SCDR 170 to be used for control.

TABLE XXXIV

| Code Point | Argument Source |
| --- | --- |
| 0–3 | AR 0–3, INCR 0–3, and SCDR 0–3 (Sine/Cosine arguments are restricted to no more than four of the eight AR's and INCR's). |

5. Sine/Cosine Destination Field (Odd Cycle Bits 59–61) — This field specifies the destination register in MRR of the AE's which is to be loaded with the generated sine or cosine.

TABLE XXXV

| Code Point | Destination |
| --- | --- |
| 0, 2, 4, 6 | MRR 0–3 (High half) |
| 1, 3, 5, 7 | MRR 0–3 (Low half) |

6. Spare Field (Odd Cycle Bits 62–63) — Undefined not used.

Micro Store

Figure 14:
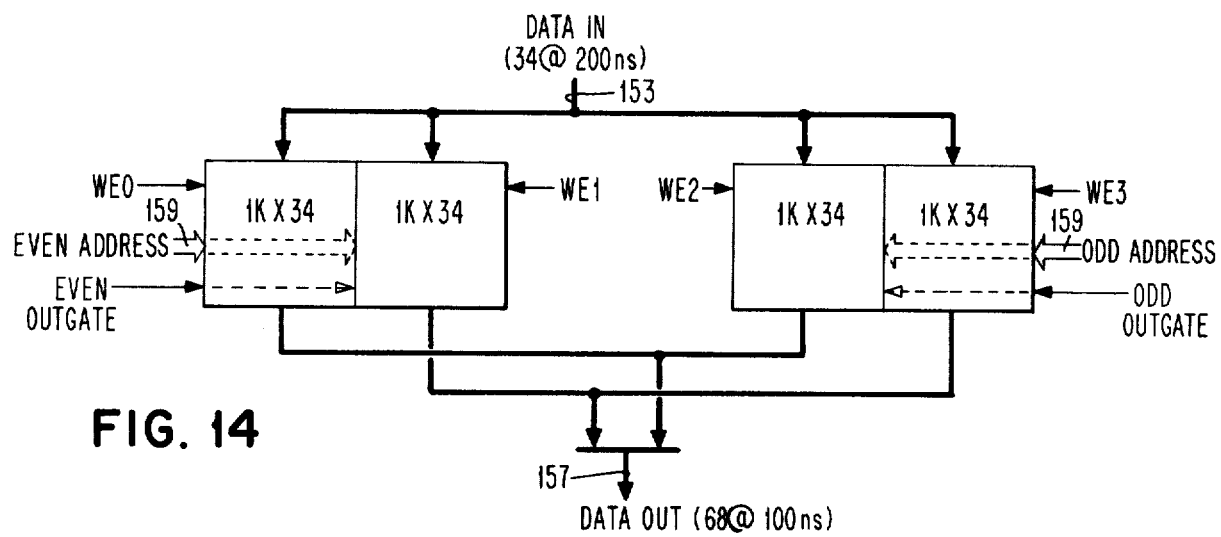
FIG. 14 is a block diagram of the micro store configuration.
Figure 16:
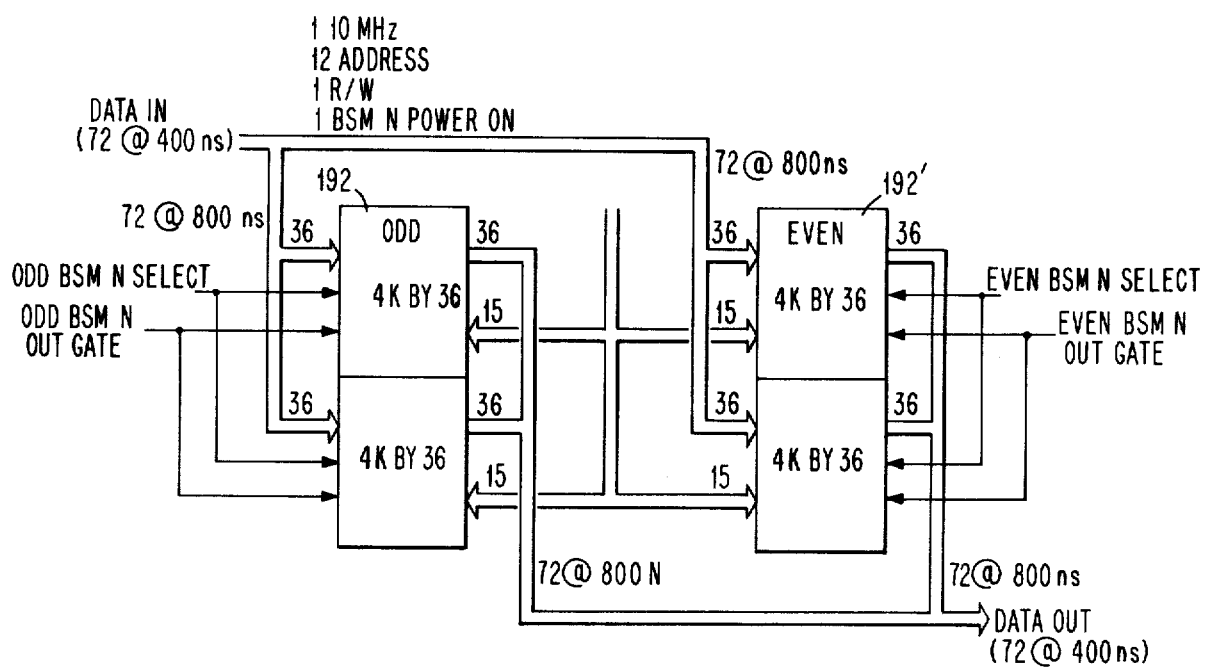
FIG. 16 is a block diagram of the basic storage module configuration for the bulk storage.

The Micro Store 30 provides storage for the microprogram of the Arithmetic Element Controller 10. Data is written into the Micro Store 30 from Bulk Store 6 during IPL at a data rate of 34 bits every 200 ns, limited by the 34 bit bus to the Micro Store 30 and 200 ns cycle time memory arrays. Data is read out of Micro Store 30 at a bandwidth of 68 bits every 100 ns, which may be accomplished by interleaving two 1K × 68, 200 ns memories. This arrangement of the Micro Store 30 is illustrated in FIG. 14.

The Micro Store 30 consists of four separate 1K × 34 bit memories when writing data into the array. Each section has a separate write enable to enable selection of the appropriate array. There are two sets of address inputs, one for the left two 1K × 34 arrays and another set for the right two arrays. Writing one word in each array requires 800 ns, 200 ns cycle per array.

When reading out data from Micro Store 30, the four arrays are used as two 1K × 68 arrays interleaved to give a resultant 100 ns output data rate. This is accomplished by accessing each half every 200 nanoseconds with the even and odd addresses and outgates occurring out of phase by 100 nanoseconds.

BS/AP Subunit Interface

The BS/AP subunit interfaces with the Control subunit via the BS/AP Control interface, the CP/IO subunit via the BS/AP-CP/IO interface and Electrical Power Interface.

BS/AP-CP/IO Interface

Figure 36:
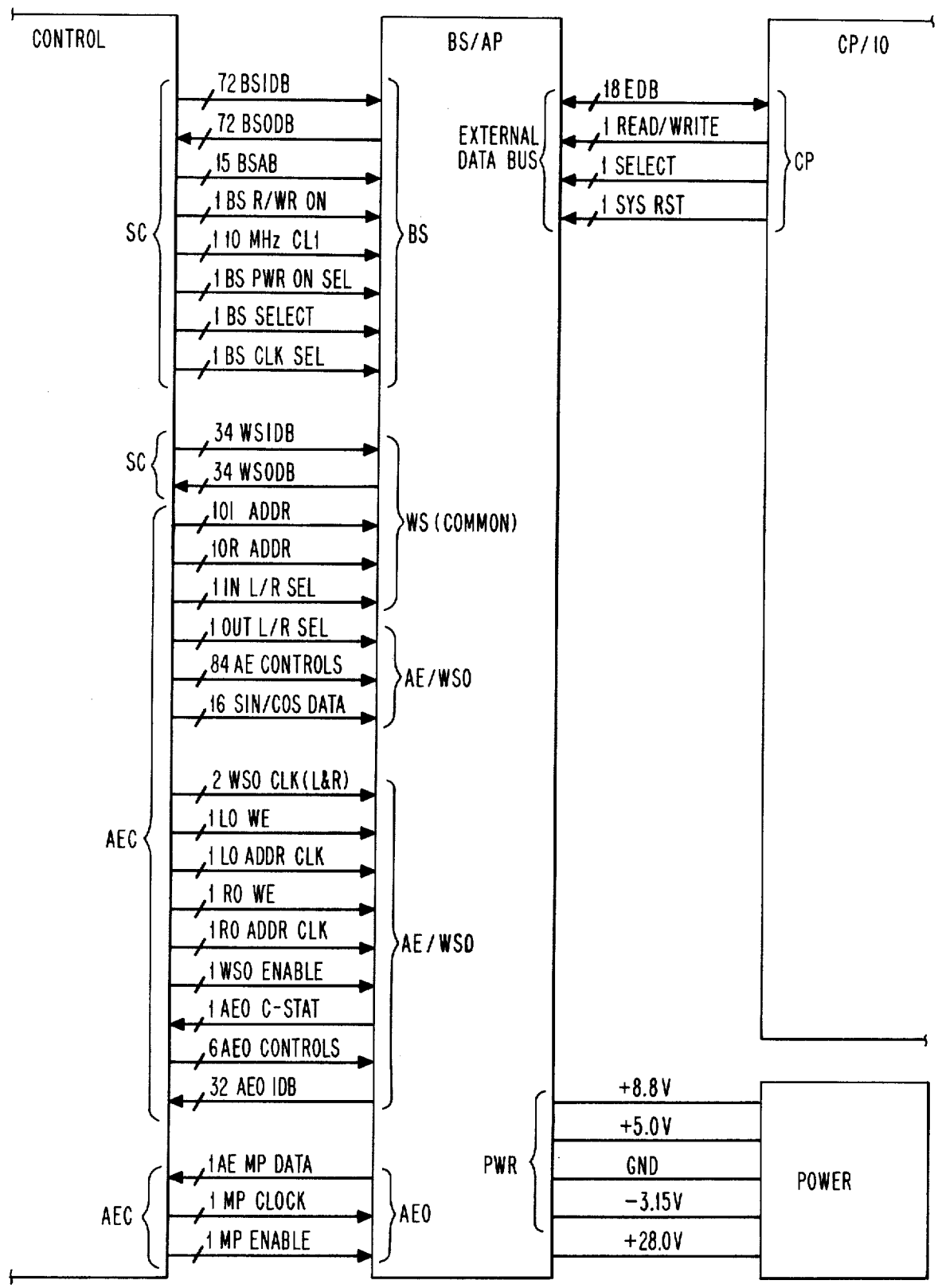
FIG. 36 illustrates the interconnection of the control with the bulk store/arithmetic processor and that of the control processor/input-output with the bulk store/arithmetic processor.

Referring to FIG. 36 each AE is connected to the Control Processor External Data Bus (EDB). This interface includes a bidirectional 18-bit (16 + 2 parity) data bus, a read/write control, and a select strobe. The External Address for each AE is decoded in the AEC. The SFR is capable of being loaded from the CP-EDB, and a status register is provided which can be read/write by the CP. The status register is cleared of previous status by initiating a write operation consisting of zero data by CP.

BS/AP-Control Interface

There are two interfaces to each AE that originate from the AEC and are common to all AEs. They include 84 control lines which provide all controls for AE operations and a 16-bit data bus for transfer of generated coefficients from the Sine/Cosine Generator in the AEC. In addition, there are 14 unique control lines and clock lines to each BS/AP Subunit for AE and WS.

Figure 34:
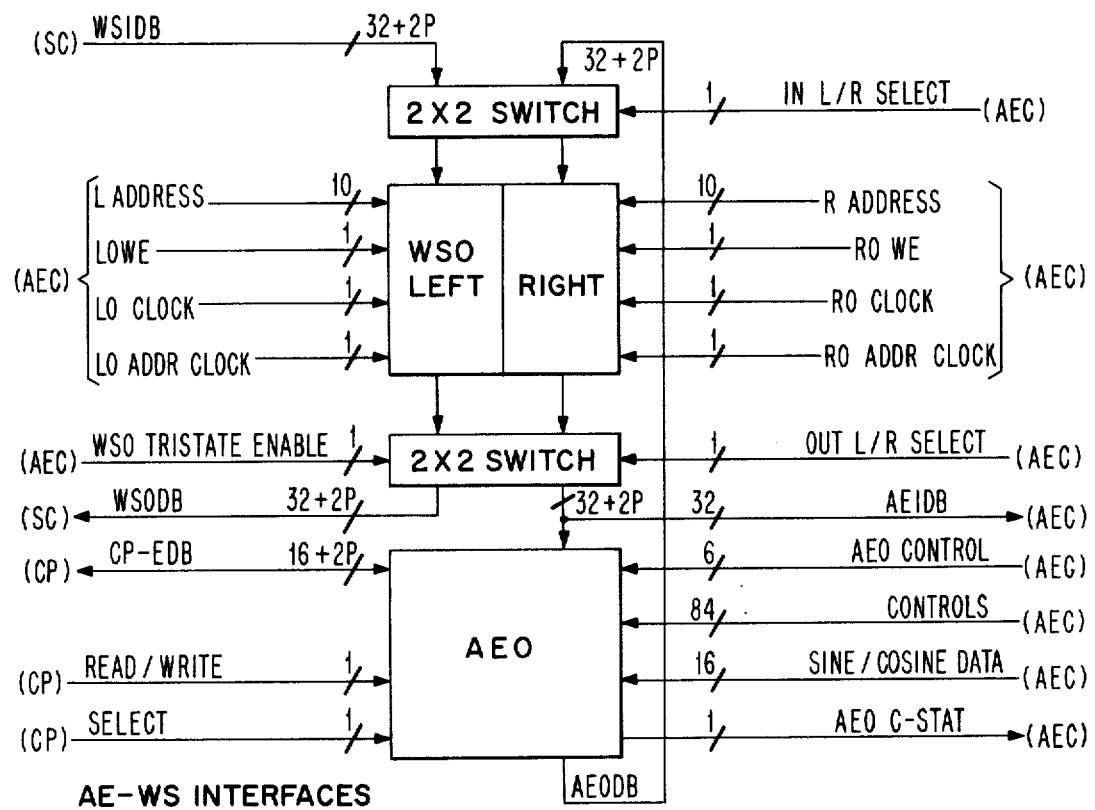
FIG. 34 shows the control and data lines to the arithmetic element and working store.

Each AE interfaces with a Working Store which in turn shall interface with the Storage Controller. These interfaces (see FIG. 34) are discussed in the following paragraphs.

Each AE has a 34 bit (32 data + 2 parity) input from its WS, and a corresponding 34 bit output to WS. Parity is checked on input data and generated for output data. Data transfers in each direction take place at a 200 nanosecond rate. The transfers are controlled by the AEC. Each WS also has a 34 bit input from and a 34 bit output to the Storage Controller (SC). Each WS is organized as two 1K word by 34 bit storage elements. A 2 × 2 switch on both input and output is provided to allow the AE to be connected to one half for data processing and the SC to be connected to the other half for transfer of data from the SC and processing data back to the SC. Addressing and control of the two halves is independent, allowing simultaneous operation at a 5 MHz rate. The data buses to the SC operate at a 10 MHz rate and be time multiplexed between two Working Stores.

The BS has a 72 bit (64 data + 9 correction code and parity bits) input bus from the Priority Control and corresponding 72 bit output bus to Error Correction. Data transfers in either direction take place at a 400 nanosecond maximum rate from each BSM with up to four BSM's actively sharing common buses time slotted at 100 nanoseconds. Addressing and controls of the Bulk Store interface are supplied by the Storage Controller to the Bulk Store Interface Logic.

c. Bulk Store

Bulk Store (BS) 6 is the primary AU storage medium, providing storage for data buffers, temporary buffers, coefficients, and program parameters. Bulk Store 6 is available in sizes from 16K to 512K in increments of 16K words.

Bulk Store 6 is organized in 64-bit double words with 8 error correction code (ECC) bits associated with each double word giving 72 bits total per double word. The 8 ECC bits provide for correction of all single bit errors and detection of double bit errors.

The Bulk Store 6 operated at an 800 ns cycle time with two 72-bit arrays operating interleaved to achieve an effective 400 ns double word rate per Basic Storage Module (BSM). Up to four BSM's may be operating concurrently, providing a total Bulk Store transfer rate of 100 ns per double word.

The Bulk Store is configured by the common bussing of up to four memory building blocks, called Basic Storage Modules (BSM) within one BS/AP subunit. FIGS. 15A and 15B show this organization. This provides a maximum of 64K words of storage in the BS/AP. The Bulk Store Interface Logic 190 provides data buffering and BSM control decoding for the BSMs within a subunit and interfaces externally to common data and control buses between the Storage Controller 8, located in the Control Subunit, and up to seven additional BS/AP subunits, each with its own Bulk Store Interface Logic 190 and up to four BSMs. This provides a maximum Bulk Store expansion to 512K words.

Each BSM contains 16K words of storage, which is the basic storage size increment for Bulk Store 6. Each BSM provides the capability of reading or writing a double word of data (72 bits) every 400 nanoseconds. Four BSMs must be active and interleaved at 100 nanosecond intervals to achieve the maximum Bulk Store data rate of 10 MHz for double words. The double BSMs can be located in separate BS/AP subunits.

Each BSM consists of odd and even halves. Each half is a 72-bit wide memory 192 with an 800 ns cycle time. The two halves are bused together at the inputs and outputs, and are interleaved in operation, in order to achieve the effective 400 ns cycle per BSM. The organization of a BSM is illustrated in FIG. 6. Each half 192 consists of 4K double words of storage, which is implemented with two 4K × 36 memory modules operated on parallel. Two havles 192 or 4 memory modules thus make up a BSM.

Interleaving of BSMs within one subunit is controlled by the Bulk Store Interface Logic 190. A common, 12-bit address bus is routed to both halves of each BSM, for selection of the 4K double words contained in each half 192. Referring to FIG. 23 selection of individual BSMs and their odd or even halves 192 is accomplished with separate select lines from the Interface Logic 190 to each BSM odd and even portion 192. Output enabling of data on the memory output bus is implemented with separate outgate lines to each half of a BSM. The basic operation to achieve the maximum data rate of 10 MHz is obtained by initiating a memory cycle on the odd or even half of a BSM, and then, at 100 ns intervals, initiating a memory cycle on seven additional odd or even portions of BSMs. The Priority Control in the Control subunit resolves conflicts and controls interleaving of data from multiple BS/APs.

The module designed for the Bulk Store 6 has a data storage capacity of 144K bits organized into 4K words of 36 bits each. Each module assembly contains twelve 8-chip NMOS storage packages, all associated support TTL logic circuits, and the required power supply decoupling capacitors. In addition, two power switches are provided for reducing the module standby power. These switches are used to remove power from most of the peripheral logic circuits and reduce memory voltage when the module is in the inactive mode (a few logic circuits must be left powered-up to provide the control required to prevent degradation of stored data).

Each module is a completely independent storage memory element which is operated to provide output data at a rate of 36 bits each 800 ns. Tristate drivers permit busing page outputs for interleaved operation and/or memory expansion.

Bulk Store Interface Logic

The Interface (IF) Logic 190 of FIG. 15A performs all the functions necessary to interface the Storage Controller (SC) 8 to one BS/AP Subunit.

The IF 190 receives a 12-bit address which it buffers and transmits to the Bulk Store (BS) 6 pages. In addition it receives a 3-bit BSM address and two select lines from the SC 8. The BSM address indicates which Bulk Store Module (BSM) within the subunit is to be accessed. The PWR SELECT indicates that the power up sequence is to be initiated for the BSM addressed. The SELECT line indicates that there have been no priority contentions detected by the SC 8, hence the access cycle may be initiated for that address.

The IF 190 provides all decoding and sequencing of controls for one BS/AP Subunit. This includes providing of PWR ON, SELECT and OUTGATE signals in the necessary time relationship to access a given BS 6 address.

The IF 190 regenerates a 10 MHz clock such that BS 6 requirements for a symmetrical clock are satisfied.

The IF 190 provides two 72-bit data buffers — one for the Bulk Store Input Data Bus (BSIDB) 208 and one for the Bulk Store Output Data Bus (BSODB) 210. These buffers provide the power up and timing alignment necessary at this interface. In addition the IF 190 provides for timing realignment at the BSODB buffer which is a function of the number of BS/AP Subunits implemented. This compensates for varying capacitive loads on this bus due to storage expansion.

D. Storage Controller

The Storage Controller (SC) 8 is a special purpose processor which transfers data and parameters between Bulk Store 6 and other AU elements.

The primary function of the SC 8 is to page blocks of data between Data Store 6 and the AP Working Stores 12. The SC 8 transfers are scheduled to use one half of Working Store 12 while the AE 20 processes data in the other half of Working Store 12. This concurrency minimizes AP 4 idle time that would result if data transfers and processing functions were sequential.

During the transfer of data between Bulk Store 6 and Working Store 12 the SC 8 can perform a variety of logical functions on the data. These functions include 1) compressing data when transferring from the AP 4 to BS 6 and expanding data when transferring from BS 6 to AP 4, 2) scaling data during transfers to provide for maximum precision in data, 3) bit reverse addressing FET data during transfer to eliminate bit reversal as a processing load, and 4) demultiplexing data during transfer from Bulk Store 6 to AP 4.

The SC 8 also provides the control capability to page microprograms into the AP 4 and CP 2 Control Stores 22 or programs and data to the CP 2 Program Store 14.

The SC 8 also performs error correction operations on data read from Bulk Store 6 and generates the error correcting code on Bulk Store write operations.

The SC 8 queues up to four transfer commands and resolves conflicts over the availability of Bulk Store 6 with its priority control logic.

Figure 17:
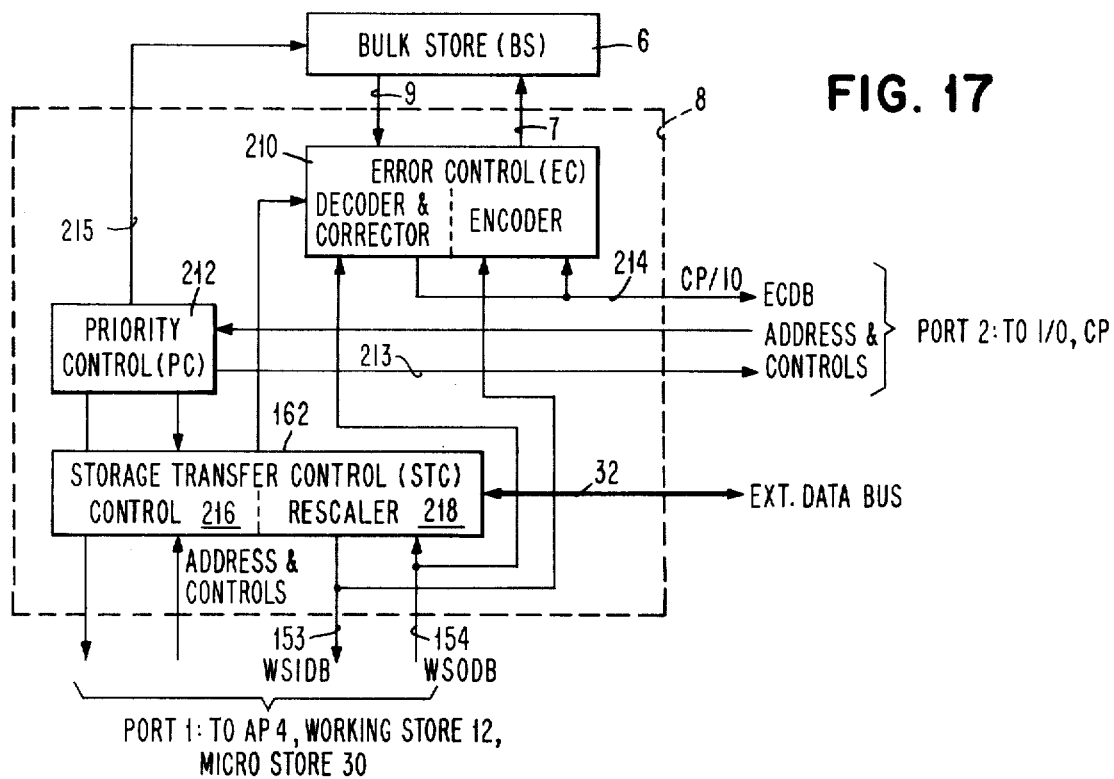
FIG. 17 is a block diagram of the storage controller.
Figure 18:
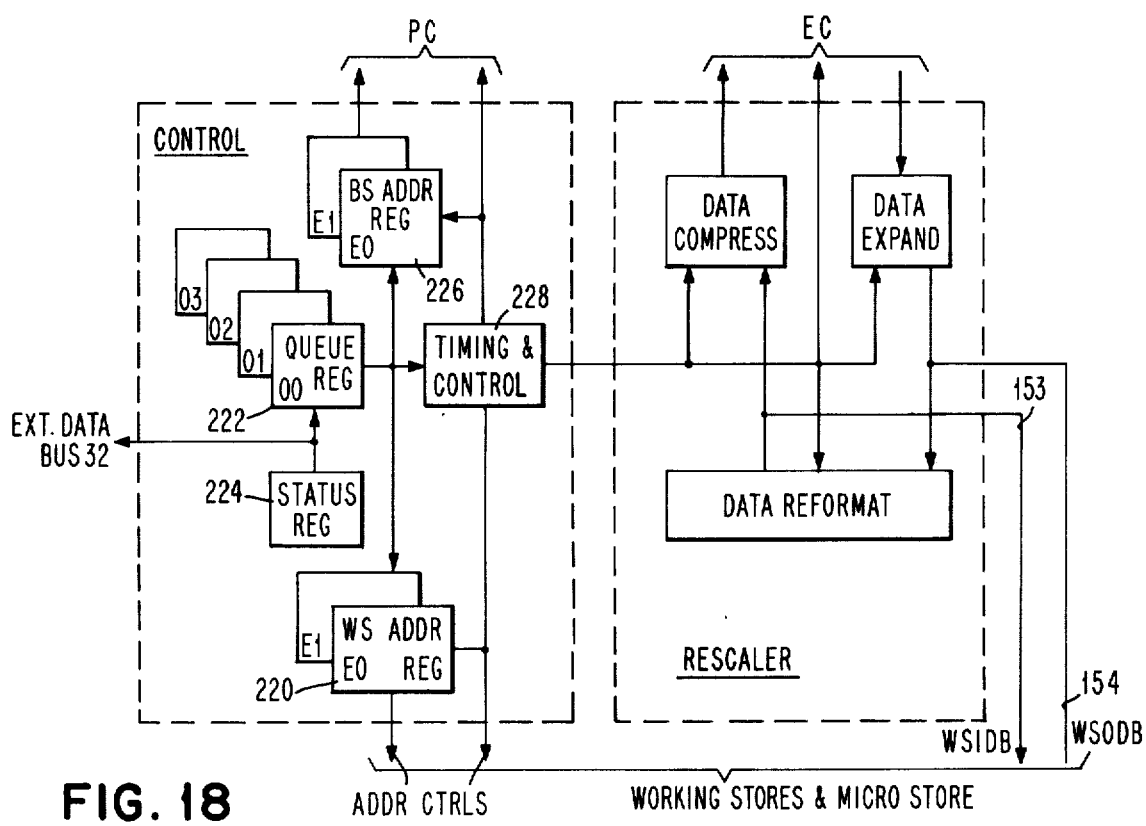
FIG. 18 is a diagram of the storage transfer control.

The Storage Controller (SC) 8 shown in FIG. 17 consists of there major elements. These elements are:
— Storage Transfer Control 162
— Error Control 210
— Priority Control 212

The Storage Transfer Control (STC) 162 operates under commands received from the Control Processor (CP) 2 over the External Data Bus (EDB) 32. The Bulk Store 6 size word and the Program Store 14 base address word is also transferred over the EDB 32. These control words cannot be read back to the CP 2. The STC 162 status word is available to the CP 2 by way of the EDB 32. This status register cannot be loaded by the CP 2.

The STC 162 provides a 34 bit (32 bits data plus 2 bits parity) data out bus and a 34 bit data in bus to the Working Stores 12. This element provides Working Store (WS) 12 addresses for data words being transferred between Bulk Store (BS) 6 and WS 12. The STC 162 shall control BS 6 addresses and provide them to the Priority Control (PC) 212 element for all WS 12 or CP 2 data transferred to BS 6. All timing and control for data transfers is provided by the STC 162.

Figure 24:
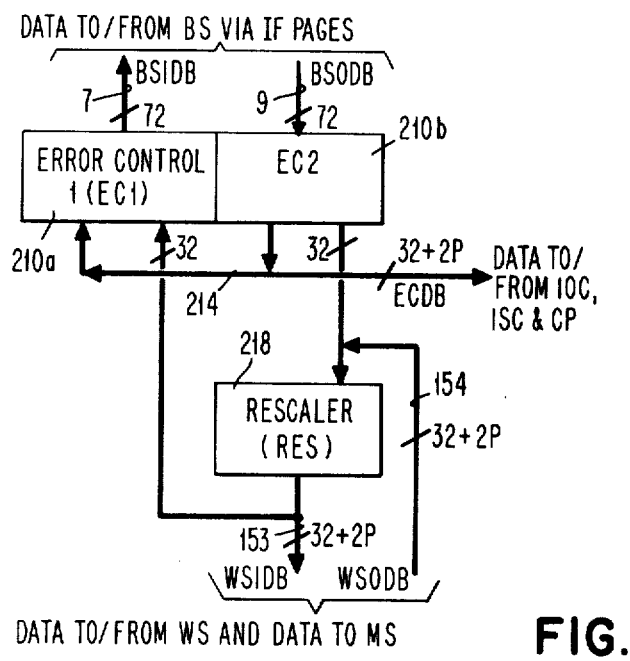
FIG. 24 illustrates the storage controller data flow.

The EC 210 has a 72 bit input from BS 6 and a 72 bit output to BS 6. The bits consist of 64 data bits (double word), seven error check bits, and one parity bit. The EC 210 has two 32 bit data buses plus one 34 bit bidirectional data bus. The bidirectional bus (ECDB) 214 is used to transfer data to and from the IOC 18, ISC 24, and CP 2. The other EC 210 data buses one out and one in are connected to the WS 12 bus as shown in FIG. 24. Timing and controls for the EC 210 come from the STC 162. The EC 210 has capability of single error correction and double error detection of all data received from BS 6. The EC 210 reports all errors to the PC 212.

The Priority Control (PC) 212 receives all addressing data going to BS 6. The PC 212 maintains a history of this data. With this history new BS 6 store/request are compared and priority determined. PC 212 also, power address data going to BS 6.

Storage Transfer Control

The STC 162 controls the transfer of data between BS 6 and the WS 12, between BS 6 and Micro Store 30, and between BS 6 and CP 2 Program Store 14. This element operates under control of commands received from the Control Processor (CP) 2. These commands shall be received over the EDB 32. The Control section 216 and the Rescaler section 218.

The STC 162 is capable of any size block data transfer from one byte to 1024 BS words (72-bit words). All writing into BS 6 is in multiples of double words, and on double word boundaries. All writing into WS 12 is in multiples of full words and on word boundaries.

The STC 162 is capable of reading from BS 6 from contiguous or noncontiguous bytes, half words or words. For a given block transfer the unit of transfer (byte, etc.) and the step between units shall be fixed as defined by the writing WS 12 shall be to or from contiguous addresses except for codes using bit reverse WSAR 220.

A single STC 162 command word has the capability to broadcast to any combination of Working Stores 12. In the reverse manner, a single STC 162 command word is capable of merging any even Working Store 12 with any odd Working Store 12. Merging two even, two odd, or more than two Working Stores 12 is detected as an illigal command.

The STC 162 is capable of performing a number of operations on data as it is being transferred.

— Data going into Bulk Store 6 from Working Store 12 may be compressed to reduce total BS 6 capacity requirements.

The STC 162 has the capability to estimate the reciprocal of a Bulk Store 16 bit operand and transfer it to WS 12. This reciprocal shall be a single approximation based on the most significant bit of the operand.

STC Control Section (216)

The STC 162 maintains a status word 224. The CP 2 is able to read this status word 224 via the EDB 32. The status word 224 contains information describing which Queue Register 222 is available to receive an STC 162 command word. The Queue Register 222 is a Command Holding Register which allows queuing of commands. The command word received over the EDB 32 shall simply address the Queue Stack 222. The STC 162 automatically loads the stated available Queue Register 222. The command word is four successive 16-bit transfers. When the fourth word (Command Word bits 48 to 63) is loaded the STC 162 marks the Q register as valid and transfers the command to the appropriate Execution Register as soon as it becomes available. There are four virtual Queue Registers 222 ($Q_0$, $Q_1$, $Q_2$, $Q_3$). Once a Q register 222 is given a command, that Q Register is not assigned another command until the first command execution is completed.

Commands involving transfers to or from even Working Stores 12 (i.e., Working Stores of AE0 and AE2) are initiated in their order of arrival at the STC 162 and executed sequentially. The same shall be true for commands for odd Working Stores 12. However, commands for even Working Stores 12 may be initiated and executed out of sequence with commands for odd Working Stores 12.

Figure 19:
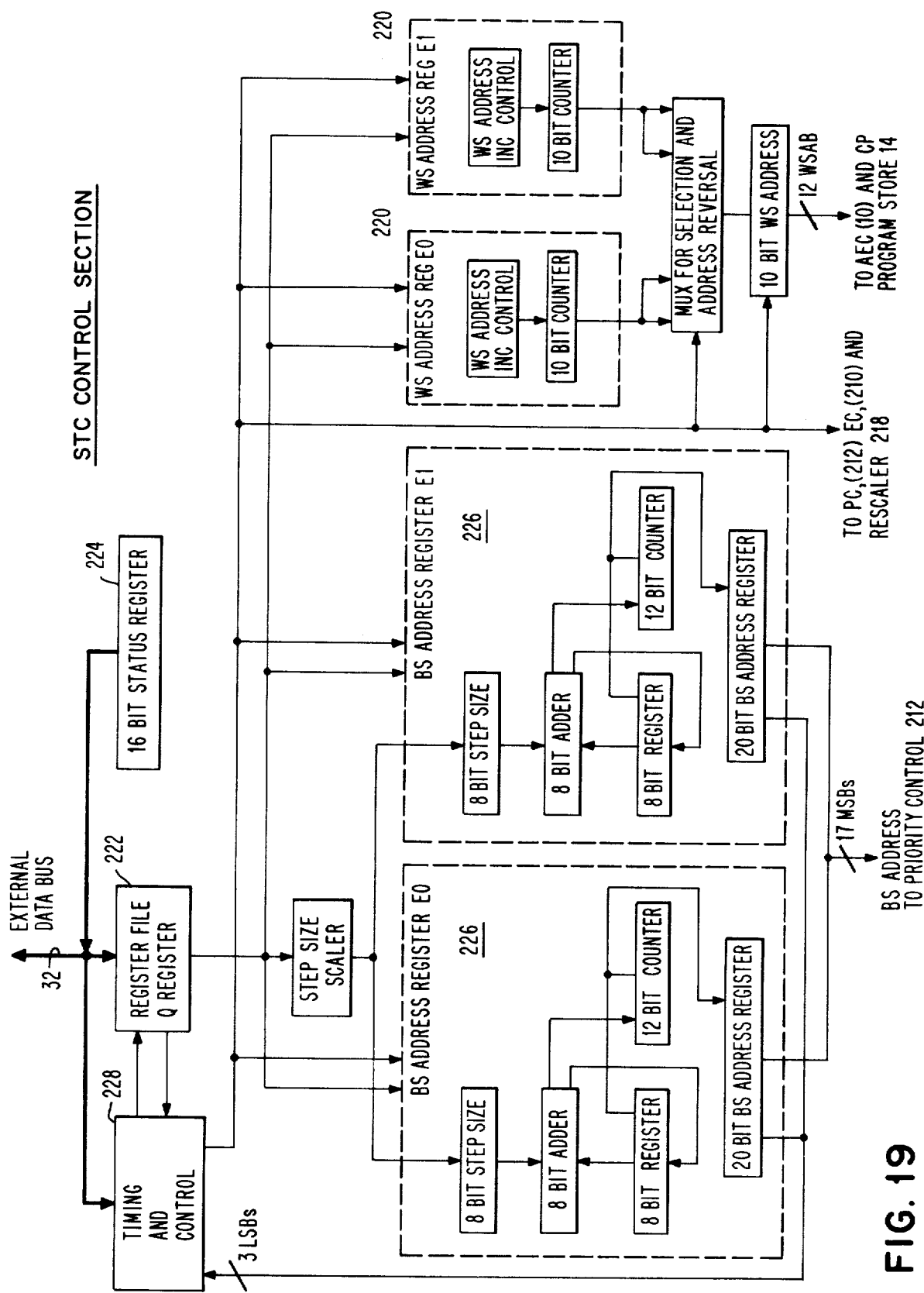
FIG. 19 is a more detailed diagram of the control section of the storage transfer controller.

The block diagram of the STC control section 216 is shown in FIG. 19. The input commands are buffered in the Queue Registers 222 until the required execution registers become available. At that time a command is loaded into an execution register and the storage transfer begins. There are two execution registers, one associated with even Working Stores 12 and the other with odd Working Stores 12.

The STC 162 shall have two Working Store Address Registers (WSAR) 220, one in each execution registers. Each WSAR 220 has 10 bits and is controlled by a variable increment control which shall advance the address by 1, 2, 4, 8, or 16 for bit reversal, and by 1 for all other commands.

The STC 162 has two Bulk Store Address Registers 226 each of which is capable of being incremented by any six-bit step value. Further, this six-bit step value shall be capable of being defined as either byte, half word, or word significant.

STC Rescaler Section

Figure 20:
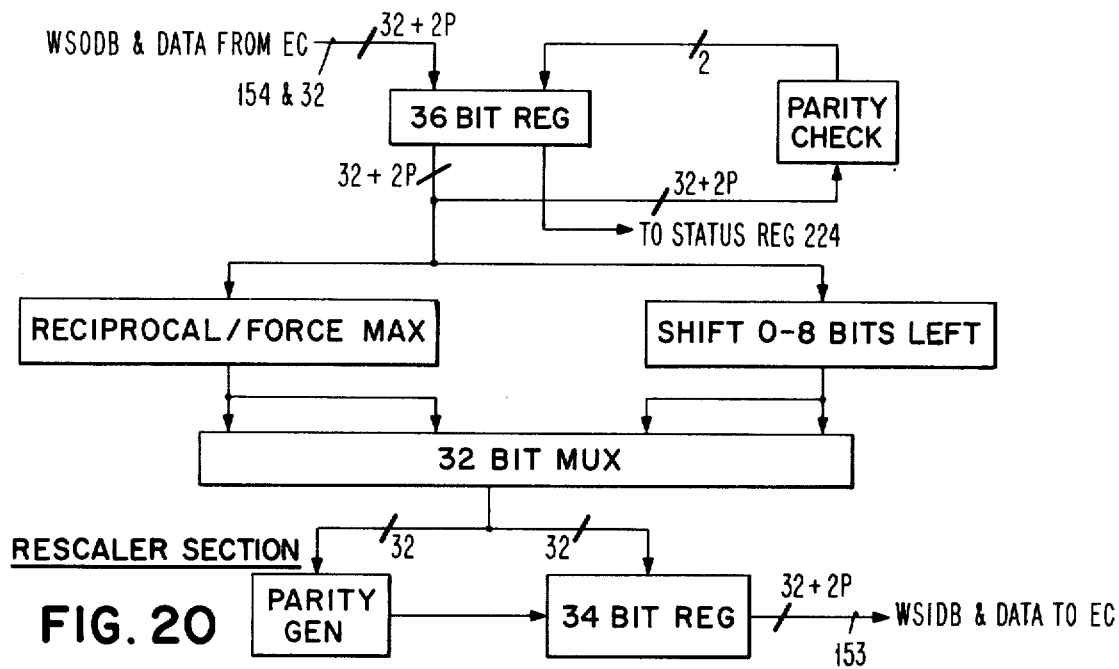
FIG. 20 is a diagram of the rescaler section of the storage transfer controller.

The Rescaler 218 is as shown in FIG. 20. The input port of the Rescaler 218 is 34 bits wide (32 data bits, 2 half word parity bits). The input port receives data either from the EC 210 or WS 12. The STC 162 will control which path is active. The output port is 34 bits wide (32 data bits, 2 half word parity bits) and shall supply data to both the EC 210 and WS 12.

The Rescaler 218 is capable of performing a zero to eight-bit left shift on a half word basis on data transferred from the WS 12 to the EC 210. When data is fed from the EC 210 to WS 12 the data will enter the rescaler 218 with its data bits reversed on a half word basis. That is, EC 210 data bit 0 will enter the rescaler 218 on the same input as WS bit 15, likewise EC 210 bit 1 and WS 12 bit 14 are the same, etc. The data will be reversed again on the output ofa half word basis. This results in an effective right shift.

The Rescaler 218 is capable of detecting an overflow on shift. If required by the command word the Rescaler 218 forces the maximum, positive or negative, value when overflow occurs. The Rescaler 218 forms an approximate reciprocal on a 16 bit basis when directed by the command word.

Data flow paths and data flow rates through the Rescaler 218 are controlled by the STC control section 216.

Priority Control

Figure 21:
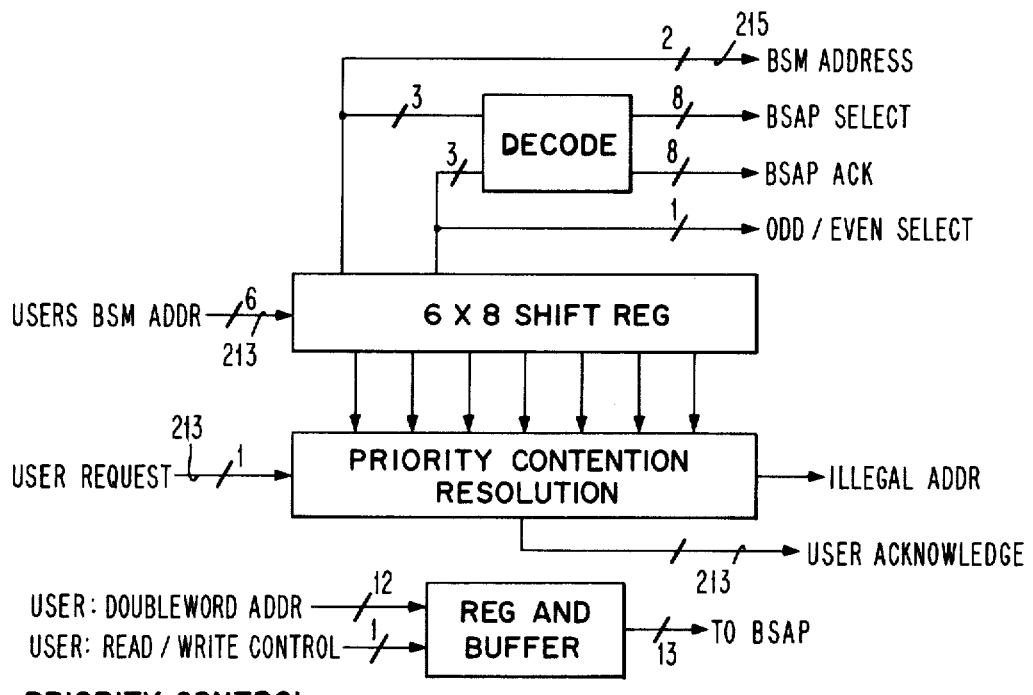
FIG. 21 is a diagram of the priority control in the storage controller.

The Priority Control element (PC) 212, shown in FIG. 21, resolves contentions between BS requests. Each user ISC 25, IOC 18, and STC 162 are assigned time slots of 100 ns duration when they may make a BS request.

Potential priority contention may be caused by the fact that the BS 6 access time on a module basis is longer than the MSP cycle time. This access time shall be compensated for by organizing the memory into 32 BSMs of 8K × 72 bits each. Each BSM shall be organized into even and odd halves. Separate controls shall be provided for each half. This reduces the frequency of priority conflicts since it doubles the number of accessible modules.

Any request to a given half BSM within less than 800 ns from a previous request shall be inhibited by a priority unit. To accomplish this the PC 212 shall sample the BSM addresses from the IOC 18, ISC 24, and STC 162, detect conflicts and generate an acknowledge signal to those devices selected.

Highest priority is assigned to the ISC 24. Next is IOC 18 and STC 162, respectively.

An ancillary function performed by the PC 212 is the detection of a priority request for a BSM not used in a particular configuration on the AU. The MSP has maximum addressing capability of 256K 72-bit double words. Each application configuration may implement a different memory size. To protect against a subunit attempting to access non-existent addresses, the PC 212 compares the addresses being requested by subunits with the highest address of that implementation. If the requested address is greater than this address, the PC 212 reports this fact to the user. The BS Address Size shall be provided from the CP 2 via the External Data Bus 32.

Figure 22:
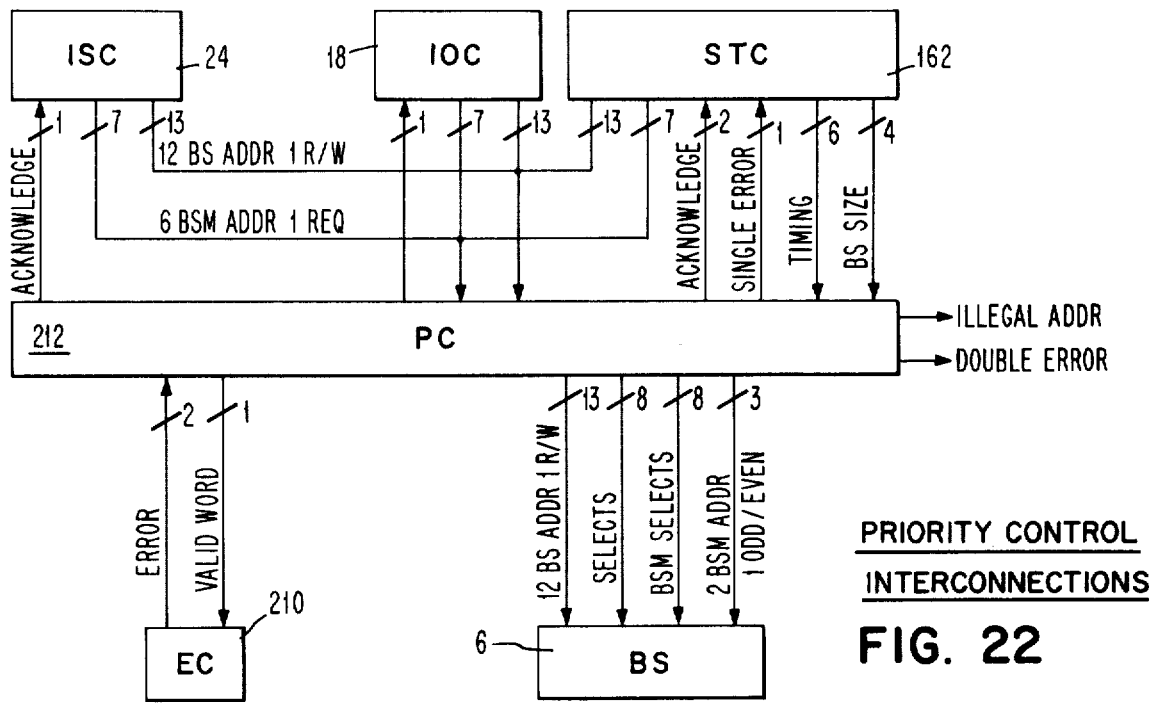
FIG. 22 is a diagram of the interconnection of the priority control in the storage control.

The PC 212 interface is shown in FIG. 22. The users provide a 6 bit module address and a request signal over a common bus to the PC 212. These signals are applied during the users allotted time slot. If contention does not exist for a request the user will receive a 100 ns acknowledge pulse. The user shall, at the proper time supply a 12 bit BS address and a Read/Write signal.

An illegal address and double error signal is supplied by a common bus from the PC 212. The user must strobe this line to determine if the indication applies to him.

The PC 212 will provide each BSAP with a select signal, and a 2 bit BSM address. These signals are used to begin a power-up status in a BSM. The PC 212 will, also, provide the even/odd select signal and an acknowledge signal to each selected BSAP. In addition the 12 BS address bits will be powered and sent to the BSAPs.

All timing controls are provided to the PC 212 by the STC 162. Single errors corrected by the EC 210 are reported to the PC 212. Also double error detected in the EC 210 will be indicated to the PC 212. The PC 212 provides the EC 210 with a valid word signal during a BS 6 read operation.

Detailed Description of the Storage Controller (SC)

The Storage Controller (SC) 8 provides the data path and controls for all data to/from Bulk Store (BS) 6. Data enters BS either from the Error Control Data Bus (ECDB) 214 or from Working Store (WS) 12. Data leaves BS either to the ECDB, to WS, or to Micro Store (MS) 30.

The SC 8 controls the use of BS 6 by resolving contention conditions among its users. There are four BS users; the IOC 18 and the ISC 24 utilize the ECDB 214 for data to/from BS 6, and two SC 8 users (E0 [450] and E1 [452]0 control data to/from BS utilizing the Working Store Data Bus (WSDB) 153-154. The E0 user has an additional task and that is to control CP 2 transfers to and from BS 6 over the ECBD 214. The IOC 18 and ISC 24 users may request BS 6 independent of any SC 8 operation.

The SC users execute transfers under control of the CP2. This is accomplished by decoding command words from the CP given over the External Data Bus (EDB) 32. The SC (E0 and E1) users, on transfers between BS 6 and WS 12, may perform various data manipulations e.g., compression, expansion, shifting and reciprocating. The E0 user controls CP transfers over the ECDB 24, MS 30 and WS 12 even transfers over the WSDB 153-154. The E1 user controls WS odd transfers over the WSDB 153—154.

The SC 8 provides error correction code for all data entering BS 6 and performs error checking on all data leaving BS 6. This error checking includes single and double error detection and single error correction.

The SC 8 is located in the control subunit:
1. Error Control 1 (EC1) 210 contains data flow logic and some controls for all data written to BS. This includes error correction code generation on all data to BS, and compression operations on data from WS to BS.

2. Error Control 2 (EC2) 210 contains data flow logic and some controls for all data from BS and data expansion on data from BS to WS.

3. Rescaler (RES) 218 contains data flow logic and some control for all data to EC1 and from EC2. This includes shifting and reciprocating data.

4. Priority Control (PC) 212 contains control logic for priority resolution of BS requests and other control functions of the SC such as block counters, BS address generation, clock distribution command word decode and EC1/EC2 multiplexer controls for compression and expansion.

5. Storage Transfer Controller (STC) 162 contains control logic necessary for the execution of data transfers commanded by the CP 2. This logic consists of buffer registers for queuing up command words from the CP 2, E0 450 and E1 452 execution registers and control, WS addressing generation, rescale controls for shifting and reciprocating, and status generation.

Storage Controller "Data Flow" refer to FIG. 24.

Error Control Data Bus (ECDB) 214 is a bidirectional bus consisting of 32 data bits and 2 parity bits. It provides the operational path to/from BS 6 for all data entering or leaving the Arithmetic Processor (AP) 4. The IOC 18 and ISC 24 are two of three users of this path and will be referred to as external users. External user data to BS 6 will enter error control 1 (EC1) 210A in 2 word (32 bits) transfers. EC1 buffers and assembles the 2 words into a double word and with a BS 6 request from the user, will generate error correction code (ECC) and send the double word to BS 6 over the BSIDB 7.

Data from BS 6 to the external user is initiated by a BS request from the user, a BS read cycle occurs and the double word is presented on the BSODB 9. Error Control 2 (EC2) 210B receives the double word, checks the ECC for single and double bit errors (corrects single errors), assembles 2 words from the double word and buffers them unitl called for by the user over the ECDB 214.

The third user of the ECDB 214 path is the CP 2, although the CP is external to the SC 8 it is considered an internal user. The SC, upon a command word from the CP, becomes the controller of CP data entering-/leaving BS. The E0 user has the responsibility for control of CP transfers. CP transfers use separate controls but the data flow is identical to that described for the external users.

Bulk Store (BS) to Working Store (WS) Transfer

In order to perform arithmetic operations on data, it must be transferred to WS 12 where the AP 4 can access it.

The SC 8 has two internal users of BS, E0 controls transfers for MS 30, WS even 12A and CP 2, while E1 controls WS odd 12B transfers. Transfers to WS are under command word control from the CP via the EDB 32. Upon command the SC will initiate the transfer by making a BS request. A double word from BS is received by EC2 210B, error checking is performed and expansion of the data may occur. The selection of a straight or expanded transfer is under control of the command word. The data is then assembled into 32 bit words destined to the Rescaler (RES) 218. Data entering RES can be either right shifted or reciprocated, on a half word basis, after which the word is destined to WS 12 over the WSIDB 153. The command word contains the number of words to be transferred (block count) and the SC will continue to request BS double words and transfer the data to WS until completion of the block count.

Bulk Store (BS) to Micro Store (MS) Transfer

Transfers to MS 30 are the same as described above for WS 12 except that no expansion, reciprocating or shifting takes place. The MS 30 load will provide the Arithmetic Processor 4 with microprogram control necessary to execute arithmetic operations on data in WS 12.

Working Store (WS) to Bulk Store (BS) Transfer

Upon completion of arithmetic operations on data, the SC 8 is commanded by the CP 2 to transfer the processed data from WS 12 back to BS 6. The transfer is initiated by the SC requesting data from WS 12. Data is received by RES 218 over the WSODB 154 in 32 bit words. RES may perform a left shift on data, on a half word basis, after which the words are destined to EC1 210A. Data may pass straight or be compressed by EC1, under command word control. The resultant words are then assembled into double words, error control code assigned and destined to BS 6.

Clock Distribution

The CP 2 generates eight clocks and distributes them to the system components. The SC 8 receives these clocks and uses them to generate additional clocks. The CP clocks and the additional clocks are then distributed, as required, to all SC functions.

Priority Control (PC)

The PC 212 will interface between BS 6 and its users to resolve any contention between BS users. FIG. 22 shows the interconnections of the PC with BS and its users. There are four BS users:
1. ISC
2. IOC
3. E0 (CP, MS, WS even) WS0, WS2, WS4, WS6
4. E1 (WS odd) WS1, WS3, WS5, WS7

BS priority is assigned to its users by time slots and all users share a common request bus.

TABLE XXXVIII

| Priority | User | Time Slot |
|---|---|---|
| 1 | ISC | T0 |
| 2 | IOC | T3 |

TABLE XXXVIII-continued

| Priority | User | Time Slot |
|---|---|---|
| 3 | E0 | T1 |
| 4 | E1 | T2 |

A user, when requesting BS, must provide a 12 bit address, a 6 bit BSM address and a Read/Write line. When a user is granted a BS cycle, a discrete acknowledge line is issued to that user by the PC 212.

The PC will store the BS user requests and insure that user addresses are issued to BS at the proper sequence time after an acknowledge. If an acknowledge is not granted the user must make the request again and reissue the address. Once a user has been acknowledged, a high priority user cannot get acknowledged (for the same odd or even module) until the lower priority user has completed the BS cycle and then, only if another request is made.

A given BS odd or even module can be accessed every 800 ns. The PC 212 will insure that requests within 800 ns of a granted request will be inhibited for that odd or even module. However, a user may request odd, even, odd, etc. of a given module or alternate between modules and access BS every 400 ns, providing there are no user conflicts.

BS Address

The PC receives 18 address bits plus 1 read/write bit from the user along with the request:
1. 3 bits of BSM address (0-2) for BSAP selection. The PC decodes these bits to select 1 of e BSAP's.
2. 2 bits of BSM address (3-4) for module selection. These bits are sent direct to BS by the PC and the interface logic provides a 1 of 4 module selection.
3. 1 bit of BSM address (17) for odd or even module selection. Again this bit is sent direct to BS.
4. 12 bits for addressing (5-16) within the odd or even module selected. The PC sends these bits direct.
5. Read/write for selection of the BS cycle type. The PC provides this bit direct to BS.

It is the users responsibility to provide the address to the PC according to timing requirements for the error control (EC) interface.

Figure 25:
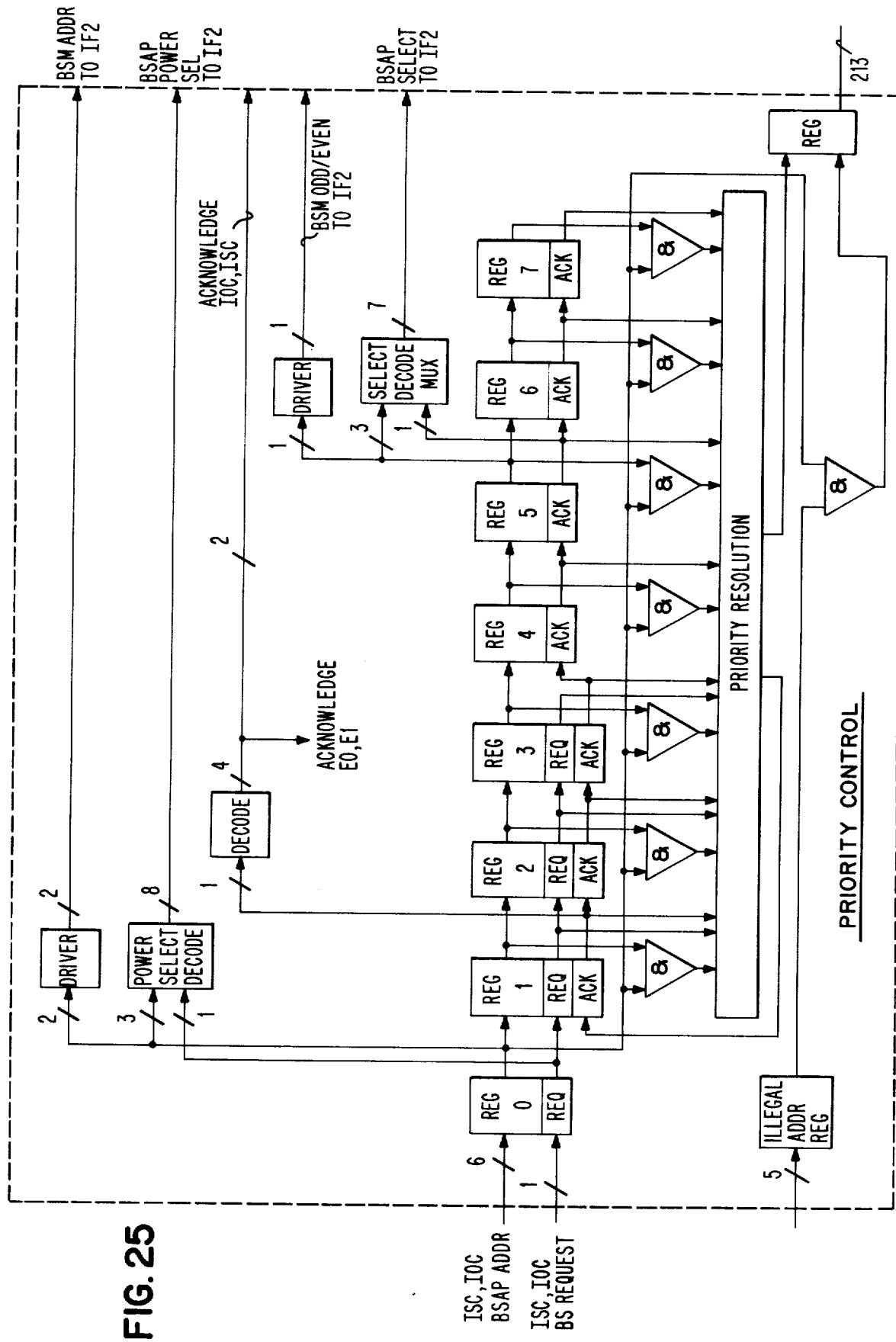
FIG. 25 illustrates the priority control.
Figure 37:
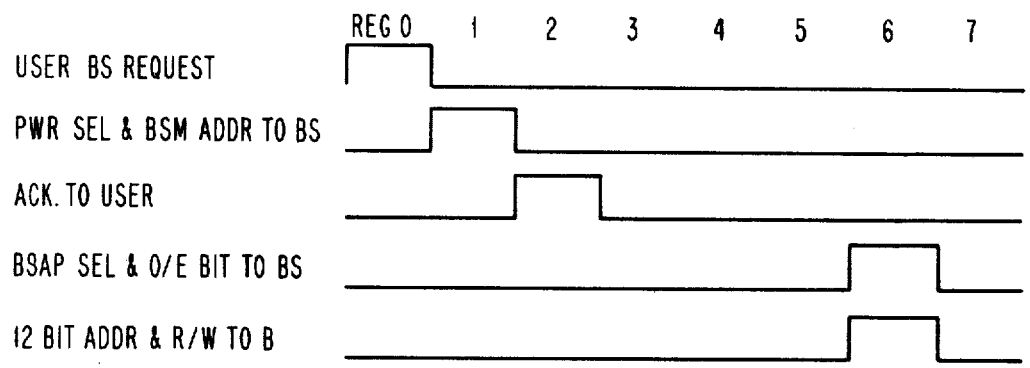
FIG. 37 illustrates a timing diagram for the bulk store cycle.

Refer to FIG. 25 for the following description. The 6 bit BSM address and the request from the 4 time slot users are presented to Register 1 every 100 ns. Register 1 through Register 7 contain a history of past requests, acknowledges and addresses. Register 0 is updated every 100 ns with new user information. This is then compared to the historical data contained in Register 1 through 7, if there is no address compare (no contention) then the PC will grant a BS cycle. During Register 0 time, while the compare is taking place, the user address (does not include the odd/even bit) is issued to BS and will initiate power on for the selected module. The user address is then loaded into Register 1 for the next 100 ns period. During Register 1 time, if the user was granted a BS cycle, the PC will issue an acknowledge to the user. The user history continues to propagate down the delay line where it is used for comparison with new requests. At Register 5 time, if an acknowledge was issued, the PC will send the BSAP selection and odd-/even bit to BS, also the user 12 bit address and the read/write bit will be sent. After Register 7 time the user information is discarded. A granted BS cycle has the timing relationship shown in FIG. 37.

Figure 26:
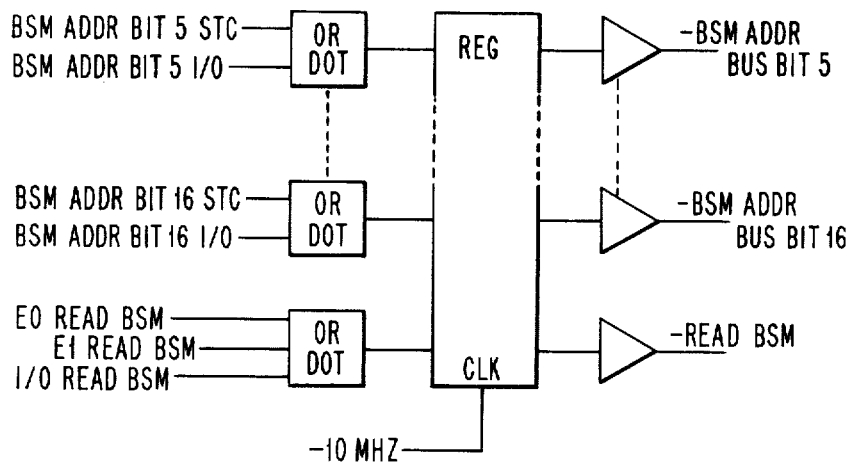
FIG. 26 illustrates the 12 bit BSM address register.

Notice that the 12 bit address and the read/write bit are delayed by 100 ns from the timing shown for the error control (EC) interface. FIG. 26 shows the 12 bit address and the read/write signal from the 4 users. The BSM address bits STC signal line are time shared between E0 and E1 controllers. The Register delays the data by 100 ns and insures that it is lined up with the BSAP selects and odd/even bit.

The priority mechanism works in the following manner. A user presents a request and address which is loaded into Register 0. A comparison of the address contained in Register 0 is compared with the past history of addresses contained in Register 1 through Register 7. If a comparison exists then the acknowledge line of the comparing Register 5 is interrogated. If the acknowledge line is active then the requesting user is denied the BS cycle. The user must reissue the request and address in order to compete for a BS cycle during the next request time (400 ns later). In the case where the acknowledge line is inactive, but there is a address compare, the comparing Register 5 request line (Register 1 through 3) is interrogated to see if its priority is higher or lower than the requestor. If the requesting user has the highest priority then a BS cycle will be granted it. However, if the requesting user is lower in priority then it is denied the BS cycle. In this case the requesting user must reissue the request and address in order to continue to compete for that address. The following examples of specific users are given for clarity:

1. E0 requests a BS cycle for address X. History shows that no other user has been acknowledged or has requested address X, then E0 is acknowledged and given a BS cycle.

2. E0 requests a BS cycle for address X. History shows that E1 has been acknowledged for address X and Register 3 contains the acknowledge, then E0 is inhibited from using BS for that request. If E0 requests BS again (400 ns later) for address X, E1 still has not completed the BS cycle and has an acknowledge contained in Register 7 and E0 is again inhibited. However, on the next request time for E0 (800 ns from the initial request) the E1 user has completed the cycle and if no other user high in priority has requested address X, then E0 is granted to BS cycle.

3. E0 requests a BS cycle for address X. History shows that no acknowledges have been issued for address X, but the IOC has requested address X and its request is stored in Register 2. The IOC was not acknowledged because address X was being used by ISC (ISC acknowledge container in Register 7) during the IOC request. Since the IOC has higher priority, then E0 the E0 user is inhibited form using BS on that request cycle.

If history had shown that no acknowledges were issued but E1 had requested address X (E1 request stored in Register 3), then E0 would be granted the BS cycle since it has higher priority than E1.

The PC provides a signal to the user of BS called illegal address. This signal is used to indicate that the user is trying to access a BS module that is not availale. Note that BS size may vary between systems. An illegal address register is loaded by the CP over the external data bus. The operating program will enter the BS size value (5 bits) into this register prior to executing BS requests. As BS requests are made by the users this value is compared with the users address (does not include the odd/even bit). If the user address exceeds the maximum BS size then an illegal address signal is issued to the user. Although an illegal address was detected, the PC will process the request normally. This, however, is of no consequence since the requested module does not exist.

Figure 27:
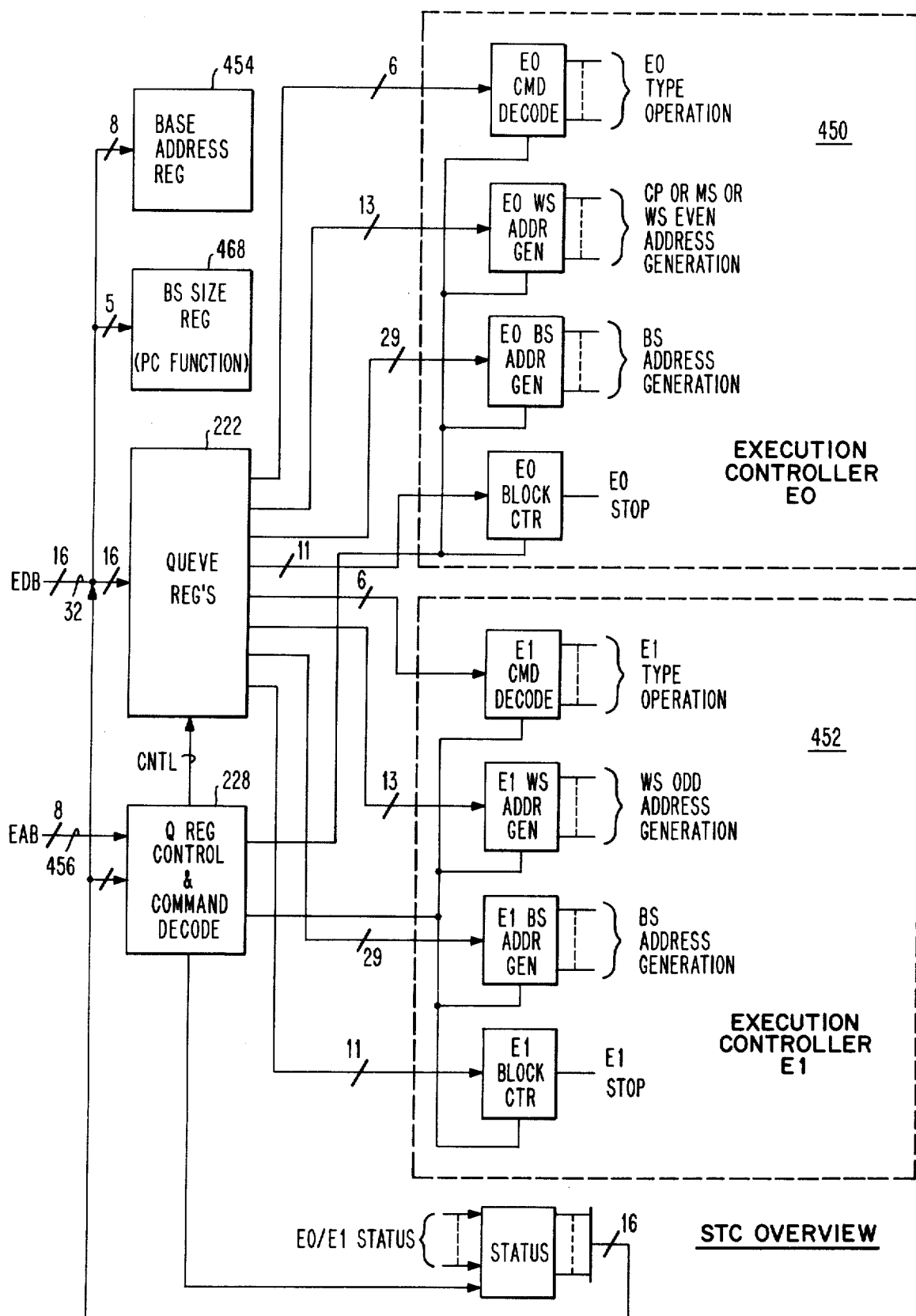
FIG. 27 illustrates the storage transfer control.

The Storage Transfer Controller (STC) 162 of FIG. 27 is responsible for receiving and queuing command words from the CP 2, controlling transfers for WS 12, MS 30 and CP 2 and reporting status back to the CP2.

When the STC 162 receives a command from the CP 2, it will queue the command in the Queue (Q) Registers 222 and the Q Register control 228 will determine which execution register (e) [450] or E1 [452] is to receive the command:

1. If CP 2, MS 30 or WS even 12A (either 0 or 2), then E0 450 will be the command controller.

2. If WS odd 12B (either 1 or 3), then E1 452 will be the command controller.

Once this is determined, then the command word is destined to that execution controller. E0 450 and E1 452 (execution controllers) are comprised of many discrete registers. Each discrete register is loaded with the portion of the command word that is unique to that registers' function, e.g., address generation, block size, command word decode, etc. after the transfer controller is loaded, the type transfer is decoded and the transfer is initiated. The transfer continues until the block count is complete at which time the controller stops. This operation continues until all commands that have been queued are executed. The STC 162 then generates as interrupt to the CP 2 indicating that it is available for more command words. The STC 162 may also interrupt the CP on error conditions and report status. This will be more fully explained in the section on status.

The Base Address Register 454 is used to store part of the address required for CP 2 or MS 30 transfers. This is more fully explained in the section on command word.

Command Word

Figure 28:
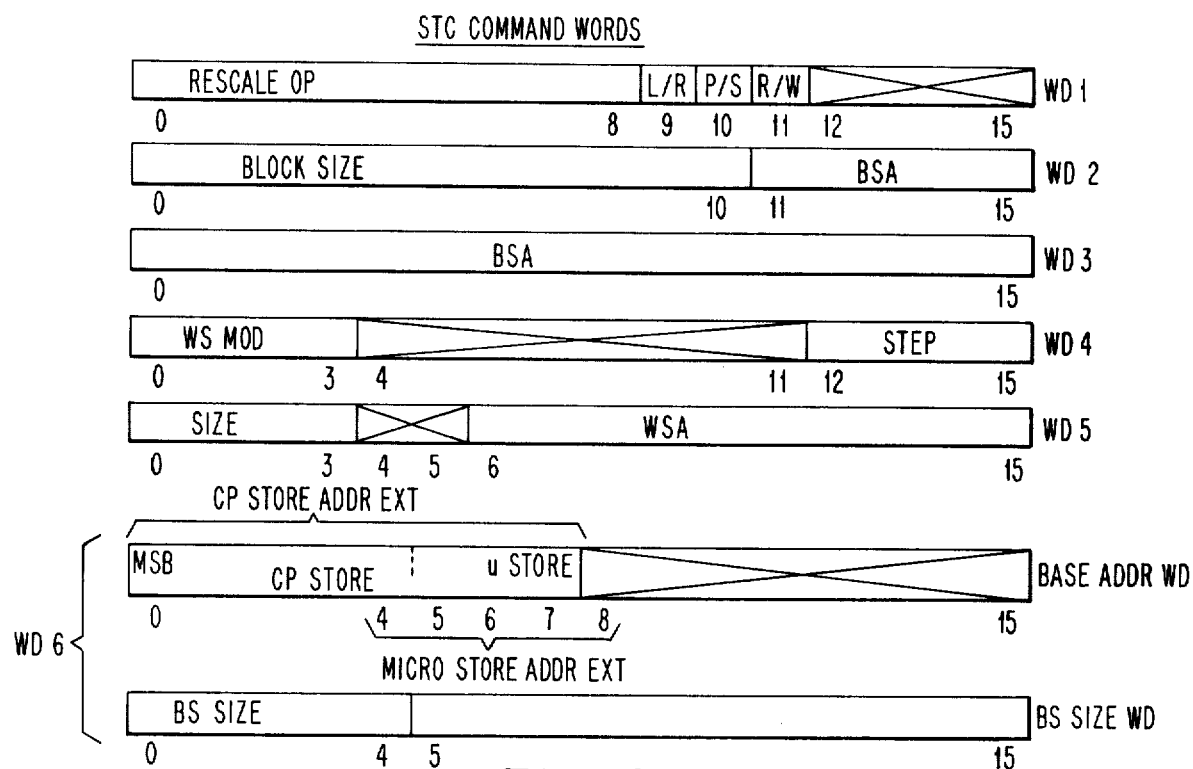
FIG. 28 illustrates the storage transfer control command words.

The STC 162 receives transfer command words from the CP 2 over the External Data Bus (EDB) 32. The destination of CP words are controlled by the External Address Bus (EAB) 456 and the appropriate control signals (refer to EDB interface timing). FIG. 28 shows the addresses of command words destined to the STC. The EAB 456 is an eight bit bus and the STC 162 decodes the five most significant bits (MSB's) as STC commands and the three low order bits as specific commands as shown in Table XL.

TABLE XL

| EAB | |
|---|---|
| 0 1 0 1 0 0 0 0 | COMMAND WORD 1 |
| 0 0 1 | COMMAND WORD 2 |
| 0 1 0 | COMMAND WORD 3 |
| 0 1 1 | COMMAND WORD 4 |
| 1 0 0 | COMMAND WORD 5 |
| 1 0 1 | SPARE |
| 1 0 1 | BASE ADDRESS WORD |
| 0 1 0 1 0 1 1 1 | BULK STORE SIZE WORD |

The STC 162 will respond to address hex 50 through 57 with 55 being unused. This provides for fewer command words received over the EDB 32. The EDB 32 consists of 16 bits of data making up each command word. Word 1 contains:

1. Rescale op code (9 bits), this selects the transfer operation to be performed (refer to section on command word structure).

2. Left/Right (L/R) bit which selects the left or right half of WS 12 to be used on a WS transfer (active selects WS right). This bit is also used as a DMA protect flag on CP transfers. The DMA protect flag, when active, allows writing into protected areas of program stoes (PS) 14. 3. Pair Select (P/S) bit is used on WS transfers either 8 to 16 or 16 to 16. When this bit is active the STC 162 will transfer pairs of data, e.g., on 8 to 16 it will take the specified 8 bits and the next 8 bits as a pair, on 16 to 16 it will take the specified 16 bits and the next 16 bits as a pair. Refer to the section on Rescale Operations for more detail. 4. Read/Write (R/W) bit specifies whether the transfer is a read of BS 6 or a write to BS (active selects a BS read). 5. Bits 12 through 15 are unused.

Word 2 contains:

1. Block size (11 bits). This field specifies the number of operands in the transfer. For BS writes, the operand is 64 bits or the block size equals the number of double words to be written in BS 6. For BS reads, the operand is 32 bits or the block size equals the number of words to be read from BS 6. The block size value given will be $n-1$ where $n$ is the number of operands to be transferred. Following are some examples:

TABLE XLI

| Operation | # of Operands | Block Size Value |
|---|---|---|
| | | EDB BIT 0 1 2 3 4 5 6 7 8 9 10 |
| Read | 2 (Words) | 0 0 0 0 0 0 0 0 0 0 1 |
| Read | 1024 (Words) | 0 1 1 1 1 1 1 1 1 1 1 |
| Read | 2048 (Words) | 1 1 1 1 1 1 1 1 1 1 1 |
| Write | 1 (Double Word) | 0 0 0 0 0 0 0 0 0 0 0 |
| Write | 1024 (Double Word) | 0 1 1 1 1 1 1 1 1 1 1 |

2. BS Address (5 bits). This field contains 3 bits to select 1 of 8 BSAP's and 2 bits to select 1 of 4 BS modules.

Word 3 contains:

1. BS address (12 bits) to specify the starting BS address within an odd or even module. Bit 0 is the MSB of this 12 bit field.

2. Odd/even bit, which is EDB bit 12, specifies the starting odd or even module.

3. Three bits to specify the starting BS byte address.

activated the same, except that the read/write bit is inactive (specifies a BS write). Refer to the section on Rescale Operations for more detail.

The STC 162 also uses these 4 bits to determine execution register to destine the command word.

TABLE XLII

| EDB Bit 0 1 2 3 | Destination |
|---|---|
| 0 0 0 0 | E0 |
| 1 0 0 0 | E0 |
| 0 1 0 0 | E1 |
| 0 0 1 0 | E0 |
| 0 0 0 1 | E1 |

The all zeros condition must be used for MS 30 and CP 2 transfers.

2. Bits 4 through 11 are not used.

3. Step size (4 bits). These 4 bits make up one half of the total. 8 bits required to specify step size. Bit 12 is the MSB of the 8 bits and the other 4 bits are contained in Word 5. The step size is the number of steps between BS data in bytes, e.g., a 16 to 16 read operation with a step size of 6 if shown in the following table:

TABLE XLIII

| BS ADDRESS | BYTE ADDRESS | | | | | | | |
|---|---|---|---|---|---|---|---|---|
| | 000 | 001 | 010 | 011 | 100 | 101 | 110 | 111 |
| X | Word Y | | | | | | | Word Y+1 |
| X+1 | | | | | | Word Y+2 | | |
| X+2 | | | | Word Y+3 | | | | |
| X+3 | Word Y+5 | | | | | | | Word Y+6 |
| X+4 | | | | | | | Word Y+7 | |
| | ETC until block count is complete | | | | | | | |

The same transfer only 8 to 16 is shown in the following table:

TABLE XLIV

| BS ADDRESS | BYTE ADDRESS | | | | | | | |
|---|---|---|---|---|---|---|---|---|
| | 000 | 001 | 010 | 011 | 100 | 101 | 110 | 111 |
| X | | WD Y | | | | | | WE Y+1 |
| X+1 | | | | | | WD Y+2 | | |
| X+2 | | | | WD Y+3 | | | | |
| X+3 | | WD Y+4 | | | | | | WD Y+5 |
| X+4 | | | | | | WD Y+6 | | |
| | ETC until block count is complete | | | | | | | |

The aforementioned BS addressing will select a double word from BS. The STC 162 has the capability to start the transfer with any byte of the double word, and uses the 3 bit byte address to specify the starting byte, e.g., byte address 100 specifies bits 32 through 39 of the first double word as the starting byte of data. During BS write operations the byte address is forced to be zero by the STC 162 since data to BS 6 is always packed or compressed to minimize the amount of bulk storage required.

Word 4 contains:

1. WS 12 module (4 bits) selection. Bit 0 active selects WS 0, bit 1 active selects WS 1, bit 2 active selects WS 2 and bit 3 active selects WS 3. Only one WS should be selected for a given transfer unless a broadcast or merge operation is to be selected. Broadcast is activated by selecting one WS odd and one WS even module and the read/write bit active (specifies a BS read). Merge is The step size has many restrictions. Tables XLV-E and XLV-F under Rescale Operations should be referred to for specific details. For BS write operations the data is compressed and step options are not applicable, but unlike the byte address the step size must be specified for writes.

Word 5 contains:

1. Step size (4 bits). Bits 0 through 3 make up the other half of the 8 bit step size with bit 3 being the least significant bit (LSB). Refer to previous explanation of word 4 step size.

2. Bits 4 and 5 are not used.

3. WS address (10 bits). This field specifies the WS starting address with bit 6 being the MSB. This field is also used to specify the MS 30 or CP 2 starting address when those operations are specified by the Rescale op code.

Base Address Word contains:
1. CP address (8 bits). The base address register is loaded with either 8 bits for extension of the CP address or 5 bits for extension of the MS address. The STC 162 will assemble the WS address form word 5 and the base address word, when the rescale op code indicates either a CP transfer of a MS transfer.
2. Bits 8 through 15 are unused.

Bulk Store Word Contains:
1. BS size (5 bits). This field specifies the physical size of the BS 6. The PC 14 will use the BS 6 size data to compare with each users address (does not include the odd/even bit) as BS requests are made, to determine if an illegal address has been requested.
2. Bits 5 through 15 are unused.

The STC 162 has diagnostic capabilities associated with some parity bits and the error correction circuits. Parity bits can be forced to the opposite state, error correction can be disabled and the error code generator can have any combination of check bits forced to the opposite state. The diagnostic program can exercise these capabilities and use the results to aid in fault location. The program selects the combination to be used for a given operation by loading an external register.

The register is physically located in the Arithmetic Element Controller (AEC) 10 logic and is loaded over the EDB 32. Table XL shows the EAB address required and the specific bits of the command word. The output of the register is sent to the SC (EC1 [210A], EC2 [210B], and RES 218) where each control bit is exclusive ORed with the actual bit. If the control bit is a zero then the actual bit is passed unaffected. If the control bit is a one then the actual bit will be inverted. The disable error correction is the only control bit that differs in operation. This bit is used as an enable (bit is zero) or disable (bit is one) on the correction circuit decoder.

Rescale Operations refer to FIGS. 38A-38E and Table XLVI.

The STC 162 controls all transfers in and out of BS 6. On transfers to and from WS 12 various data manipulations can be made. The type of Rescale operation is controlled by the Rescale op code contained in word 1 of the command word. This field contains 9 bits which are decoded by the STC 162 for selection of the specified operation. There are 9 basic operations that can be performed and these are selected by bits 9 through 3:

1. Op Code 0 selects 8 to 16 Bit Reverse operation and can be performed either on a BS read or write.

TABLE XLVII

| Bit | RESCALE OP 0 & 4 ONLY | | | INC VALUE |
|-----|---|---|---|---|
|     | 2 | 3 | 4 |   |
|     | 0 | 0 | 0 | 1 |
|     | 0 | 0 | 1 | 2 |
|     | 0 | 1 | 0 | 4 |
|     | 0 | 1 | 1 | 8 |
|     | 1 | 0 | 0 | 16 |
|     | 1 | 0 | 1 | 32 |
|     | 1 | 1 | 0 | 64 |
|     | 1 | 1 | 1 | 128 |

This operation is used for bit reversed addressing of data in WS 12. The WS address register (WSAR) can be incremented by $2^0$ through $2^8$ as selected by the 3 bit INC WSAR field. The address is then bit reversed or swapped end for end and then sent to WS.

TABLE XLVIII

| ADDRESS BIT | 0 | 1 | 2 | 3 | 4 | 5 | 6 | 7 | 8 | 9 | |
|---|---|---|---|---|---|---|---|---|---|---|---|
| PREVIOUS WS ADDR | 0 | 0 | 0 | 0 | 0 | 0 | 0 | 0 | 0 | 0 | add the INC to the previous address |
| INC VALUE = 2 | 0 | 0 | 0 | 0 | 0 | 0 | 0 | 0 | 0 | 1 | |
| RESULTANT | 0 | 0 | 0 | 0 | 0 | 0 | 0 | 1 | 0 | 1 | |
| BIT REVERSED ADDR | 1 | 0 | 1 | 0 | 0 | 0 | 0 | 0 | 0 | 0 | |

The 8 to 16 function during a BS write is a compression operation. Data may be left shifted as specified by the 4 bit shift value and then compressed from 16 bits to 8 bits. The shift is performed by the rescaler 218 on a 16 bit basis. Bits 5 through 8 specify the shift value as indicated by Table XLIX.

TABLE XLIX

| Bit | SHIFT FUNCTION | | | | Shift Value |
|---|---|---|---|---|---|
|   | 5 | 6 | 7 | 8 |   |
|   | 0 | 0 | 0 | 0 | 0 |
|   | 0 | 0 | 0 | 1 | 1 |
|   | 0 | 0 | 1 | 0 | 2 |
|   | 0 | 0 | 1 | 1 | 3 |
|   | 0 | 1 | 0 | 0 | 4 |
|   | 0 | 1 | 0 | 1 | 5 |
|   | 0 | 1 | 1 | 0 | 6 |
|   | 0 | 1 | 1 | 1 | 7 |

TABLE XLVI

| Rescale Code | Field | | | | | | | | | Operation | Allowed During BS Operation |
|---|---|---|---|---|---|---|---|---|---|---|---|
|   | 0 | 1 | 2 | 3 | 4 | 5 | 6 | 7 | 8 |   |   |
| 0 | 0 | 0 |   | Inc. |   | SHIFT |   |   |   | 8 ⟷ 16, Bit Reverse Wsar | R/W |
| 4 | 0 | 1 |   | WSAR Inc. |   | SHIFT |   |   |   | 16 ⟷ 16, Bit Reverse WSAR |   |
| 8 | 1 | 0 | 0 | WSAR 0 | S/R | SHIFT |   |   |   | 8 ⟷ 16 | R/W |
| 10 | 1 | 0 | 1 | 0 | X | X | X | X | X | 24 ⟷ 32 | R/W |
| 11 | 1 | 0 | 1 | 1 | X | X | X | X | X | 4 ⟶ 16 | R |
| 12 | 1 | 1 | 0 | 0 | S/R | SHIFT |   |   |   | 16 ⟷ 16 | R/W |
| 13 | 1 | 1 | 0 | 1 | X | X | X | X | X | Write Micro Store | R |
| 14 | 1 | 1 | 1 | 0 | X | X | X | X | X | Reciprocal | R |
| 15 | 1 | 1 | 1 | 1 | X | X | X | X | X | CP Store Transfer | R/W |

TABLE XLIX-continued

| Bit | SHIFT FUNCTION | | | | Shift Value |
|---|---|---|---|---|---|
|   | 5 | 6 | 7 | 8 |   |
|   | 1 | 0 | 0 | 0 | 8 |

All values above 8 will result in a shift of 8. On a rescale op code of 0 the over flow detection circuits are enabled. An over flow will be detected whenever a bit different in value than the sign bit is shifted out. When this condition occurs a maximum positive or negative value is forced for the 16 bits. The sign bit will determine if the value is positive or negative. FIG. 38A gives examples of left shifting and over flow detection.

The left shifted 16 bits is then sent to EC1 210A for compression. EC1 will compress the data by truncating the low order 8 bits.

The 8 to 16 function during a BS read is an expansion operation. EC2 210B will expand 8 bits of data to 16 bits by left adjusting the 8 bits of data and inserting 8 zeros as the 8 low order bits. The 16 bits of data is then sent to the rescaler 218 for right shifting. The data is right shifted according to the shift value specified. Again the shift value can be from shift 0 through shift 8. When right shifting the sign regenerate circuits are enabled. These circuits function to insert the sign value into the MSB position as the 16 bits of data are right shifted. FIG. 38B shows examples of right shifting.

2. OP Code 4. This operation selects 16 to 16 bit reverse and can be performed either on a read or write of BS 6. This operation is identical to op code 0 except the data will not be expanded or compressed. The bit reverse, shifting, over flow detect and sign regeneration are exactly as described for op code 0. FIG. 38C shows two shifting examples of a 16 to 16 operation.

The following codes will not have the bit reverse capability. The INC WSAR field is replaced by decoding all four bits for op code and bit 4 as ~ sign regenerate optional selection bit. This is optional only for op code 8 or 12. The shift values will be identical to that explained for code 0, on those codes allowing a shift operation.

3. OP Code 8. This operation selects an 8 to 16 with sign regenerate option and shifting selectable. The operation can be performed either on a read or write of BS 6. The compression or expansion of data is the same as described for op code 0. The shifting operation is the same as explained for code 0 except that over flow detect (BS write) and sign regenerate (BS read) are under control of the S/R bit 4. If this bit is active then the identical operation as described for op code 0 takes place. If this bit is inactive then on a left shift (BS write) there is no over flow detection and on a right shift (BS read) the MSB has zeros shifted in instead of the sign bit value.

4. OP Code 10. This selects 24 to 32 operation on either a read or write of BS 6. A shift of data is not allowed and the shift bits must be zero. A sign regenerate or over flow detect is not a valid selection for this operation. On a BS write, 32 bits are received from WS 12 and EC1 210A compresses them to 24 bits by truncating the low order 8 bits.

On BS reads, the double word is received from BS 6, the first 24 bits are taken and expanded to 32 bits by filling the low order bits with zeros. Then the next 32 bits are taken and filled with zeros, etc.

A 24 bit value, B is expanded and becomes the next WS word. 16 bits of a value C and 8 bits of the value C from the next BS word, are expanded and become the next WS word.

5. OP Code 11. This operation is a 4 to 16 expansion and can only be performed on a BS read. Sign regenerate is not applicable to this operation. Right shifting, however, is allowed as explained for op code 0 on a BS read operation. The 4 to 16 expansion is somewhat different from the others in that contiguous 4 bits of data are taken from the BS double word and then filled with 12 bits of zeros to the left of the data. This is the only op code where data is right justified and zeros are filled to the left. An example of 4 to 16 is given below where contiguous 4 bits of data are expanded to 16 bits and then a right shift, as specified, may take place.

6. OP Code 12. This operation is a 16 to 16 with sign regenerate option and a selectable shift value. The op code is valid for both a read and a write of BS 6. The shift function is the same as explained for op code 0 and the sign regenerate is the same as explained for op code 8. This operation, with a shift of zero selected, provides a direct means of transfer form BS 6 to WS 12 or from WS 12 to BS 6.

7. OP Code 13. This is a BS read operation and is used for loading MS 30 with the AE microprograms stored in BS 6. A shift is not allowed and sign regenerate is not an option. When this op code is selected, data will be transferred from BS 6 directly to MS 30 without modification.

8. OP Code 14. This op code provides a reciprocal function on data from BS 6 to WS 12. A shift function and sign regenerate function are not valid on this operation. This operation will cause the approximate reciprocal of each 16 bit operand from BS 6 to be sent to WS 12. For the reciprocal of a 16 bit value the 16 bit operand will be scanned from left to right checking for the first bit that is different in value than the sign bit. Upon detection of this, the bit position and value are noted and the value of that bit is placed in the reciprocal position of the bit noted. All other bits are forced to be the same value as the sign bit.

9. OP Code 15. This op code is used for CP 2 transfers over the ECDB 214. Data cannot be transferred to/from WS 12 with this op code. Sign regenerate and shift values are not valid on this operation. CP data on the bidirectional ECDB 214 may be written to or read from BS 6. When this operation is selected the STC 162 becomes the controller (E0 450) for CP 2 transfers and E0 450 becomes a user of BS 6 over the ECDB 214.

Pair Select Operations

Pair select operations are allowed on certain op codes. Pair select is activated on a transfer when the STC 162 recognizes that PS 30 bit 10 of command word 1 is active. The STC 162 will take the 8 bit or 16 bit operand along with the next contiguous operand to form a pair. FIG. 38D shows an example of pair select 16 to 16.

In the example X1 at BS address M is the 16 bit operand addressed by the BS byte address and the X2 operand is taken to make up the pair. This pair is transferred to WS address N as shown in the example. X3 and X4 make a pair, X5 and X6 etc. FIG. 38E has an example of pair select 8 to 16.

This is like 16 to 16 except the operand is only 8 bits. X1 at BS address M is the first 8 bit operand with X2 making the pair, X3 and X4 form a pair etc.

Merge Operation

The merge operation allows two WS's that are specified as the source for a BS write (one WS odd and one WS even) to have their data interleaved and sent to BS 6. Merge is initiated by selecting a WS even and a WS odd in the same command word. When this occurs both E0 450 and E1 451 receive the command word from the queue register 222. Data from the WS's 12 is then interleaved with E0's 450 data, left justified and E1's 452 data assembled to its right. This interleaving action continues until a double word has been assembled and sent to BS 6. This assembly of double words as described above continues until the block count is complete. Merge is valid only for 8 to 16 or 16 to 16 op codes.

Broadcast Operation

The broadcast operation allows data from a common BS 6 source to be broadcasted to two WS's 12 (one odd WS and one even WS). Broadcast selection is recognized by the STC 162 when a command word has both even and odd WS modules specified along with a BS read operation. When this occurs both E0 450 and E1 451 will receive the same command word from the queue register 222. Data from BS 6 is then requested and distributed to both WS's 12.

STC Status

The STC status word is a 16 bit word read by the CP 2 over the EDB 32. The STC 162 will place status on the EDB 32 when selected by the CP 2. The CP 2 selects status by addressing the STC 162 over the EAB 456 and issuing the read control line along with a select. Refer to EDB interface description for timing.

The STC status word (16 bits) consists of the following information:

TABLE L

| Status Word Bit | Definition |
|---|---|
| 0 | Busy Bit - If the busy bit is active then no Queue (Q) Registers 222 are available for command words from the CP 2. |
| 1 | Spare. |
| 2-3 | Next Q Address - This designates which Q Register 222 is to be loaded next. Note, this field is invalid if the Busy Bit is active. |
| 4-7 | Interrupt Q Designation - This bit significant field designates which Q Registers 222 have completed a command word execution since status was last read. Bit 4 specifies Q0, bit 5 Q1, etc. |
| 8-11 | Error Condition Code - This field identifies the condition causing an error condition interrupt. Only the first error condition to occur will be identified. This field is reset by a CP read of status. |

| Error Cond. Code | | | | |
|---|---|---|---|---|
| 8 | 9 | 10 | 11 | |
| 0 | 0 | 0 | 0 | No error condition. |
| 0 | 0 | 0 | 1 | PS 30 (Program Store) ECODB Parity Error - During CP write operations (BS read) detection of bad parity will be issued to the STC by the CP 2. The signal received called ECDB parity error DMA, if active, will set this status code. |
| 0 | 0 | 1 | 0 | Double Error Detected - Detection of double errors from BS 6 by EC2 452 are sent to the STC 162. The STC will set this status code for either an Eo or El double error. |
| 0 | 0 | 1 | 1 | Not used. |
| 0 | 1 | 0 | 0 | Invalid Op Code - Certain invalid operations are detected by the E0 and E1 controllers and cause this status code to be set. The following specific conditions set this code:<br>1. E0 Controller 450<br>  a. WS0 and WS2 selected simultaneous for a BS write operation.<br>  b. Op Code 11 (4 to 16) detected for a BS write operation.<br>  c. Op Code 13 (MS transfer) detected for a BS write operation.<br>  d. Op Code 14 (reciprocal) detected for a BS write operation. |
| 0 | 1 | 0 | 0 | 2. El Controller 452<br>  a. WS1 and WS3 selected simultaneous for a BS write operation.<br>  b. Op Code 11 (4 to 16) detected for a BS write operation.<br>  c. Op Code 14 (reciprocal) detected for a BS write operation. |
| 0 | 1 | 0 | 1 | Illegal PS Address - During CP transfers, if an illegal program store address is used by the STC controller (E0), then the CP will raise a line called illegal address DMA. The STC will set this status code upon detection of that signal. |
| 0 | 1 | 1 | 0 | Invalid Load - The invalid load status code is set when the CP attempts to load any command word from 1 through 5 (EAB address hex 50 through 54) during a time when the STC is busy. Busy indicates that no Q Registers are available. |
| 0 | 1 | 1 | 1 | Not used. |
| 1 | 0 | 0 | 0 | Illegal BS Address - This status code is set when the STC detects an illegal address signal from the prior controller (PC). |
| 1 | 0 | 0 | 1 | PS Protect Check - During CP transfer operations, if the STC controller (E0) receives the protect error DMA signal from the CP then this status code will be set. The protect error DMA signal is ussed by the CP when the STC controller (E0) attempts to write into protected areas of program store without the DMA protect flag being active. Recall that the DMA protect flag is EDB bit 9 of command word 1 and is controlled by the CP. |
| 1 | 0 | 1 | 0 | PS ECIDB Parity Error - During CP read operations (BS write), detection of bad parity by EC1 is issued to the STC. The STC upon recognizing the parity error will set this status code. |
| 1 | 0 | 1 | 1 | Not used. |
| 1 | 1 | X | X | Not used. |

| | |
|---|---|
| 12-13 | Q Q of Error Condition - This field identifies the Q Register address of the command which let to the error condition. This field is reset when the CP reads the status. |
| 14 | WSODB Parity Error - The rescaler performs parity checking on all words from WS. Upon detection of a parity error the STC is notified and this status bit is set. |
| 15 | Single BS Error Detected - EC2 provides a single error detection and correction capability. When a single error is detected, the STC is notified and this status bit is set. Normally a single error is always corrected, but single error correction may be disabled by the CP, in either case, this bit is set by the detection of a single error. |

Figure 29:
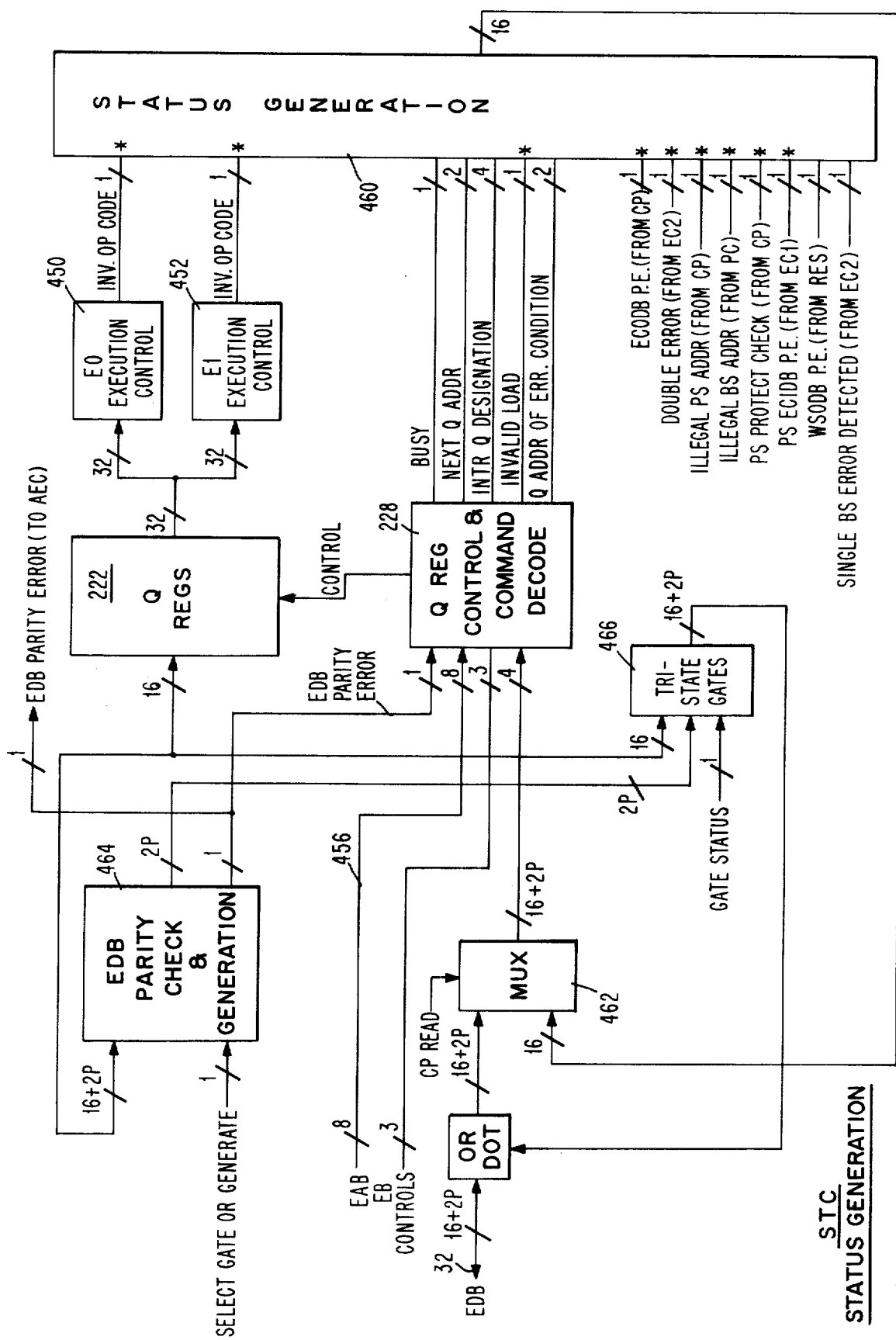
FIG. 29 illustrates the storage transfer control status generation circuit.

FIG. 29 shows STC staus generation circuit. The EDB 32 is a bidirectional bus and is used by the STC 162 to receive all command words (7 words) and to issue STC status to the CP 2. All operations on the EDB 32 are under the control of the CP 2. To receive command words, the CP 2 must issue the proper address along with controls. The Q Register Control 228 decodes the EAB 456, determines which command word is on the bus, and loads the respective Q Register 222. For this operation data is passed through the top leg of the MUX 462 and distributed to the Q Register 222, the parity checker 464 and the tri-state gates 466 (which are turned off). The parity checker 464, if an error is detected, sends bad parity information to the Q Register Control 228, which insures that the word just loaded in the Q Register 22, is not used, and sends the same information to the Arithmetic Processor Controller (AEC) 10 where it will be reported to the CP 2. The AEC 10 also checks EAB 456 parity errors for the STC 162. The AEC 10 combines the two parity errors (EDB 32 or EAB 456) into one EB parity error line for reporting to the CP 2.

During STC 162 operations there are two conditions that will generate an interrup to the CP 2.

1. Transfer Complete Interrupt — This interrupt is generated when all virtual Queue registers (two Queue registers and two Execution controllers) are empty. This signal will remain on until the CP 2 reads the STC status word.

2. Error Condition Interrupt — This interrupt will be generated by any error conditions defined by the STC status word (bits 8 through 11). This signal will remain on until the CP 2 reads the STC 162 status word.

If either of the two interrupts occur it is up to the CP 2 to read status. When a read occurs the MUX 462 swings down to pass the status to the parity generator 464 and the tri-state gates 466. Parity is generated and sent to the tri-state gates 466. The Q Register Control 228 upon receiving the status read command will activate the gate status signal to the tri-state gates 466 and status is placed on the EDB 32.

The status generation circuit 460 provides straight status of the following lines:
1. Busy (1)
2. Next Q Address (2)
3. Interrupt Q Designation (4)
4. Q Address of Error Condition (2)
5. WSODB Parity Error (1)
6. Single BS Error Detected (1)

One bit of status is not used and the four error condition code bits (8–11) are coded from the remaining 9 error condition signals.

Command Decode

The command decode is accomplished by the STC 162 in order to determine which command word is on the EDB 32. The command word, when decoded, will either allow status to be read or load the command word into the BS size register 468, Base Address Register 454 or correct position of the Q Register 222. The decoder receives the 8 EAB bits and the CP select signal from the CP 2.

Figure 30:
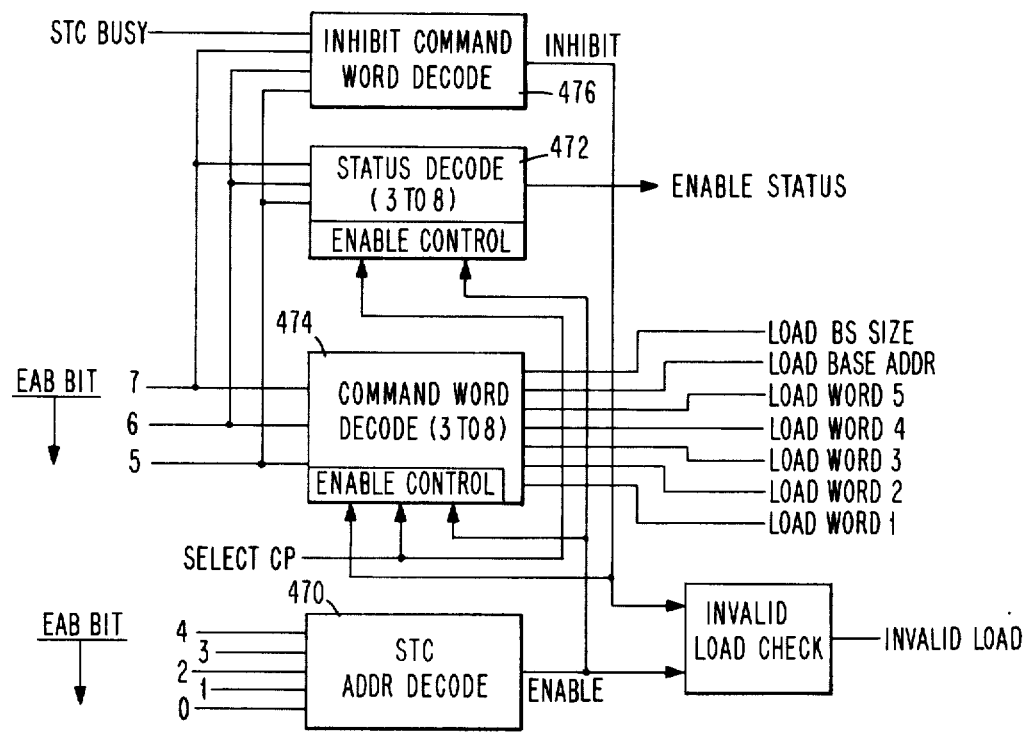
FIG. 30 illustrates the command word decode.

Referring to FIG. 30, the STC address decoder 470 receives EAB bits 0 through 4 and determines if the address is for the STC 162. If so, an enable line is issued to the status 472 and command word 474 decoders.

The inhibit command word decode circuit 476 checks EAB bits 5 through 7 and the STC busy signal. If command word 1 through 5 is detected and the STC 162 is busy then an inhibit is issued to the command word decode preventing the decode from taking place. This is necessary since there are no Q Registers 222 available. The invalid load check circuit when an inhibit occurs, will check to see if its an STC command, if so, then an invalid load signal is sent to the STC status circuit. If the STC 162 is not busy, then the command word decode circuit is enabled with a select CP 2 and one output line is activated to load the EDB word in the respective register.

The status decode 472, decodes EAB bits 5, 6 and 7 for a status read. When this occurs, if the STC address decoder enable and the CP select are active, then the status decoder 472 will issue the enable status signal. This signal is used to gate the STC status onto the EDB 32. The status decode 472 is the only CP 2 read command used by the STC 162.

On every STC controlled transfer the STC 162 must receive the 5 basic command words (word 1 through 5).

The base address word, however, is required only for CP 2 or MS 30 transfers and the BS size word is initially required prior to any user making BS requests. This register need only be loaded once after a power on. There is only one restriction in the order that the command words are presented and that is command word 5 must be last in the sequence. The decode of command word 5 (load word 5) is used by the STC 162 to indicate that the command has been loaded (all registers) and is ready for execution.

Q Registers and Controls

The Q Registers 222 are used to queue up commands from the CP 2 over the EDB 32. The STC 162 has two queue registers 222 (Q0 and Q1) and two execution controllers (E0 450 and E1 452) together they provide storage for up to four commands from the CP 2. From this we derive four Q Registers 222 (two real and two virtual). All commands from the CP 2 are loaded first into the Q Registers 222 and then transferred to the Execution Controllers 450, 452, thus making the Q Registers 222 available for more commands. A Q Register 222 will immediately transfer to an Execution Controller 450, 452 when it is available.

The Execution Controller 450 or 452 is not a buffer as is the Q Register 222 and must store the command until the transfer is complete. Q0 and Q1 are buffer registers completely independent of E0 or E1 type transfers. Either Q0 or Q1 can transfer their contents to either E0 or E1. The destination of the Q Register contents to E0 or E1 is controlled by the WS module select (word 4 of the command) and will be discussed later in this section.

The four Q Registers 222 will have a tag address associated with them. This address can be read by the CP 2 on a status read, informing the CP which Q Register address is available for the next command. The STC 162 will store which tag address has been assigned to each command and if any error occurs that address is made available to the CP 2 via status. The CP can use this information to determine which command had an error associated with it.

Figure 31A:
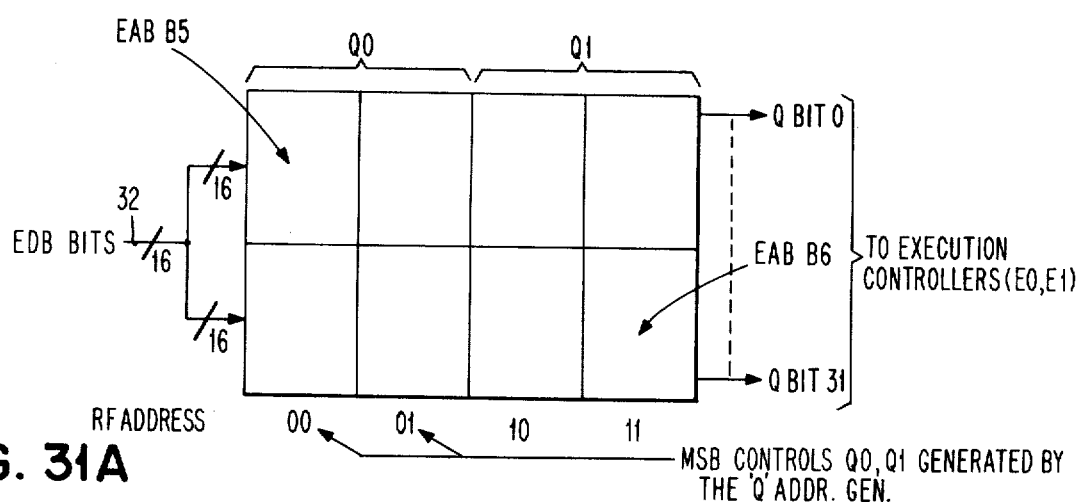
FIG. 31A illustrates the Q registers.

The Q Registers 222 consist of eight 4 × 4 register file (RF), refer to FIG. 31A. Functionally, for RF's make up the top half 16 bits and four for the bottom half 16 bits. The 16 EDB bits are provided to both halves. The two halves of address 00 and 01 make up Q0 and the two halves of address 10 and 11 make up Q1. EDB data is written into the selected Q Register 16 bits at a time, when the Q Register is full (detected by command word 5), the data is presented to the Execution Controllers. The Q to E transfer control will then load the appropriate Execution Controller.

It was previously mentioned that up to four commands could be queued. The Q Registers are loaded with alternate commands controlled by the MSB of the RF address. The commands are transferred to the Execution Controllers 450 or 452 and then the Q Registers 222 become available to receive the next two commands, thus queuing four commands. The queuing of four commands is possible only if one of the first three commands is destined to a different controller than the other two. If the first two commands were E0 types, then only the first Q Register loaded would be able to transfer to E0. The second Q Register must buffer the command until E0 has completed the first command. However, the first Q Register 222 being empty can accept the third command. If it is another E0 type transfer, then the first Q Register must buffer it until the first command has completed and the second Q Register has transferred its data to E0, and E0 has completed the second command. If the third command happened to be an E1 type transfer then the first Q Register could immediately transfer to E1 and then accept the fourth command. To summarize, four commands can be queued if at least one of the first three commands is a different type (E0 or E1) than the other two. If the first three commands are destined to the same controller 450 or 452, then only three commands can be queued.

Table LII-B shows the same two Q Registers laid out horizontally. The top two halves (address 01) contain command words 1, 3 and part of word 4. The second two halves contain command words 2 and 5. Q1 register, when selected, is loaded with the same format of data as Q0. Data from a Q Register is transferred to the Execution Controller selected in two loads. The Q to E transfer control will select to read Q Register address X1 and load its data at load A time into half of the execution registers, the, selecting address X0 it will load data into the remaining half of the execution registers at load B time. Load A and B times are interleaved between E0 and E1, thus using all four time slots of a clock cycle.

FIG. 31 shows the detail of the Q Registers 222. Again the Q Registers consist of eight 4 × 4 register files with two tag addresses of the four assigned to each Q Register. The Q address generator will generate the MSB of the Q registers write address which is used to select the Q0 or Q1 register. The Q address generator will normally toggle between Q0 and Q1 unless one of the Q's happen to be on hold because the execution controller is busy. In this case, the Q address generator can select the same address twice if that Q register becomes available. For example, E0 450 is busy with a command just transferred from Q0, Q1 is loaded with a command destined to E0 and is in a hold condition, Q0 is available and receives a command for E1 452, E1 is available and Q0 transfers to E1. Q1 would normally be next in line but it is still in a hold condition waiting for E0 to complete. In this case the Q address generator would enable Q0 again since it is available. The LSB of the Q register write address is determind by EAB bit 5 for the top half and EAB bit 6 for the bottom half. The following table shows the relationship of the Q addresses to the command words being loaded:

TABLE LI

| External Address Bus Word | | | | | | | | | |
|---|---|---|---|---|---|---|---|---|---|
| 0 | 1 | 2 | 3 | 4 | 5 | 6 | 7 | | |
| 0 | 1 | 0 | 1 | 0 | X | X | X | | |
| STC COMMAND | | | | | 0 | 0 | 0 | WORD | 1 |
| | | | | | 0 | 0 | 1 | | 2 |
| | | | | | 0 | 1 | 0 | | 3 |
| | | | | | 0 | 1 | 1 | | 4 |
| | | | | | 1 | 0 | 0 | | 5 |
| SPARE | | | | | 1 | 0 | 1 | SPARE | |
| | | | | | 1 | 1 | 0 | BASE ADD WORD | |
| | | | | | 1 | 1 | 1 | BULK STORE SIZE WORD | |

TABLE LLI-A

| Q0 | | Q1 | | |
|---|---|---|---|---|
| MSB | LSB | MSB | LSB | Command Word |
| 0 | 1 | | 1 | Load Word 1 |
| 0 | 0 | 1 | 0 | Load Word 2 |
| 0 | 1 | 1 | 1 | Load Word 3 |
| 0 | 1 | 1 | 1 | Load Word 4 |
| 0 | 0 | 1 | 0 | Load Word 5 |

The write enable of each RF is derived from the command word decode. The top three RF's are loaded with load 1 or 5. This signal is active for either word but during word 1 the address is X1 and during word 5 the address is X0. Using the Table LII-A and Table LII-B one can see how the command is physically structured in the Q register.

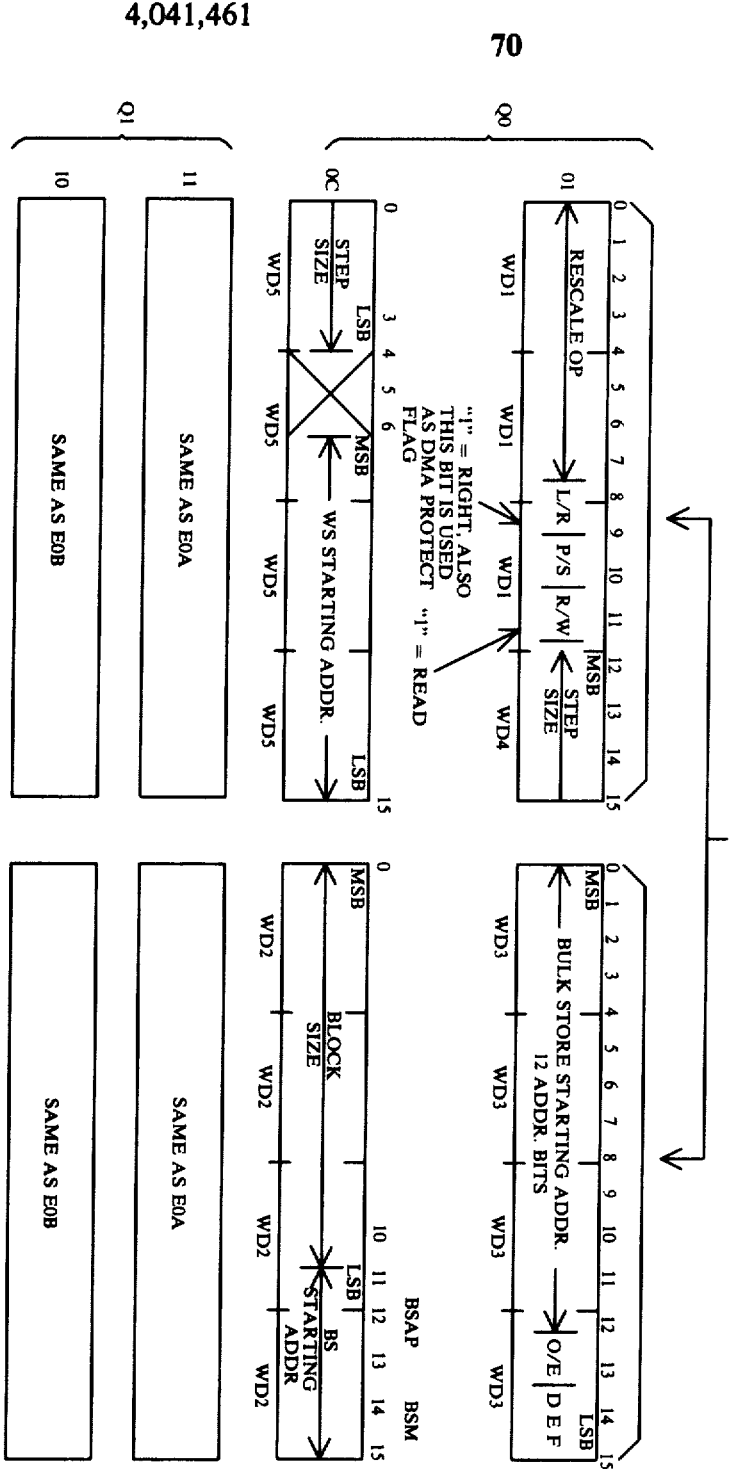

During a Q register read operation the destination must first be determined. This is accomplished by the Q to E transfer control logic 228. The Q to E transfer control inspects the four module select bits of each command to determine the destination of the command. Four possibilities exist:

1. E00 — transfer from Q0 to E0.
2. E01 — transfer from Q1 to E0.
3. E10 — transfer from Q0 to E1.
4. E11 — transfer from Q1 to E1.

For a merge or broadcast operation E00 and E10 or E01 and E11 would be simultaneously selected. This will allow the same command either from Q0 or Q1 to be transferred to both execution controllers.

Figure 31B:
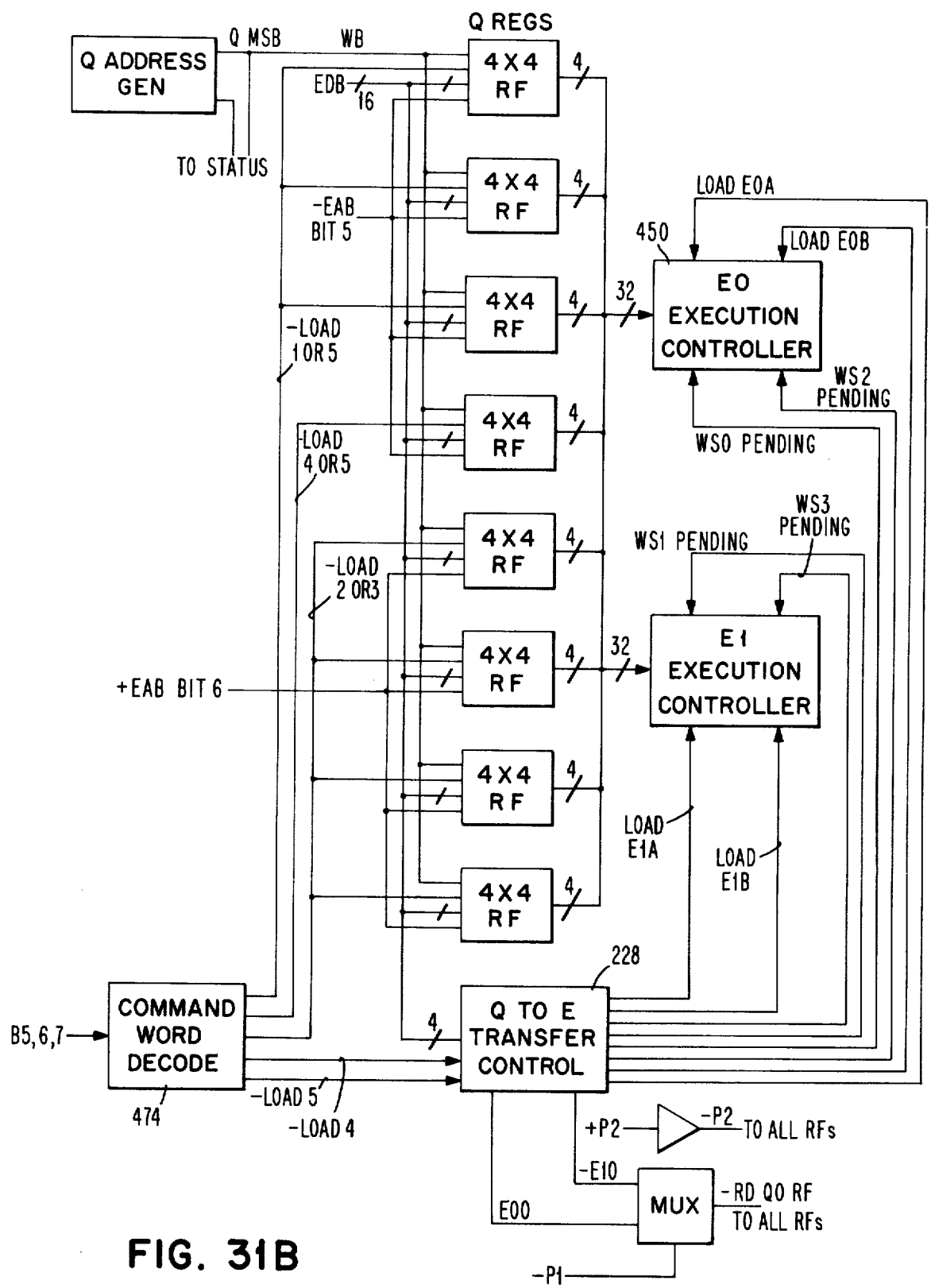
FIG. 31B is a further illustration of the Q registers.

The Q to E transfer control 228 operates by loading the module select bits (4) into holding registers at load word 4 decode. There are two holding registers that receive the same four bits, one for a Q0 load and one for a Q1 load. At load word 5, one of two Q valid latches will be set. Q0 valid latch is activated if the Q MSB had selected Q0, and the Q1 valid latch if the Q MSB has selected Q1. The Q valid latch is used to sense the respective register containing the module select bits. The result of this action will activate the selected Q to E transfer line. Two of the Q to E transfer lines are multiplexed as shown in FIG. 31B, to generate the RD Q0 RF signal. This signal and the P2 signal are used as the read address for the Q registers. The read address may best be explained with the following table.

TABLE LIII

|  | T0 | T1 | T2 | T3 |
|---|---|---|---|---|
| MSB = RD Q0 RF | E00 = 1 | E10 = 0 | E00 = 0 | E10 = 0 |
|  | E01 = 1 | E11 = 1 | E01 = 1 | E11 = 1 |
| LSB = P2 | 1 | 1 | 0 | 0 |
| Load E0A | ON | OFF | OFF | OFF |
| Load E0B | OFF | OFF | ON | OFF |
| Load E1A | OFF | ON | OFF | OFF |
| Load E1B | OFF | OFF | OFF | ON |

Figure 39:
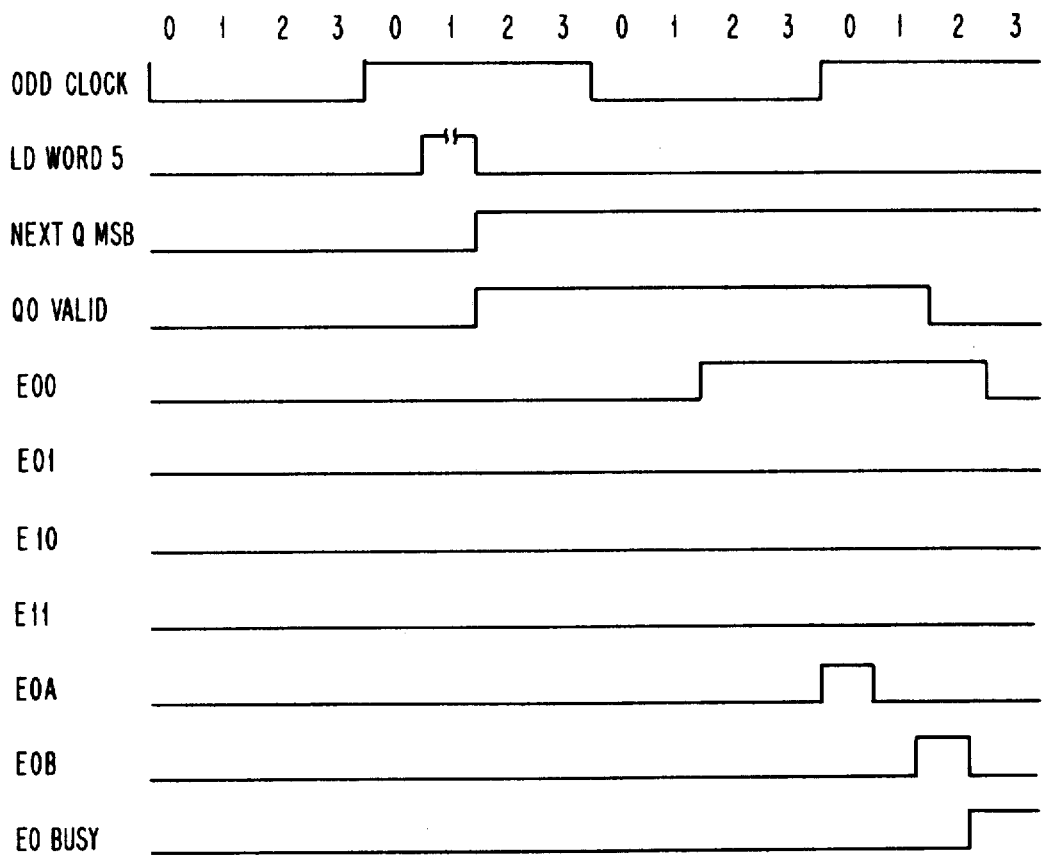
FIG. 39 illustrates the timing diagram for a typical working store even load from QO(EOO).

From the diagram one can easily see that during the T0 time slot that command words 1, 4 and 3 (32 bits) will be loaded into the E0A registers from either Q0 (address 01) or Q1 (address 11). At T2 time, command words 2 and 4 (32 bits less 2 unused bits) will be loaded into E0B registers from either Q0 or Q1. Time slots T1 and T3 provide the same format load to the E1 execution registers 452. The previous Table LIII shows all possibilities of Q to E transfers while FIG. 39 shows a typical WS even load from Q0 (E00).

The load word 5 signal is decoded from the command words. This signal is considered to be asynchronous to STC operations and must be synchronized to the proper time. This is accomplished by setting the Q valid latch on the trailing edge of 1d word 5 and gating the output of the latch with T2 and the not odd clock (even). This signal is then used to set the E00 latch. When the Q0 valid latch is set it enabled the next Q MSB to switch to Q1 in preparation for loading the next command. The four Q to E signal lines are sensed (in this case E00 is active) and at T0 even the load E0A is issued to the E0 registers. At T2 even the load E0B is issued to the remaining E0 registers. Q0 valid is dropped when load E0B occurs and the E00 signal is dropped at the trailing edge of load E0B. Also, at the trailing edge of load E0B a signal called E0 Busy is activated, this signal remains on until the completion of the command just loaded into the E0 execution controller. E1 also has a busy signal for its operations. It might be mentioned at this time that the E0 Busy and the E1 Busy signals are not the same as the Busy signal discussed in the status section. That Busy signal is common to the STC 162 and denotes that the STC is busy (no Q Registers 222 available), while the E0 Busy and E1 Busy denote that the respective Execution Controller 450 or 452 is busy.

The Q to E transfer control 228 also provides the WS pending signals (4) to the Execution Controllers 450 or 452. These signals are generated by comparing the four EDB module select bits that are stored in the module holding registers to the Q and E transfer signals (E00, E01, E10 and E11). Only one WS pending line can be activated for each controller:

| WS0 pending | |
| WS2 pending | WS even to E0 controller 450 |
| WS1 pending | |
| WS3 pending | WS odd to E1 controller 452 |

The compare function is as follows:
1. WS0 pending = E00·EDB Bit 0 + E01·EDB Bit 0
2. WS1 pending = E10·EDB Bit 1 + E11·EDB Bit 1
3. WS2 pending = E00·EDB Bit 2 + E01·EDB Bit 2
4. WS3 pending = E10·EDB Bit 3 + E11·EDB Bit 3

The WS pending signal will be loaded into an execution register for control of WS 12 during WS transfer operations.

Execution Registers

There are two execution registers, one for E0 operations 450 and one for E1 operations 452. The execution registers consist of static and dynamic, discrete registers.

Static registers are loaded with command information and the registers retain this information during the transfer operation. The dynamic registers are loaded with command information and are continually updated during the transfer operation. The following table is a list of the discrete registers making up an execution register:

TABLE LV

| Static Registers | Dynamic Registers |
|---|---|
| Increment | WS Address |
| Base Address (E0 only) | Block Counter |
| WS Control | BS Address |
| OP Code | Byte Address |

Since the discrete registers are duplicated for the E1 controller 452 (except for the Base Address Register), the following description of each discrete register will be a general description for both E0 450 and E1 452 with any unique deviations pointed out.

OP Code Register and Decode

Figure 32:
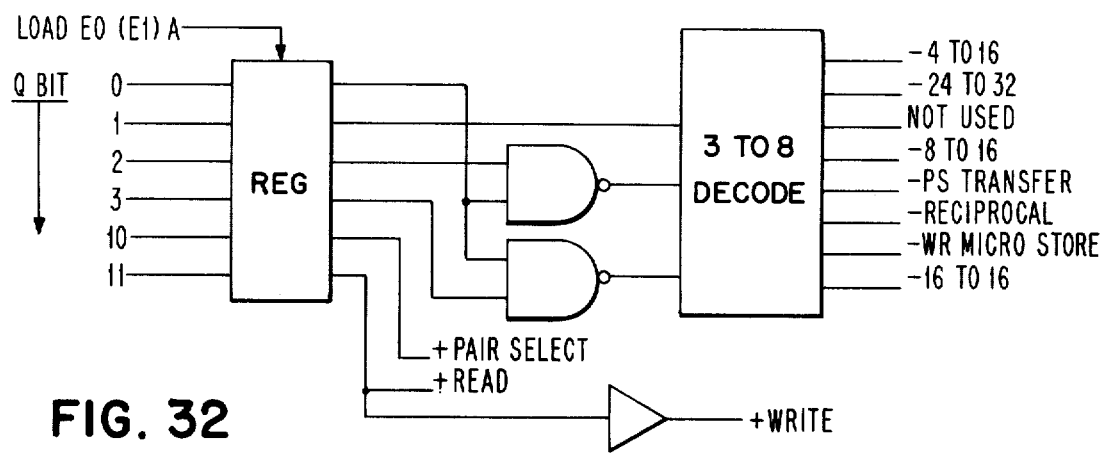
FIG. 32 is an illustration of the Op code register and decode.

The OP Code Register and Decode shown in FIG. 32 provides storage for the four op code bits, the pair select bit and the read/write bit. The pair select bit and the read/write bit are provided directly to the appropriate SC 8 circuits, while the four op code bits are decoded to provide the command operation to take place. The op code register is static and is loaded by the load E0A signal from the Q to E transfer control 228. The command information is stored and used during the entire transfer execution.

WS Control Register

Figure 33:
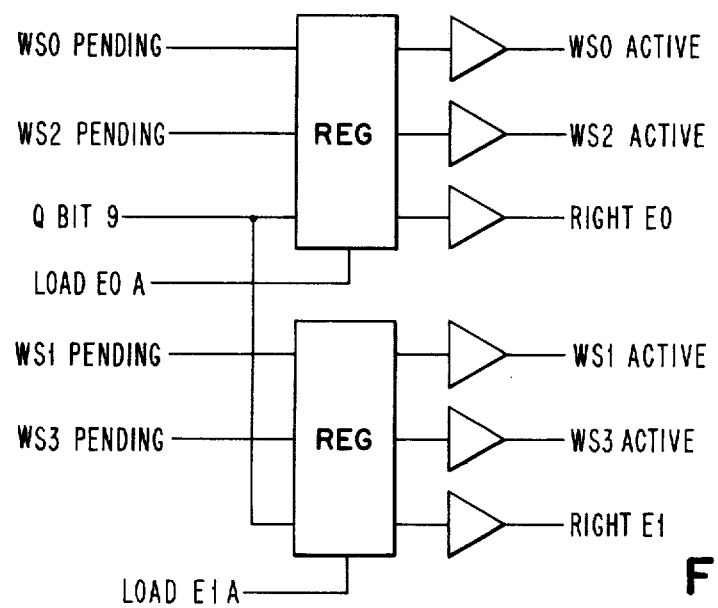
FIG. 33 illustrates the working store control register.

The WS Control Register is shown on FIG. 33. This register is used to store the WS pending bit and the left/right bit. The register is static and is loaded by the load EO(EI)A signal. Once loaded the register will maintain the data for the entire command execution. The output signal lines are sent to the AEC 10 which interfaces directly to WS 12. These signals are used by the AEC 10 to select the appropriate WS left 12A or right half 12B.

Interface Requirements

Figure 40:
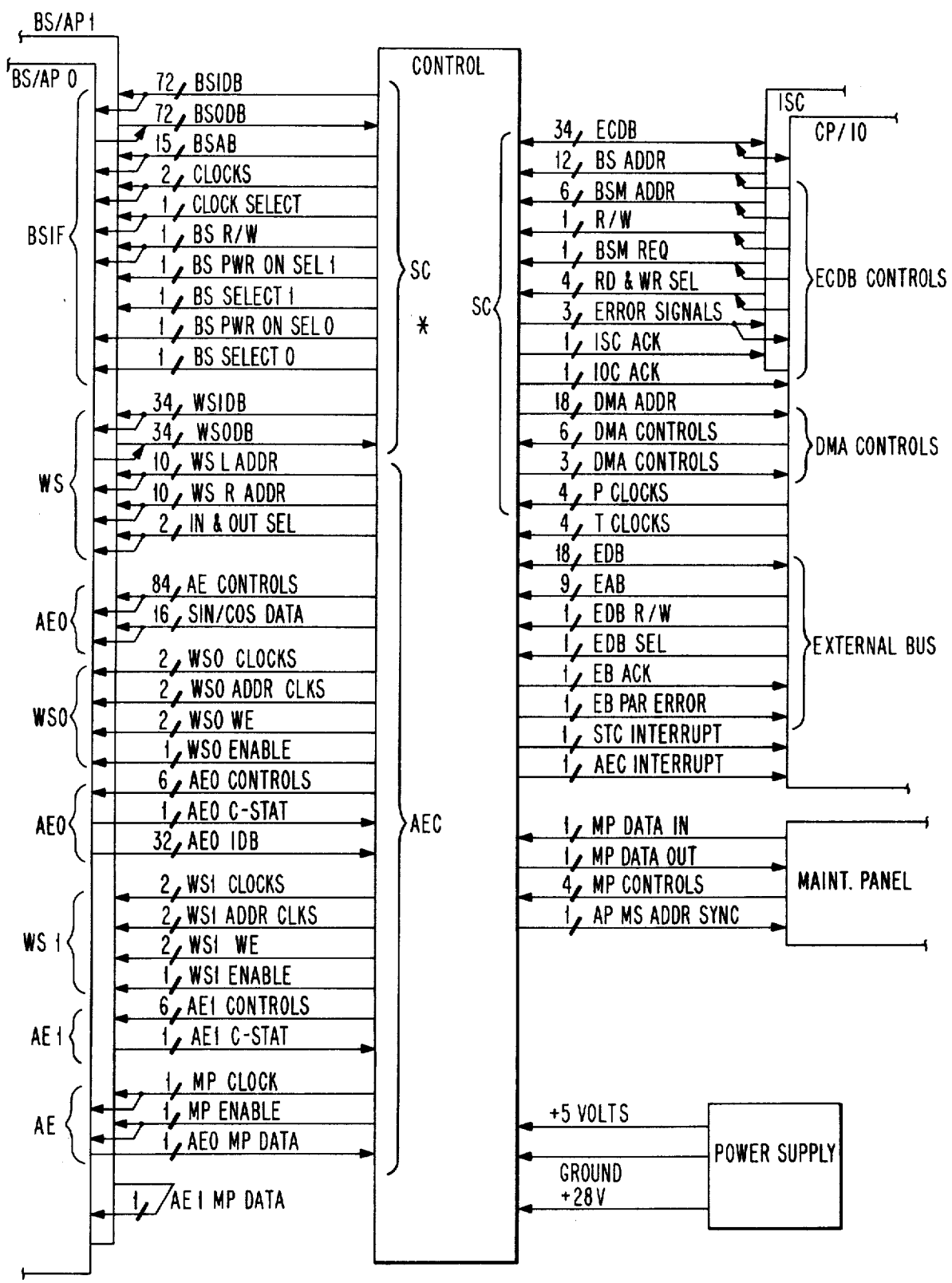
FIG. 40 illustrates the interconnection of the control with the bulk store/arithmetic processor and the control processor/input output.

The Control Subunit 230 has interfaces with four other subunits of the Analyser Unit. These are the CP/IO, BS/AP, ISC and Power Supply subunits. FIG. 40 shows the Control Subunit Interfaces.

CP/IO Subunit Interfaces

The Control Subunit 230 interfaces with the CP/IO subunit which include the External Data Bus, the EC Data Bus, DMA Channel controls, basic timing clocks, and Interrupts.

External Data Bus

The interface with the CP includes the EDB of 18 bits (16 + 2 parity), the EAB of 9 bits (8 + parity), a Read/Write control, a Select line, an Acknowledge, and an EDB Parity Error line. Data is transferred from the CP 2 to the Control Subunit 230 over the EDB under CP control.

EC Data Bus and DMA Channel

The Storage Controller 8 communicates with Bulk Store users (ISC 24, IOC 18, and CP 2) via the ECDB, the ECDB controls, and the DMA Channel controls.

Interrupts, Clocks, and System Reset

The CP/IO subunit provides four 10 MHz clocks and four 2.5 MHz clocks to be used for timing generation in the STC 162 and AEC 10. A System Reset signal is also provided which is used to reset the functions of the Control Subunit to a stopped state with interrupts reset and impending microprogram branches cancelled. The STC 162 and AEC 10 shall each raise an interrupt line under conditions previously specified. The line shall be dropped when the CP 2 reads the status register.

BS/AP Subunit Interfaces

The Control Subunit's 230 interface with the BS/AP Subunit include the Bulk Store Input and Output Data Buses and controls, Working Store Input and Output Data Buses and Controls, and AE controls.

Bulk Store Interfaces

There shall be one BS Input Data Bus and one BS Output Data Buses, each of 72 bits. A 12-bit address bus (BSAB) and BS Read/Write line shall be provided. In addition, there are 3 BSM Address bits, two 10 MHz clocks, and a clock select to all BS/AP subunits. Each subunit receives two unique signals, a power on select and a BS select.

Working Store Interfaces

There shall be two 34-bit data buses, a WS Input Data Bus and a WS Output Data Bus, common to all BS/APs. In addition, Left and Right Address Buses, each of 10 bits, shall be provided, as well as Input and Output Left/Right Select lines. There are seven additional control lines which shall be provided separately and controlled independently for each Working Store (each BS/AP). These include a left and right clock, a left and right Write Enable, a left and right Address Clock, and an output tri-state Enable.

Arithmetic Element Controls

The Control Subunit shall provide 84 controls lines in common to all AEs in a configuration. There shall be derived from the AEC microprograms and additional control information provided by the CP. A 16-bit bud shall provide Sine /cosine Generator results to the AEs. In addition there are six unique controls to each AE and a unique conditional status bit provided from each AE to the Control Subunit. For one BS/AP only, which shall be the one in any configuration which is designated as BS/APO, the 32-bit data bus between the WS and AE will be provided as input to the AEC in the Control Subunit.

AP Microprogamming

The SPL complex function algorithms are performed in the Arithmetic Processor 4 under the microprogram control. Each algorithm or group of similar algorithms is implemented in a microprogram. When the Control Processor 2, as AU supervisor, determines that an algorithm is to be performed, it transfers the necessary initialization and control parameter for the AP 4 microprogram and initiates execution of the microprogram.

This section presents the control and microprogramming parameters required for microprogram execution. It discusses how these parameters are used by the microprogrammer to implement algorithms. An example is given to show data flow in a signal processing algorithm.

A. Microprogram Parameters

There are a number of control parameters associated with the execution of every microprogram. These parameters are stored in the hardware registers of the AEC 10 during the microprogram execution. This section shows how the microprogram uses the control registers.

1. Branch Registers (BR) 164:

TABLE LVII

| BR | |
|---|---|
| 22 | 31 |

There are eight 10-bit Branch Registers 164 which give the microprogram addresses used on unconditional branch operations. Branch registers 164 may be required for program sequencing or may be used to provide means of sharing commond code between several routines. Branch addresses are generated from microprogram cross referencing by the microprogram assembler. 2. Branch and Count Registers (BCR) 164:

TABLE LVIII

| BCR | | | |
|---|---|---|---|
| Count | Reset | | Branch Address |
| 0 | 7 8 | 15 | 22 31 |

The eight Branch and Count Registers 164 define microprogram addresses used on conditional branch operations. Branch and Count Register 164 are used to control loop operations. The Count field is specified by the SPL programmer define the number of points to be processed in a complex function. The reset field specifies a reset value for the Count field allowing a single loop to be reinitialized multiple times in a nested loop application. To process an algorithm N times Count is set to N − 1. If the loop is nested the Reset field is also set to N − 1.

Branch and Count Register 164 are used to provide switches between segments of a program. For example, The SPL programmer may set the Count field to zero or one to select between the ways of processing an algorithm.

3. Scale Factor Registers (SFR)

The eight SFR's 106 provide the scaling factors for all operations. For some algorithms, the data characteristics are well known beforehand and the microprogrammers will always use a single set of SFR's 106. For other algorithms the data sets vary in magnitude and the scaling values must be generated just prior to microprogram initiation. These scaling factors are generated by the SPL program, dependent on such conditions as input AGC and AE 20 status indicators for potential over flow.

The SFR 106 has four fields, three for controlling the adder input shifts and one for controlling the output shifter. The input shift controls are data true or complement and shift direct, right 1, right 2, right 4, and inhibit. The output shift controls are direct, left 1, 2, or 4 and right 2, 4, 6, or 8.

4. Address Registers (AR) and Increment Registers (INCR)

The Address Registers 166 and Increment Registers 168 operates in pairs to provide pointers to data sets in Working Store 12 or Program Store 14. There are a total of eight pairs of these registers.

Four of the AR's 166 may be used for form angles for the Sine/Cosine Generator 124. Here the 16-bit AR 166 expresses angles from zero to 360°. The first 2-bits represent the quandrant and the remaining are $2^{14}$ divisions within each quandrant. The INCR 168 contains angle update value. The INCR 618 can be an effective negative value by using a large positive value; for example $-\pi 8$ can be expressed as $+15\pi/8$.

The AR's 166 and INCR's 168 are used to store angles in the FFT process and in bandshifting during some digital filtering processes. For FFT the initial values of these registers will always be the same at the beginning of a process. For bandshifting, however, the initial value will be the final value from the previous filtering that channel. Thus the microprogram must store away these registers after some operations.

5. Sine/Cosine Destination Registers (SCDR) 170

There are four of these registers 170, one for each of the four AR166 − INCR 168 pairs which may be used for angle registers. The bits of this register specify which of the AE's 20 are to receive the sine and or cosine values generated 6. Decimation Register (DECR) 176

This register 176 is used to select decimation valves generally used after digital filters.

B. Program Phases

There are two phases of AP microprograms:
1. Initialization
2. Execution

During the Initialization phase the CP 2 loads its control registers in the AEC 10 and the AE's 20. The microprogram uses a pointer to Program Store 14 to access the list of parameters (i.e., complex function command) it needs for the program to be executed. One of the parameters loaded into the Microprogram Address Register 158 during initialization is the starting address of the algorithm to be executed. The final step of initialization is an unconditional branch to the algorithm microprogram.

The Execution phase accomplishes the signal processing functions. In microprogramming a pipelined processor such as the AE 20, there are generally a few microinstructions required initially to get the process started (get the pipe "primed") and at the end, a few final microinstructions to get the last results put away. But the main body of the microprogram is expected to be a compact, high speed processing loop. The key to efficient AE 20 microprogramming lies in keeping the pipeline fully utilized. Many signal processing algorithms, such as the FFT buterfly, inherently keep the pipeline full. This is usually the case whenever complex algebra is used in he algorithm because it generally has a high computational load and consequently is not very susceptible to bandwidth limitations. In other cases the pipeline can be kept full by interleaving related calculations. This technique is used in the recursive filter algorithms where calculations on points from successive filter stages are interleaved.

C. AP Microprogramming Example

The following section demonstrates the microprogramming of an algorithm in the AP. The execution phase is described using flow charts and AP microprogramming forms to illustrate data flow through the AE with respect to microinstruction execution cycles.

Figure 41:
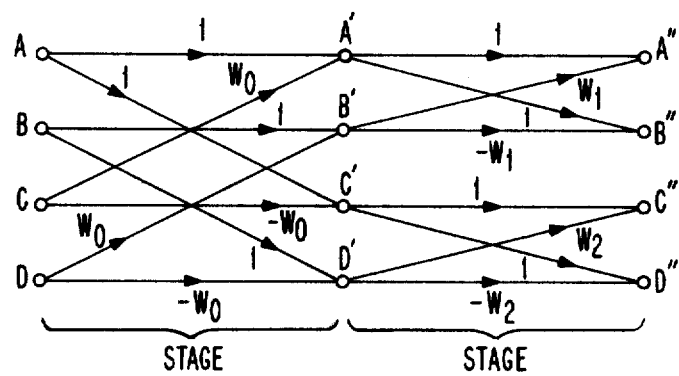
FIG. 41 illustrates the fast Fourier 4-point butterfly calculation.

An example of a complex function which is extensively used in acoustic and other signal processing is the FFT butterfly. A four point butterfly is used as shown in FIG. 41. Table LX lists the equations involved in the AU to generate all FFT's with an even number of stages.

TABLE LX

| | | | | | |
|---|---|---|---|---|---|
| $A''_R$ | = | $A'_R$ | + $W_{1R}B'_R$ | − | $W_{1I}B'_I$ |
| $A''_I$ | = | $A'_I$ | + $W_{1I}B'_R$ | + | $W_{1R}B'_I$ |
| $B''_R$ | = | $A'_R$ | − $W_{1R}B'_R$ | + | $W_{1I}B'_I$ |
| $B''_I$ | = | $A'_I$ | − $W_{1I}B'_R$ | − | $W_{1R}B'_I$ |
| $C''_R$ | = | $C'_R$ | + $W_{2R}D'_R$ | − | $W_{2I}D'_I$ |
| $C''_I$ | = | $C'_I$ | + $W_{2I}D'_R$ | + | $W_{2R}D'_I$ |
| $D''_R$ | = | $C'_R$ | − $W_{2R}D'_R$ | + | $W_{2I}D'_I$ |
| $D''_I$ | = | $C'_I$ | − $W_{2I}D'_R$ | − | $W_{2R}D'_I$ |

An eight point, three stage algorithm is combined with the four point algorithm to implement FTT's with an odd number of stages.

Exact details of initialization for this problem depend on the size of the FFT problem to be executed. An AP microprogramming form showing the first 32 execution cycles appears in Table LXI.

TABLE LXI

| Cycle | Rest WS | Load MLR | Start Multiply | Load ALIR | Load ACIR | Load ARIR | Start Add | Load ALOR | Load AEOR | Write WS |
|---|---|---|---|---|---|---|---|---|---|---|
| 0 | D(n) | | | | | | | | | |
| 1 | | D(n) | | | | | | | | |
| 2 | B(n) | | | | | | | | | |
| 3 | | | $W_{OR}D_R(n)$ | | | | | | | |
| 4 | C(n) | | $W_{OI}D_I(n)$ | | | | | | | |
| 5 | | | $W_{OR}C_R(n)$ | B(n) | | | | | | |
| 6 | | | $W_{OI}D_I(n)$ | | | | | | | |
| 7 | A(n) | C(n) | $W_{OR}C_R(n)$ | | $W_{OR}D_R(n)$ | | | | | |
| 8 | | | $W_{OI}D_I(n)$ | | $W_{OI}D_I(n)$ | | | | | |
| 9 | | $B'_R(n)$ | $W_{OR}D_R(n)$ | A(n) | $W_{OR}C_R(n)$ | $W_{OR}D_R(n)$ | | | | |
| 10 | | $D'_R(n)$ | $W_{OR}C_R(n)$ | | $W_{OI}D_I(n)$ | $W_{OI}D_I(n)$ | | | | |
| 11 | | $B'_I(n)$ | $W_{OI}B_R(n)$ | | $W_{OR}C_R(n)$ | $W_{OR}C_R(n)$ | | | | |
| 12 | | $D'_I(n)$ | $W_{OI}B_I(n)$ | | $W_{OI}B_R(n)$ | $W_{OI}C_I(n)$ | | | | |
| 13 | | | $W_{IR}B_I(n)$ | | $W_{IR}B_I(n)$ | $W_{OI}C_R(n)$ | $B_R(n)+W_{OR}D_R(n)W_{OI}D_I(n)$ | | | |
| 14 | | | $W_{2I}D_I(n)$ | | $W_{IR}B'(n)$ | $W_{IR}B_I(n)$ | $B_R(n)W_{OR}D_R(n)+W_{OI}D_I(n)$ | | | |
| 15 | | | $W_{2I}D_I(n)$ | | $W_{2I}D'(n)$ | $W_{IR}B_R(n)$ | $B_I(n),W_{OI}D_I(n)+W_{OR}D_R(n)$ | | | |
| 16 | | | $W_{OR}C_R(n)$ | | $W_{2R}D'(n)$ | $W_{OI}C_R(n)$ | $A_R(n)+W_{OR}C_R(n)+W_{OI}D_I(n)$ | $A'_R(n)$ | $A_R(n)$ | $A''(n)$ |
| 17 | | D(n+k) | $W_{OR}D_I(n+k)$ | | $W_{2R}D'_R(n)$ | $W_{OI}D_I(n)$ | $A_R(n)W_{OR}C_R(n)+W_{OI}C_I(n)$ | $C'_R(n)$ | $B_R(n)$ | $B''(n)$ |
| 18 | D(n+k) | | $W_{OR}D_R(n+k)$ | | $W_{OR}D_I(n+k)$ | $W_{2R}D'_R(n)$ | $A_I(n)+W_{OI}C_I(n)+W_{OR}C_R(n)$ | $A'_I(n)$ | $A_I(n)$ | $C''(n)$ |
| 19 | | | $W_{OI}D_I(n+k)$ | B(n+k) | | $W_{2R}D'_R(n)$ | $A_R(n)W_{OI}C_I(n)+W_{OR}C_R(n)$ | $C'_I(n)$ | $C_R(n)$ | $D''(n)$ |
| 20 | | | $W_{OR}C_R(n+k)$ | | $W_{OR}D_I(n+k-)$ | $W_{OI}D_I(n+k)$ | $A_R(n)+W_{IR}B_I(n)W_{IR}B_R(n)$ | | $D_R(n)$ | |
| 21 | B(n+k) | | $W_{OR}D_I(n+k)$ | | $W_{2I}D'_I(n)$ | $W_{OR}D_I(n+k)$ | $A_I(n)W_{IR}B_I(n)+W_{IR}B_R(n)$ | | $A_I(n)$ | |
| 22 | | | $W_{OR}C_R(n+k)$ | A(n+k) | $W_{OR}D_R(n+k)$ | $W_{OI}D_I(n+k)$ | | | $B_I(n)$ | |
| 23 | | C(n+k) | $W_{OI}C_I(n+k)$ | | $W_{OR}C_R(n+k)$ | $W_{OI}D_I(n+k)$ | | | $C_I(n)$ | |
| 24 | C(n+k) | | $W_{OR}C_R(n+k)$ | | $W_{OR}C_R(n+k)$ | $W_{OR}C_R(n+k)$ | | | $D_I(n)$ | |
| 25 | | | $W_{OI}B_R(n+k)$ | | $W_{OR}C_R(n+k)$ | $W_{OI}C_I(n+k)$ | | | | |
| 26 | A(n+k) | $B'_R(n+k)$ | $W_{OI}C_I(n+k)$ | | $W_{OI}B_R(n+k)$ | $W_{OR}C_R(n+k)$ | | $A'_R(n+k)$ | | |
| 27 | | $D'_R(n+k)$ | $W_{OR}B_R(n+k)$ | | $W_{IR}B'_R(n+k)$ | $W_{OI}B_I(n+k)$ | | $B'_R(n+k)$ | | |
| 28 | | $B'_I(n+k)$ | $W_{IR}B_I(n+k)$ | | $W_{IR}B_I(n+k)$ | $W_{OI}D_I(n+k)$ | | $C'_I(n+k)$ | | |
| 29 | | $D'_I(n+k)$ | $W_{IR}B_R(n+k)$ | | | $W_{OI}D_I(n+k)$ | | $A'_I(n+k)$ | | |
| 30 | | | $W_{2R}D_R(n+k)$ | | | | | | | |
| 31 | | | $W_{2R}D_I(n+k)$ | | | $W_{IR}B_I(n+k)$ | | | | |

AP microprogramming form-four point FFT.

Note that the multiplier becomes fully loaded after 4 cycles and the adder after 8 cycles. This algorithm is an example of a complex function which makes maximum use of the AE multiplier and adder bandwidths. The first 16 microinstructions are required to completely fill the AE pipeline. The next 16 comprise the execution loop for this complex function. To perform a 1024 point FFT this loop would be executed 256 times on each of 5 passes. Between passes rescaling operations are performed to prevent arithmetic over flow during the next pass.

The inner loop execution time for a 1024 point FFT in a one AE configuration is 2048 microseconds plus an initilization time of 6.2 $\mu$s. A total of about 70 microinstructions are required to implement the complete algorithm.

The four point FFT butterfly has been programmed and simulated. Digital filtering, FFT weighting, gram thresholding, and bearing computation programs have also been programmed and simulated. Results demonstrate that the pipeline can be kept fully utilized.

While the invention has been particularly shown and described with reference to the preferred embodiments thereof, it will be understood by those skilled in the art that the foregoing and other changes in form and details may be made therein without departing from the spirit and scope of the invention.

We claim:

1. A digital computer system comprising:
   an arithmetic processor containing a plurality of pipelined processor arithmetic elements in parallel array with each element connected to a respective working store for temporarily storing data, with all of the elements being connected to and under microprogram control of an arithmetic element controller, for arithmetically processing said data;
   said arithmetic element controller including an arithmetic element control store for storing arithmetic element microinstructions and a memory address register connected to an address input of said arithmetic element control store for accessing said arithmetic element microinstruction;
   a bulk store for storing said data and said arithmetic element microinstructions prior to the time of an initial microprogram load into said arithmetic processor;
   a storage controller connected to said bulk store and to said working store and said arithmetic element control store in said arithmetic processor for selectively transferring said arithmetic element microinstructions from said bulk store to said arithmetic element control store in response to a first transfer command word and selectively transferring said data from said bulk store to said working store in response to a second transfer command word;
   a control processor connected to an input of said memory address register in said arithmetic element controller and to said storage controller by means of an external bus, for sending said first transfer command word to said storage controller at said initial microprogram load time to load said microinstructions into said control store, for sending a first control store address to said memory address register after said load time to initiate execution by the microprogram in said arithmetic processor, and for subsequently sending said second transfer command word to said storage control during execution time, to transfer said data to said working store; whereby the control processor is free to carry out supervisory and data management functions during said execution time and the program storage and data storage functions are separated during execution time, minimizing storage bandwidth requirements.

2. The system of claim 1, wherein said control processor further comprises:
   a program store for storing emulated machine language instruction and data;
   a writable control store for storing microprogram control instructions;
   an arithmetic unit connected to said program store and said control store, for accessing microprogram instructions for said control store in response to functionally coded emulated machine language instructions input from said program store, and decoded as general and supervisory instructions, as data transfer instructions to be output on said external data bus, as input/output instructions to be output on said external data bus, or as arithmetic operational instructions to be output on said external bus.

3. The system of claim 2 wherein said arithmetic unit fetches microinstructions from said writable control store and fetches machine language instructions and data from and stores data into said program store.

4. The system of claim 3 wherein said control processor further comprises:
   an operand bus;
   a plurality of local storage registers connected to said operand bus;
   said external bus connected to said operand bus;
   a first external register located in said storage controller connected to said external bus;
   a second external register located in said arithmetic processor, connected to said external bus;
   said operand bus connected to said arithmetic unit;
   whereby said arithmetic unit may access one of said external registers over said external bus in the same manner as it would access one of said local registers in said local store.

5. The system of claim 4 wherein said accessing of an external register takes place over an extended microinstruction cycle.

6. The system of claim 2, wherein said control store comprises a high speed memory and said program store comprises a low speed memory.

7. The system of claim 2, wherein said program store comprises a first group of memory pages having an even address and a second group of memory pages having an odd address;
   means for sequentially accessing an even page and an odd page from said first and second groups;
   whereby the effective access time for said program store is reduced.

8. The system of claim 2, wherein said program store and said control are connected to a direct memory access channel which is connected to said storage controller,
   whereby pages of stored data may be selectively transferred by said storage controller between said program store or said control store in said control processor and said bulk store.

9. The system of claim 8, wherein said direct memory access bus is connected to a system input and output for transferring the contents of said program store, said control store, or said bulk store, there between.

10. The system of claim 1, wherein said arithmetic processor further comprises:

said arithmetic element controller connected to said external bus;

whereby programmed control instructions generated in said control processor are transmitted over said external bus commanding multistep operations to be executed by said arithmetic element controller by carrying out arithmetic operations in said arithmetic elements.

11. The system of claim 10, wherein said arithmetic element controller contains a micro storage for storing microprogram instructions to execute the multistep operations commanded by the control processor;

whereby after a microprogram has been initially loaded in said micro storage and the control processor commands an operation by means of said external bus, said arithmetic element controller provides full processing control over said arithmetic processor, including all data transfer between said arithmetic elements and said working storage, thereby freeing the control processor from signal processing tasks.

12. The storage of claim 10, wherein said arithmetic element further comprises:

a two's complement multiplier having an input connected to said working store;

a three input arithmetic logic unit having augend and addend inputs connected to said working store and said multiplier;

said arithmetic unit having its sum output connected to said working store;

whereby said arithmetic element operates in a pipelined fashion with new operands entering each stage of execution in the pipe in sequential fashion.

13. The system of claim 10, wherein said arithmetic element further comprises:

an input connected to said working store;

a left multiplier register and a right multiplier register having inputs connected to said input line;

a two's complement multiplier having a multiplier input connected to said left register and a multiplicand input connected to said right register;

a left adder input register, a center adder input register, and a right adder input register, having an input connected to the product output of said multiplier;

said left adder input register and said center adder input register having a second input connected to said working store;

a scale factor register having a first input connected to said external bus and a second input connected to said working store;

a first prescaler having a data input connected to said left adder input register and a control input connected to said scale factor register;

a second prescaler having a data input connected to said center adder input register and a control input connected to said scale factor register;

a third prescaler having a data input connected to said right adder input register and a control input connected to said scale factor register;

a three input arithmetic logic unit having a first input connected to the output of said first prescaler, a second input connected to the output of said second prescaler, and a third input connected to the output of said third prescaler;

a post scaler having a data input connected to the sum output of said arithmetic logic unit and a control input connected to said scale factor register;

a center adder output register and a right adder output register having inputs connected to the sum output of said arithmetic logic unit;

said post scaler having an output connected to a left adder output register which in turn has an output connected to said first prescaler;

said center adder output register having an output connected to said second prescaler and said right adder output register having an output connected to said third prescaler;

said post scaler having an output connected to a rounder which in turn has an output connected to an input of said left multiplier register and said right multiplier register;

an arithmetic element output register having an input connected to said rounder and an output connected to said working store;

whereby said arithmetic element operates in a pipelined fashion at staging rate such that new operands enter each stage of execution in the pipe in consecutive time intervals.

14. The system of claim 1, wherein said working store further comprises:

a left working store memory having a left address input line connected to said arithmetic element controller;

a right working store memory having a right address input line connected to said arithmetic element controller;

a first two by two switch having a first data input connected to the output of said arithmetic element, a second data input connected to said storage controller, a first data output line connected to said left working store memory and a second data output line connected to said right working store memory;

a second two by two switch having a first data input connected to said left working store memory and a second data input connected to said right working store memory, a first output connected to the input of said arithmetic element and a second output connected to said storage controller;

said first two by two switch and second two by two switch having a control input line connected to said arithmetic element controller for controlling the operation of said left working store memory and said right working store memory;

whereby during the period when the left working store memory is communicating with said arithmetic element, the right working store memory may communicate with said storage controller, and vice versa.

15. The system of claim 1, wherein said arithmetic element controller of said arithmetic processor further comprises:

a branch register connected to said external data bus for storing microprogram addresses used on unconditional branch operations;

a branch and count register connected to said external bus for storing microprogram addresses used on conditional branch operations;

said branch register containing a branch address field;

said branch and count register containing a count field, a reset field, and a branch address field;

said count field specifying the number of said conditionl branch operations to be performed before transferring the next process step;

said reset field specifying a reset value for the count to be reinitialized a plurality of times in a nested loop application;

a microprogram address register having an input connected to said branch register and said branch and count register for storing a branch address;

a microprogram storage having an address input connected to said microprogram address register for control and a data input connected to said storage controller for storing microprogram instructions for the operation of said arithmetic element and said working storage, accessible by said microprogram address;

whereby the independent execution of data conditional operations in each of a plurality of arithmetic elements operating in parallel, may proceed under the common control of said arithmetic element controller without the loss of simultaneity of operation of the arithmetic elements.

16. The system of claim 1, wherein said arithmetic element controller further comprises:
   a microprogram address register having an input connected to said external bus;
   a micro storage having an input connected to said storage controller;
   a microinstruction register and decode logic having an input connected to said micro storage;
   an address generation logic having an input connected to said microinstruction register and decode logic;
   said address generation logic having an output connected to said working store;
   said microinstruction register and decode logic having an output connected to said arithmetic unit;
   a timing generator connected to said arithmetic unit and said working store;
   said micro store having a cycle rate equal to the logic delay of one unit in the pipeline processor of said arithmetic unit;
   a portion of each microinstruction issued from said micro storage to said microinstruction register and decode logic being used to control, on successive cycles, the operation of said pipeline processor in said arithmetic unit;
   said working store having an accessing cycle which is an integral multiple of said unit of logic delay;
   said microinstruction having a second portion controlling the address generation logic for accessing said working store once every said integral multiple of said unit of logic delay.

17. The system of claim 16, wherein said arithmetic element controller further comprises:
   said working storage being divided into a left memory and a right memory with a memory address switching means controlling data flow into and out of said left memory and said right memory in response to a control signal generated by said address generation logic over a control line connecting said switching means to said address generation logic;
   said arithmetic element controller controlling data transfer between the left half memory of said working store and said arithmetic element when said right half memory of said working store is engaging in data transfers with said bulk storage, and vice versa.

18. The system of claim 1, wherein said storage controller further comprises:
   a storage transfer control connected to said external bus, with input and output lines connected to said working store, for providing working store addresses for data words being transferred between said bulk store and said working store;
   a priority control connected to said storage transfer controller and having an output connected to said bulk store, for accepting bulk store addresses from said storage transfer control for all working store and control processor data transferred to said bulk store;
   an error control having an input connected to said storage transfer control and input and output lines connected to said bulk store, and a bidirectional error control data bus connected to said control processor, for making single error correcton and double error detection of all data received from said bulk store.

19. The system of claim 18, wherein said storage transfer control further comprises:
   said storage transfer control controlling the transfer of data between said bulk store and said working store, between said bulk store and said micro store of said arithmetic element controller, and between said bulk store and said control processor;
   said storage transfer control operating under control of commands received over said external bus from said control processor;
   a control section containing a status word register connected to said external bus and a queue register connected to said external data bus for queuing commands received therefrom;
   a rescaler section connected to said error control and to said working store for performing a zero to eight bit left shift on a half word basis on data transferred from said working store to said error control.

20. The system of claim 1, which further comprises:
   a direct memory access bus connecting said program storage and control storage in said control processor to said storage controller, for directly accessing data stored in said control processor;
   an error control data bus connected between said storage controller and said control processor, for transmitting data;
   whereby parallel control can be maintained by said control processor over said storage controller, said bulk storage, and said arithmetic processor.

21. The system of claim 11, wherein said arithmetic element controller generates parallel control signals to operate a plurality of arithmetic elements in parallel;
   whereby the number of arithmetic elements controlled by the arithmetic element controller can be expanded without requiring a change in said microprogram instructions.

22. A digital computer system comprising:
   an arithmetic processor containing a pipelined processor arithmetic element connected to a working store for temporarily storing data, connected to and under microprogram control of an arithmetic element controller, for arithmetically processing said data;
   said arithmetic element controller including an arithmetic element control store for storing arithmetic element microinstructions and a memory address register connected to an address input of said arithmetic element control store for accessing said arithmetic element microinstruction;

a bulk store for storing said data and said arithmetic element microinstruction prior to the time of an initial microprogram load into said arithmetic processor;

a storage controller connected to said bulk store and to said working store and said arithmetic element control store in said arithmetic processor for selectively transferring said arithmetic element microinstructions from said bulk store to said arithmetic element control store in response to a first transfer command word and selectively transferring said data from said bulk store to said working store in response to a second transfer command word;

a control processor connected to an input of said memory address register in said arithmetic element controller and to said storage controller by means of an external bus, for sending said first transfer command word to said storage controller at said initial microprogram load time to load said microinstructions into said control store, for sending a first control store address to said memory address register after said load time to initiate execution by the microprogram in said arithmetic processor, and for subsequently sanding said second transfer command word to said storge control during execution time, to transfer said data to said working store;

whereby the control processor is free to carry out supervisory and data management functions during said execution time and the program storage and data storage functions are separated during execution time, minimizing storage bandwidth requirements.

23. The system of claim 22, wherein said control processor further comprises:
a program store for storing emulated machine language instruction and data;
a writable control store for storing microprogram control instructions;
an arithmetic unit connected to said program store and said control store, for accessing microprogram instruction for said control store in response to functionally coded, emulated machine language instructions input from said program store, as general and supervisory instruction, as data transfer instructions to be output on said external data bus, as input/output instructions to be output on said external data bus, or as arithmetic operational instructions to be output on said external bus.

24. The system of claim 23 wherein said arithmetic unit fetches microinstructions from said writable control store and fetches machine language instructions and data from and stores data into said program store.

25. The system of claim 24 wherein said control processor further comprises:
an operand bus;
a plurlity of local storage registers connected to said operand bus;
said external bus connected to said operand bus;
a first external register located in said storage controller connected to said external bus;
a second external register located in said arithmetic processor, connected to said external bus;
said operand bus connected to said arithmetic unit;
whereby said arithmetic unit may access one of said external registers over said external bus in the same manner as it would access one of said local registers in said local store.

26. The system of claim 25 wherein said accessing of an external register takes place over an extended microinstruction cycle.

27. The system of claim 23, wherein said control store comprises a high speed memory and said program store comprises a low speed memory.

28. The system of claim 23, wherein said program store comprises a first group of memory pages having an even address and a second group of memory pages having an odd address;
means for sequentially accessing an even page and an odd page from said first and second groups;
whereby the effective access time for said program store is reduced.

29. The system of claim 23, wherein said program store and said control store are connected to a direct memory access channel which is connected to said storge controller;
whereby pages of stored data may be selectively transferred by said storge control between said program store or said control store in said control processor and said bulk store.

30. The system of claim 29, wherein said direct memory access bus is connected to a system input and output for transferring the contents of said program store, said control store, or said bulk store, there between.

31. The system of claim 22, wherein said arithmetic processor further comprises:
said arithmetic element controller connected to said external bus;
whereby programmed control instructions generated in said control processor are transmitted over said external bus commanding multistep operations to be executed by said arithmetic element controller by carrying out arithmetic operations in said arithmetic elements.

32. The system of claim 31, wherein said arithmetic element controller contains a micro storage for storing microprogram instructions to execute the multistep operations commanded by the control processor;
whereby after a microprogrm has been initially loaded in said micro storage and the control processor commands an operation by means of said externl bus, said arithmetic element controller provides full processing control over said arithmetic processor, including all data transfer between said arithmetic element and said working storage, thereby freeing the control processor from signal processing tasks.

33. The system of claim 22, wherein said working store further comprises:
a left working store memory having a left address input line connected to said arithmetic element controller;
a right working store memory having a right address input line connected to said arithmetic element controller;
a first two by two switch having a first data input connected to the output of said arithmetic element, a second data input connected to said storage controller, a first data output line connected to said left working store memory and second data output line connected to said right working store memory; p1 a second two by two switch having a first data input connected to said left working store memory and a second data input connected to said right working store memory, a first output connected to the input of said arithmetic element and a second output connected to said storage controller;

said first two by two switch and second two by two switch having a control input line connected to said arithmetic element controller for controlling the operation of said left working store memory and said right working store memory;

whereby during the period when the left working store memory is communicating with said arithmetic element, the right working store memory may communicate with said storage controller, and vice versa.

34. The system of claim 22, wherein said storage controller further comprises:
a storage transfer control connected to said external bus, with input and output lines connected to said working store, for providing working store addresses for data words being transferred between said bulk store and said working store;
a priority control connected to said storage transfer controller and having an output connected to said bulk store, for accepting bulk store addresses from said storage transfer control for all working store and control processor data transferred to said bulk store;
an error control having an input connected to said storge transfer control and input and output lines connected to said bulk store, and a bidirectional error control data bus connected to said control processor, for making single error correction and double error detection of all data received from said bulk store.

35. The system of claim 34, wherein said storage transfer control further comprises:
said storage transfer control controlling the transfer of data between said bulk store and said working store, between said bulk store and said micro store of said arithmetic element controller, and between said bulk store and said control processor;
said storage transfer control operating under control of commands received over said external bus from said control processor;
a control section containing a status word register connected to said external bus and a queue register connected to said external data bus for queuing commands received therefrom;
a rescaler section connected to said error control and to said working store for performing a zero to eight bit left shift on a half word basis on data transferred from said working store to said error control.

36. The system of claim 22, which further comprises:
a direct memory access bus connecting said program storage and control storage in said control processor to said storage controller, for directly accessing data stored in said control processor;
an error control data bus connected between said storage controller and said control processor, for transmitting data;
whereby parallel control can be maintained by said control processor over said storage controller, said bulk storage, and said arithmetic processor.

37. The system of claim 22, wherein said arithmetic element controller of said arithmetic processor further comprises:
a branch register connected to said externl bus for storing microprogram addresses used on unconditional branch operations;
a branch and count register connected to said external data bus for storing microprogram addresses used on conditional branch operations;
said branch register containing a branch address field;
said branch and count register containing a count field, a reset field, and a branch address field;
said count field specifying the number of said conditional branch operations to be performed before transferring to the next process step;
said reset field specifying a reset value for the count to be reinitialized a plurality of times in a nested loop application;
a microprogram address register having an input connected to said branch register and said branch and count register for storing a branch address;
a microprogram storage having an address input connected to said microprogram address register for control and a data input connected to said storage controller for storing microprogram instructions for the operation of said arithmetic element and said working storage, accessible by said microprogram address;
whereby the execution of data conditional operations in said arithmetic element may proceed under the control of said arithmetic element controller.

38. The system of claim 22, wherein said arithmetic element controller further comprises:
a microprogram address register having an input connected to said external data bus;
a micro storage having an input connected to said storage controller;
a microinstruction register and decode logic having an input connected to said micro storage;
an address generation logic having an input connected to said microinstruction register and decode logic;
said address generation logic having an output connected to said working store;
said microinstruction register and decode logic having an output connected to said arithmetic unit;
a timing generator connected to said arithmetic unit and said working store;
said micro store having a cycle rate equal to the logic delay of one unit in the pipeline processor of said arithmetic unit;
a portion of each microinstruction issued from said micro storage to said microinstruction register and decode logic being used to control, on successive cycles, the operation of said pipeline processor in said arithmetic unit;
said working store having an accessing cycle which is an integral multiple of said unit of logic delay;
said microinstruction having a second portion controlling the address generation logic for accessing said working store once every said integral multiple of said unit of logic delay.

39. The system of claim 38, wherein said arithmetic element controller further comprises:
said working storage being divided into a left memory and a right memory with a memory address switching means controlling data flow into and out of said left memory and said right memory in response to a control signal generated by said address generation logic over a control line connecting said switching means to said address generation logic;
said arithmetic element controller controlling data transfer between the left half memory of said working store and said arithmetic element when said right half memory of said working store is engaging in data transfers with said bulk storage, and vice versa.

40. A pipelined arithmetic processor, comprising:

an input connected to a working store;

a left multiplier register and a right multiplier register having inputs connected to said input for receiving a first set of operands;

a two's complement multiplier having a multiplier input connected to said first register and a multiplicand input connected to said right register for multiplying said first set of operands during a first time interval;

a left adder input register, a center adder input register, and a right adder input register, having an input connected to the product output of said multiplier;

said left adder input register and said center adder input register having a second input connected to said working store;

a scale factor register having a first input connected to an input control line and a second input connected to said working store;

a first prescaler having a data input connected to said left adder input register and a control input connected to said scale factor register;

a second prescaler having a data input connected to said center adder input register and a control input connected to said scale factor register;

a third prescaler having a data input connected to said right adder input register and a control input connected to said scale factor register;

a three input arithmetic logic unit having a first input connected to the output of said first prescaler, a second input connected to the output of said second prescaler, and a third input connected to the output of said third prescaler for adding the product of said first set of operands output from said multiplier to the input from said working store during a second time interval;

said multiplier multiplying a second set of operands during said second time interval;

a post scaler having a data input connected to the sum output of said arithmetic logic unit and a control input connected to said scale factor register;

a center adder output register and a right adder output register having inputs connected to the sum output of said arithmetic logic unit;

said post scaler having an output connected to a left adder output register which in turn has an output connected to said first prescaler;

said center adder output register having an output connected to said second prescaler and said right adder output register having an output connected to said third prescaler;

said post scaler having an output connected to a rounder which in turn has an output connected to an input of said left multiplier register and said right multiplier register;

an arithmetic element output register having an input connected to said rounder and an output connected to said working store for outputting the sum of the product of said first operands during a third time interval;

said arithmetic logic unit adding the product of said second set of operands output from said multiplier to the input from said working store during said third time interval;

said multiplier multiplying a third set of operands during said third time interval;

whereby the processor operates in a pipelined fashion at a staging rate such that new operands enter each stage of execution in the pipe in consecutive time intervals.

* * * * *